United States Patent
Krishnaswamy

(10) Patent No.: US 9,391,789 B2
(45) Date of Patent: Jul. 12, 2016

(54) METHOD AND SYSTEM FOR MULTI-LEVEL DISTRIBUTION INFORMATION CACHE MANAGEMENT IN A MOBILE ENVIRONMENT

(75) Inventor: Dilip Krishnaswamy, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 12/333,091

(22) Filed: Dec. 11, 2008

(65) Prior Publication Data

US 2009/0157834 A1 Jun. 18, 2009

Related U.S. Application Data

(60) Provisional application No. 61/080,988, filed on Jul. 15, 2008, provisional application No. 61/013,949, filed on Dec. 14, 2007, provisional application No. 61/013,944, filed on Dec. 14, 2007, provisional application No. 61/013,941, filed on Dec. 14, 2007.

(51) Int. Cl.
G06F 15/173 (2006.01)
G06F 15/16 (2006.01)
(Continued)

(52) U.S. Cl.
CPC .......... *H04L 12/1859* (2013.01); *G06Q 10/10* (2013.01); *G06Q 20/202* (2013.01);
(Continued)

(58) Field of Classification Search
CPC ... H04L 51/066; H04L 51/38; H04L 12/5835; H04L 67/04; H04L 67/32; H04L 67/322; G06Q 30/02
USPC ................ 709/206, 205, 217, 219, 224, 240; 705/14.49
See application file for complete search history.

(56) References Cited

U.S. PATENT DOCUMENTS

| | | |
|---|---|---|
| 3,779,357 A | 12/1973 | Haller et al. |
| 5,557,721 A | 9/1996 | Fite et al. |

(Continued)

FOREIGN PATENT DOCUMENTS

| | | |
|---|---|---|
| CN | 1201546 A | 12/1998 |
| CN | 1337129 A | 2/2002 |

(Continued)

OTHER PUBLICATIONS

Barbeau M et al: "Perfect identity concealment in UMTS over radio access links" Wireless and Mobile Computing, Networking and Communications, 2005 (W IMOB' 05), IEEE International Conference on Montreal, Canada Aug. 22-24, 2005, Piscataway, NJ USA IEEE, vol. 2, Aug. 22, 2005, pp. 72-77, XP010838822 ISBN: 978-0-7803-9181-9.

(Continued)

*Primary Examiner* — Madhu Woolcock
(74) *Attorney, Agent, or Firm* — Nicholas A. Cole; Charles E. Eggers

(57) ABSTRACT

Methods and systems for updating memory content in a mobile client are disclosed. For example, an exemplary method includes maintaining a list of first attributes relating to a set of first messages on the mobile client, wherein each of the set of first messages resides on the mobile client, maintaining a list of second attributes relating to set of second messages on the mobile client, wherein each of the set of second messages does not reside on the mobile client, identifying target attributes associated with a message request by the mobile client, selecting by the mobile client a selected message from one of the set of first messages and the set of second messages by applying a set of selection rules to the target attributes, and in the situation where a second message is selected, requesting the selected second message from a remote server using a wireless link.

33 Claims, 34 Drawing Sheets

(51) Int. Cl.
  *G06Q 30/00* (2012.01)
  *H04L 12/18* (2006.01)
  *G06Q 10/10* (2012.01)
  *G06Q 20/20* (2012.01)
  *G06Q 20/38* (2012.01)
  *G06Q 30/02* (2012.01)
  *H04L 12/58* (2006.01)
  *H04L 29/08* (2006.01)

(52) U.S. Cl.
  CPC .......... *G06Q20/209* (2013.01); *G06Q 20/3821* (2013.01); *G06Q 30/02* (2013.01); *G06Q 30/0226* (2013.01); *H04L 12/5835* (2013.01); *H04L 12/5895* (2013.01); *H04L 51/066* (2013.01); *H04L 51/38* (2013.01); *H04L 67/22* (2013.01); *H04L 67/2814* (2013.01); *H04L 67/306* (2013.01); *H04L 12/189* (2013.01)

(56) References Cited

U.S. PATENT DOCUMENTS

| | | | | |
|---|---|---|---|---|
| 5,559,984 | A * | 9/1996 | Nakano et al. | 711/121 |
| 5,664,126 | A | 9/1997 | Hirakawa et al. | |
| 5,754,938 | A | 5/1998 | Herz et al. | |
| 5,754,939 | A | 5/1998 | Herz et al. | |
| 5,778,436 | A | 7/1998 | Kedem et al. | |
| 5,848,397 | A | 12/1998 | Marsh et al. | |
| 5,918,014 | A | 6/1999 | Robinson | |
| 5,948,061 | A | 9/1999 | Merriman et al. | |
| 5,961,593 | A | 10/1999 | Gabber et al. | |
| 5,987,476 | A * | 11/1999 | Imai et al. | |
| 6,002,672 | A | 12/1999 | Todd | |
| 6,105,028 | A * | 8/2000 | Sullivan et al. | |
| 6,112,186 | A | 8/2000 | Bergh et al. | |
| 6,112,203 | A * | 8/2000 | Bharat et al. | |
| 6,119,098 | A | 9/2000 | Guyot et al. | |
| 6,177,931 | B1 | 1/2001 | Alexander et al. | |
| 6,202,058 | B1 | 3/2001 | Rose et al. | |
| 6,256,633 | B1 | 7/2001 | Dharap | |
| 6,314,451 | B1 | 11/2001 | Landsman et al. | |
| 6,360,096 | B1 * | 3/2002 | Charpentier et al. | 455/433 |
| 6,411,807 | B1 | 6/2002 | Amin et al. | |
| 6,421,673 | B1 * | 7/2002 | Caldwell et al. | |
| 6,460,036 | B1 | 10/2002 | Herz | |
| 6,484,148 | B1 | 11/2002 | Boyd | |
| 6,507,279 | B2 | 1/2003 | Loof | |
| 6,510,318 | B1 | 1/2003 | Minagawa | |
| 6,526,440 | B1 * | 2/2003 | Bharat | 709/219 |
| 6,571,279 | B1 | 5/2003 | Herz et al. | |
| 6,601,103 | B1 | 7/2003 | Goldschmidt Iki et al. | |
| 6,611,684 | B1 | 8/2003 | Franks | |
| 6,647,257 | B2 | 11/2003 | Owensby | |
| 6,654,813 | B1 | 11/2003 | Black et al. | |
| 6,668,378 | B2 * | 12/2003 | Leak et al. | 725/136 |
| 6,671,732 | B1 * | 12/2003 | Weiner | 709/231 |
| 6,677,894 | B2 | 1/2004 | Sheynblat et al. | |
| 6,738,678 | B1 * | 5/2004 | Bharat et al. | 700/48 |
| 6,834,294 | B1 | 12/2004 | Katz | |
| 6,847,959 | B1 * | 1/2005 | Arrouye et al. | |
| 6,873,834 | B1 | 3/2005 | Edwards et al. | |
| 6,889,224 | B2 * | 5/2005 | Smith | |
| 6,895,387 | B1 | 5/2005 | Roberts et al. | |
| 6,912,398 | B1 | 6/2005 | Domnitz | |
| 6,947,910 | B2 | 9/2005 | Hsu et al. | |
| 6,968,178 | B2 | 11/2005 | Pradhan et al. | |
| 6,981,040 | B1 | 12/2005 | Konig et al. | |
| 7,003,792 | B1 | 2/2006 | Yuen | |
| 7,065,525 | B1 | 6/2006 | Sasaki et al. | |
| 7,069,259 | B2 | 6/2006 | Horvitz et al. | |
| 7,069,319 | B2 | 6/2006 | Zellner et al. | |
| 7,120,615 | B2 | 10/2006 | Sullivan et al. | |
| 7,136,871 | B2 | 11/2006 | Ozer et al. | |
| 7,149,704 | B2 | 12/2006 | Martin et al. | |
| 7,150,030 | B1 | 12/2006 | Eldering et al. | |
| 7,222,101 | B2 | 5/2007 | Bishop et al. | |
| 7,248,861 | B2 | 7/2007 | Lazaridis et al. | |
| 7,254,643 | B1 | 8/2007 | Peters, Jr. et al. | |
| 7,274,684 | B2 | 9/2007 | Young et al. | |
| 7,289,971 | B1 | 10/2007 | Oneil et al. | |
| 7,312,752 | B2 | 12/2007 | Smith et al. | |
| 7,330,824 | B1 | 2/2008 | Kanojia et al. | |
| 7,343,317 | B2 | 3/2008 | Jokinen et al. | |
| 7,356,530 | B2 * | 4/2008 | Kim et al. | 707/709 |
| 7,363,035 | B2 * | 4/2008 | Reilly | 455/432.3 |
| 7,370,073 | B2 | 5/2008 | Yen et al. | |
| 7,401,121 | B2 | 7/2008 | Wong et al. | |
| 7,403,980 | B2 * | 7/2008 | Stringer-Calvert et al. | 709/220 |
| 7,433,918 | B2 * | 10/2008 | Rivers et al. | 709/203 |
| 7,523,112 | B2 * | 4/2009 | Hassan et al. | |
| 7,530,020 | B2 | 5/2009 | Szabo | |
| 7,535,884 | B2 | 5/2009 | Stephenson et al. | |
| 7,552,433 | B2 | 6/2009 | Brothers | |
| 7,577,732 | B2 | 8/2009 | Yasui et al. | |
| 7,596,591 | B2 | 9/2009 | Titmuss | |
| 7,610,280 | B2 * | 10/2009 | O'Toole et al. | |
| 7,657,522 | B1 * | 2/2010 | Puzicha et al. | 707/723 |
| 7,657,639 | B2 | 2/2010 | Hinton | |
| 7,668,922 | B2 * | 2/2010 | Garbow et al. | 709/207 |
| 7,689,510 | B2 * | 3/2010 | Lamkin et al. | 705/51 |
| 7,689,682 | B1 | 3/2010 | Eldering et al. | |
| 7,690,013 | B1 | 3/2010 | Eldering et al. | |
| 7,702,813 | B2 | 4/2010 | Andreasson et al. | |
| 7,706,740 | B2 | 4/2010 | Collins et al. | |
| 7,707,167 | B2 | 4/2010 | Kishore et al. | |
| 7,711,004 | B2 | 5/2010 | Xu | |
| 7,711,475 | B1 | 5/2010 | Cona et al. | |
| 7,716,161 | B2 | 5/2010 | Dean et al. | |
| 7,801,554 | B2 * | 9/2010 | Fujimoto | 455/550.1 |
| 7,805,129 | B1 * | 9/2010 | Issa et al. | 455/412.1 |
| 7,853,474 | B2 | 12/2010 | Ullah | |
| 7,860,922 | B2 * | 12/2010 | Singer et al. | 709/203 |
| 7,979,509 | B1 | 7/2011 | Malmskog et al. | |
| 8,005,716 | B1 | 8/2011 | Desikan | |
| 8,095,582 | B2 | 1/2012 | Cramer | |
| 2001/0013088 | A1 | 8/2001 | Matsumoto | |
| 2001/0021994 | A1 | 9/2001 | Nash | |
| 2001/0036224 | A1 | 11/2001 | Demello et al. | |
| 2001/0047272 | A1 | 11/2001 | Frietas et al. | |
| 2002/0003162 | A1 * | 1/2002 | Ferber et al. | 235/14 |
| 2002/0004855 | A1 * | 1/2002 | Cox et al. | 709/328 |
| 2002/0010625 | A1 | 1/2002 | Smith et al. | |
| 2002/0032771 | A1 | 3/2002 | Gledje | |
| 2002/0046084 | A1 | 4/2002 | Steele et al. | |
| 2002/0062251 | A1 | 5/2002 | Anandan et al. | |
| 2002/0069105 | A1 * | 6/2002 | do Rosario Botelho et al. | 705/14 |
| 2002/0083443 | A1 | 6/2002 | Eldering et al. | |
| 2002/0087401 | A1 | 7/2002 | Leapman et al. | |
| 2002/0091568 | A1 | 7/2002 | Kraft et al. | |
| 2002/0138331 | A1 | 9/2002 | Hosea et al. | |
| 2002/0144262 | A1 | 10/2002 | Plotnick et al. | |
| 2002/0147645 | A1 | 10/2002 | Alao et al. | |
| 2002/0152117 | A1 | 10/2002 | Cristofalo et al. | |
| 2002/0156351 | A1 | 10/2002 | Sagel | |
| 2002/0198777 | A1 | 12/2002 | Yuasa | |
| 2002/0199190 | A1 | 12/2002 | Su | |
| 2003/0003929 | A1 | 1/2003 | Himmel et al. | |
| 2003/0023489 | A1 | 1/2003 | McGuire et al. | |
| 2003/0031164 | A1 * | 2/2003 | Nabkel et al. | 370/352 |
| 2003/0040332 | A1 | 2/2003 | Swartz et al. | |
| 2003/0046269 | A1 * | 3/2003 | Yamazaki | 707/1 |
| 2003/0055729 | A1 | 3/2003 | Bezos et al. | |
| 2003/0073455 | A1 | 4/2003 | Hashem et al. | |
| 2003/0110080 | A1 | 6/2003 | Tsutani et al. | |
| 2003/0130887 | A1 * | 7/2003 | Nathaniel | 705/14 |
| 2003/0182567 | A1 | 9/2003 | Barton et al. | |
| 2004/0025174 | A1 | 2/2004 | Cerrato | |
| 2004/0049537 | A1 | 3/2004 | Titmuss | |
| 2004/0093418 | A1 | 5/2004 | Tuomi | |
| 2004/0121774 | A1 | 6/2004 | Rajkotia et al. | |
| 2004/0128347 | A1 * | 7/2004 | Mason et al. | 709/203 |
| 2004/0139204 | A1 | 7/2004 | Ergezinger et al. | |
| 2004/0165006 | A1 * | 8/2004 | Kirby et al. | 345/740 |

(56) References Cited

U.S. PATENT DOCUMENTS

| | | |
|---|---|---|
| 2004/0209602 A1 | 10/2004 | Joyce et al. |
| 2004/0243482 A1* | 12/2004 | Laut ................................ 705/27 |
| 2004/0267723 A1 | 12/2004 | Bharat |
| 2005/0063365 A1 | 3/2005 | Mathew et al. |
| 2005/0120003 A1* | 6/2005 | Drury et al. ........................ 707/3 |
| 2005/0128995 A1 | 6/2005 | Ott et al. |
| 2005/0154840 A1 | 7/2005 | Greer et al. |
| 2005/0196139 A1 | 9/2005 | Blackketter et al. |
| 2005/0204003 A1 | 9/2005 | Vargas et al. |
| 2005/0210243 A1* | 9/2005 | Archard et al. ................ 713/160 |
| 2005/0215236 A1* | 9/2005 | Myka et al. ................. 455/414.1 |
| 2005/0215238 A1 | 9/2005 | Macaluso |
| 2005/0216823 A1 | 9/2005 | Petersen et al. |
| 2005/0222989 A1 | 10/2005 | Haveliwala et al. |
| 2005/0240580 A1 | 10/2005 | Zamir et al. |
| 2005/0251325 A1 | 11/2005 | Kudo et al. |
| 2005/0262043 A1 | 11/2005 | Saito |
| 2005/0262246 A1* | 11/2005 | Menon et al. ................... 709/226 |
| 2005/0270992 A1 | 12/2005 | Sanzgiri et al. |
| 2005/0286463 A1 | 12/2005 | Matsumoto |
| 2005/0289001 A1 | 12/2005 | Parnau |
| 2006/0008918 A1 | 1/2006 | Probert et al. |
| 2006/0039303 A1* | 2/2006 | Singer et al. .................... 370/310 |
| 2006/0041472 A1 | 2/2006 | Lukose et al. |
| 2006/0041638 A1 | 2/2006 | Whittaker et al. |
| 2006/0053077 A1 | 3/2006 | Mourad et al. |
| 2006/0059183 A1 | 3/2006 | Pearson et al. |
| 2006/0064386 A1* | 3/2006 | Marking ........................... 705/59 |
| 2006/0069749 A1 | 3/2006 | Herz et al. |
| 2006/0089128 A1 | 4/2006 | Smith et al. |
| 2006/0089138 A1 | 4/2006 | Smith et al. |
| 2006/0129931 A1* | 6/2006 | Simons et al. .................. 715/705 |
| 2006/0133400 A1* | 6/2006 | Koo et al. ....................... 370/428 |
| 2006/0136742 A1 | 6/2006 | Giobbi |
| 2006/0161599 A1 | 7/2006 | Rosen |
| 2006/0168664 A1 | 7/2006 | Frank et al. |
| 2006/0184421 A1 | 8/2006 | Lipsky et al. |
| 2006/0194569 A1 | 8/2006 | Hsueh |
| 2006/0195260 A1 | 8/2006 | Gronemeyer |
| 2006/0212350 A1 | 9/2006 | Ellis et al. |
| 2006/0245441 A1 | 11/2006 | Chen et al. |
| 2006/0248558 A1 | 11/2006 | Barton et al. |
| 2006/0259473 A1 | 11/2006 | Li et al. |
| 2006/0271425 A1 | 11/2006 | Goodman et al. |
| 2006/0277098 A1 | 12/2006 | Chung et al. |
| 2006/0277271 A1 | 12/2006 | Morse et al. |
| 2006/0293065 A1 | 12/2006 | Chew et al. |
| 2006/0294084 A1 | 12/2006 | Patel et al. |
| 2007/0005419 A1 | 1/2007 | Horvitz et al. |
| 2007/0022098 A1* | 1/2007 | Malik ................................ 707/3 |
| 2007/0022375 A1 | 1/2007 | Walker |
| 2007/0037610 A1 | 2/2007 | Logan |
| 2007/0066226 A1 | 3/2007 | Cleveland et al. |
| 2007/0072622 A1 | 3/2007 | Ishibashi et al. |
| 2007/0088603 A1 | 4/2007 | Jouppi et al. |
| 2007/0088801 A1* | 4/2007 | Levkovitz et al. ............. 709/217 |
| 2007/0102508 A1 | 5/2007 | McIntosh |
| 2007/0130343 A1 | 6/2007 | Pardo-Blazquez et al. |
| 2007/0136742 A1 | 6/2007 | Sparrell |
| 2007/0168461 A1 | 7/2007 | Moore |
| 2007/0174114 A1 | 7/2007 | Bigby et al. |
| 2007/0180144 A1 | 8/2007 | Basu et al. |
| 2007/0201468 A1 | 8/2007 | Jokela |
| 2007/0208728 A1 | 9/2007 | Zhang et al. |
| 2007/0208937 A1 | 9/2007 | Cam-Winget et al. |
| 2007/0233571 A1 | 10/2007 | Eldering et al. |
| 2007/0244750 A1 | 10/2007 | Grannan et al. |
| 2007/0255690 A1 | 11/2007 | Chang et al. |
| 2007/0288310 A1 | 12/2007 | Boos et al. |
| 2007/0288433 A1 | 12/2007 | Gupta et al. |
| 2007/0288543 A1 | 12/2007 | Evans et al. |
| 2008/0004949 A1 | 1/2008 | Flake et al. |
| 2008/0004952 A1 | 1/2008 | Koli |
| 2008/0010144 A1 | 1/2008 | Chatwin et al. |
| 2008/0010157 A1 | 1/2008 | Prakash et al. |
| 2008/0060000 A1 | 3/2008 | Drouet et al. |
| 2008/0077502 A1 | 3/2008 | Boyd |
| 2008/0077741 A1* | 3/2008 | Yasui et al. .................... 711/129 |
| 2008/0082417 A1 | 4/2008 | Publicover |
| 2008/0090513 A1 | 4/2008 | Collins et al. |
| 2008/0091796 A1 | 4/2008 | Story et al. |
| 2008/0092168 A1 | 4/2008 | Logan et al. |
| 2008/0092171 A1 | 4/2008 | Roberts et al. |
| 2008/0098420 A1* | 4/2008 | Khivesara et al. ............... 725/32 |
| 2008/0103971 A1 | 5/2008 | Lukose et al. |
| 2008/0109376 A1 | 5/2008 | Walsh et al. |
| 2008/0133336 A1 | 6/2008 | Altman et al. |
| 2008/0133364 A1 | 6/2008 | Ullah |
| 2008/0140667 A1 | 6/2008 | LaBiche |
| 2008/0140941 A1* | 6/2008 | Dasgupta et al. .............. 711/137 |
| 2008/0141321 A1* | 6/2008 | Kubat et al. .................... 725/110 |
| 2008/0153513 A1 | 6/2008 | Flake et al. |
| 2008/0165711 A1* | 7/2008 | Wyld ............................. 370/310 |
| 2008/0214153 A1 | 9/2008 | Ramer et al. |
| 2008/0214156 A1 | 9/2008 | Ramer et al. |
| 2008/0215426 A1 | 9/2008 | Guldimann et al. |
| 2008/0215623 A1 | 9/2008 | Ramer et al. |
| 2008/0228568 A1 | 9/2008 | Williams et al. |
| 2008/0238610 A1 | 10/2008 | Rosenberg |
| 2008/0243811 A1* | 10/2008 | He et al. ............................ 707/5 |
| 2008/0249987 A1 | 10/2008 | Ogasawara |
| 2008/0275771 A1 | 11/2008 | Levine |
| 2008/0276266 A1 | 11/2008 | Huchital et al. |
| 2008/0281940 A1 | 11/2008 | Coxhill |
| 2008/0288355 A1 | 11/2008 | Rosen |
| 2008/0290987 A1 | 11/2008 | Li |
| 2008/0293375 A1 | 11/2008 | Swanburg |
| 2008/0301149 A1* | 12/2008 | Malcolm ......................... 707/10 |
| 2008/0313033 A1 | 12/2008 | Guo et al. |
| 2009/0006183 A1 | 1/2009 | Paintin et al. |
| 2009/0011740 A1 | 1/2009 | Aggarwal et al. |
| 2009/0011744 A1 | 1/2009 | Daley et al. |
| 2009/0012861 A1 | 1/2009 | Krishnaswamy et al. |
| 2009/0013024 A1 | 1/2009 | Aggarwal et al. |
| 2009/0013051 A1 | 1/2009 | Renschler et al. |
| 2009/0044246 A1 | 2/2009 | Sheehan et al. |
| 2009/0048977 A1 | 2/2009 | Aggarwal et al. |
| 2009/0049090 A1 | 2/2009 | Shenfield et al. |
| 2009/0061884 A1 | 3/2009 | Rajan et al. |
| 2009/0070700 A1* | 3/2009 | Johanson ....................... 715/776 |
| 2009/0076882 A1* | 3/2009 | Mei et al. ......................... 705/10 |
| 2009/0077220 A1* | 3/2009 | Svendsen et al. .............. 709/224 |
| 2009/0083147 A1* | 3/2009 | Paila et al. ....................... 705/14 |
| 2009/0089352 A1* | 4/2009 | Davis et al. .................... 709/201 |
| 2009/0094248 A1* | 4/2009 | Petersen ......................... 707/10 |
| 2009/0124241 A1 | 5/2009 | Krishnaswamy et al. |
| 2009/0125321 A1 | 5/2009 | Charlebois et al. |
| 2009/0125462 A1 | 5/2009 | Krishnaswamy et al. |
| 2009/0125517 A1 | 5/2009 | Krishnaswamy et al. |
| 2009/0125585 A1 | 5/2009 | Krishnaswamy et al. |
| 2009/0157512 A1 | 6/2009 | King |
| 2009/0177530 A1 | 7/2009 | King et al. |
| 2009/0216847 A1 | 8/2009 | Krishnaswamy et al. |
| 2009/0234708 A1 | 9/2009 | Heiser, II et al. |
| 2009/0319329 A1 | 12/2009 | Aggarwal et al. |
| 2010/0010733 A1 | 1/2010 | Krumm |
| 2010/0030713 A1 | 2/2010 | Simpson et al. |
| 2010/0057563 A1 | 3/2010 | Rauber et al. |
| 2010/0057924 A1 | 3/2010 | Rauber et al. |
| 2010/0064354 A1 | 3/2010 | Irvine |
| 2010/0217881 A1 | 8/2010 | Iino et al. |
| 2010/0293057 A1 | 11/2010 | Haveliwala et al. |
| 2011/0282964 A1 | 11/2011 | Krishnaswamy et al. |
| 2011/0283355 A1 | 11/2011 | Livshits et al. |
| 2012/0005020 A1 | 1/2012 | Ramer et al. |

FOREIGN PATENT DOCUMENTS

| | | |
|---|---|---|
| CN | 1643886 A | 7/2005 |
| CN | 1645366 A | 7/2005 |
| CN | 1692352 A | 11/2005 |
| CN | 1714360 A | 12/2005 |
| CN | 1751470 A | 3/2006 |
| CN | 101019118 A | 8/2007 |

(56) References Cited

FOREIGN PATENT DOCUMENTS

| | | |
|---|---|---|
| EP | 1111824 A2 | 6/2001 |
| EP | 1524611 A2 | 4/2005 |
| EP | 1551195 A1 | 7/2005 |
| EP | 1638047 A1 | 3/2006 |
| FR | 2878670 | 6/2006 |
| GB | 2430524 A | 3/2007 |
| JP | 1162028 A | 6/1989 |
| JP | 3122770 A | 5/1991 |
| JP | 9051314 A | 2/1997 |
| JP | 10063618 A | 3/1998 |
| JP | 10254807 A | 9/1998 |
| JP | 10294676 A | 11/1998 |
| JP | 11136365 A | 5/1999 |
| JP | 11312190 A | 11/1999 |
| JP | 2000040049 A | 2/2000 |
| JP | 2000148864 A | 5/2000 |
| JP | 2000155764 A | 6/2000 |
| JP | 2001014332 A | 1/2001 |
| JP | 2001117977 A | 4/2001 |
| JP | 2001128097 A | 5/2001 |
| JP | 2001203811 A | 7/2001 |
| JP | 2001222491 A | 8/2001 |
| JP | 2001224055 A | 8/2001 |
| JP | 2001238192 A | 8/2001 |
| JP | 2001251576 A | 9/2001 |
| JP | 2001266010 A | 9/2001 |
| JP | 2001273298 A | 10/2001 |
| JP | 2001306934 A | 11/2001 |
| JP | 2002135221 A | 5/2002 |
| JP | 2002197342 A | 7/2002 |
| JP | 2002197356 A | 7/2002 |
| JP | 2002199460 A | 7/2002 |
| JP | 2002271855 A | 9/2002 |
| JP | 2002531895 A | 9/2002 |
| JP | 2002325069 A | 11/2002 |
| JP | 2002333853 A | 11/2002 |
| JP | 2002334248 A | 11/2002 |
| JP | 2002366819 A | 12/2002 |
| JP | 2003018085 A | 1/2003 |
| JP | 2003043970 A | 2/2003 |
| JP | 2003050820 A | 2/2003 |
| JP | 2003050932 A | 2/2003 |
| JP | 2003069626 A | 3/2003 |
| JP | 2003196128 A | 7/2003 |
| JP | 2003196305 A | 7/2003 |
| JP | 2003208381 A | 7/2003 |
| JP | 2003526824 A | 9/2003 |
| JP | 2003283652 A | 10/2003 |
| JP | 2003316742 A | 11/2003 |
| JP | 2004005080 A | 1/2004 |
| JP | 2004007850 A | 1/2004 |
| JP | 2004013426 A | 1/2004 |
| JP | 2004505522 A | 2/2004 |
| JP | 2004086560 A | 3/2004 |
| JP | 2004138692 A | 5/2004 |
| JP | 2004151954 A | 5/2004 |
| JP | 2004514217 A | 5/2004 |
| JP | 2004514218 A | 5/2004 |
| JP | 2004265375 A | 9/2004 |
| JP | 2004294264 A | 10/2004 |
| JP | 2004320153 A | 11/2004 |
| JP | 2004357311 A | 12/2004 |
| JP | 2005503598 A | 2/2005 |
| JP | 2005070889 A | 3/2005 |
| JP | 2005107728 A | 4/2005 |
| JP | 2005513887 A | 5/2005 |
| JP | 2005175865 A | 6/2005 |
| JP | 2006031204 A | 2/2006 |
| JP | 2006053767 A | 2/2006 |
| JP | 2006120135 A | 5/2006 |
| JP | 2006185169 A | 7/2006 |
| JP | 2006203593 A | 8/2006 |
| JP | 2006215956 A | 8/2006 |
| JP | 2006252354 A | 9/2006 |
| JP | 2006261956 A | 9/2006 |
| JP | 2006524857 A | 11/2006 |
| JP | 2006526817 A | 11/2006 |
| JP | 2006527960 A | 12/2006 |
| JP | 2007017841 A | 1/2007 |
| JP | 2007048226 A | 2/2007 |
| JP | 2007507801 A | 3/2007 |
| JP | 2007089131 A | 4/2007 |
| JP | 2007094560 A | 4/2007 |
| JP | 2007517321 A | 6/2007 |
| JP | 2007241921 A | 9/2007 |
| JP | 2007263972 A | 10/2007 |
| JP | 2007264764 A | 10/2007 |
| JP | 2007271305 A | 10/2007 |
| JP | 2007280363 A | 10/2007 |
| JP | 2008525875 A | 7/2008 |
| JP | 2008545200 A | 12/2008 |
| JP | 2008546075 A | 12/2008 |
| JP | 2009522960 | 6/2009 |
| KR | 1020010024837 | 3/2001 |
| KR | 1020010042008 | 5/2001 |
| KR | 20040040779 A | 5/2004 |
| KR | 20040040799 A | 5/2004 |
| KR | 1020050074310 | 7/2005 |
| KR | 20060017990 A | 2/2006 |
| KR | 20070038146 | 4/2007 |
| WO | WO9726729 A2 | 7/1997 |
| WO | 9936853 A1 | 7/1999 |
| WO | 9950745 A1 | 10/1999 |
| WO | WO9967698 A2 | 12/1999 |
| WO | WO0035216 A1 | 6/2000 |
| WO | WO0128273 A1 | 4/2001 |
| WO | 0172102 A2 | 10/2001 |
| WO | 0207493 A2 | 1/2002 |
| WO | WO-02063426 A2 | 8/2002 |
| WO | WO03053080 | 6/2003 |
| WO | WO03079655 A1 | 9/2003 |
| WO | WO2004081793 A1 | 9/2004 |
| WO | WO2004114155 A1 | 12/2004 |
| WO | WO-2005033979 A1 | 4/2005 |
| WO | WO2005065229 A2 | 7/2005 |
| WO | WO2006014562 A1 | 2/2006 |
| WO | WO2006017364 | 2/2006 |
| WO | WO2006067652 A2 | 6/2006 |
| WO | WO2006135522 A2 | 12/2006 |
| WO | WO2007015183 | 2/2007 |
| WO | 2007030093 | 3/2007 |
| WO | 2007033358 A2 | 3/2007 |
| WO | WO2007045257 A1 | 4/2007 |
| WO | WO2007058683 A1 | 5/2007 |
| WO | WO2007082190 A2 | 7/2007 |

OTHER PUBLICATIONS

Microsoft, SQL Server 2000 Databases on the Desktop [online] 2004 [retrieved on May 25, 2012]. Retrieved from the Internet:< URL:http://msdn.microsoft.com/en-us/library/aa224749(v=sql.80).aspx>.

Ulucan S, "A Recommendation System Combining Context-Awareness and User Profiling in Mobile Environment" [online],Dec. 2005, 122 Pages.[retrieved on Dec. 12, 2011]. Retrieved from the internet<URL:http://etd.lib.metu.edu.tr/upload/12606845/index.pdf>.

* cited by examiner

METHOD AND SYSTEM FOR MULTI-LEVEL DISTRIBUTION INFORMATION CACHE MANAGEMENT IN A MOBILE ENVIRONMENT

This Application both claims to priority, and incorporates the entire content of, U.S. Provisional Patent Application Nos. 61/013,941 entitled "METHODS AND SYSTEMS FOR DETERMINING GEOGRAPHIC POINTS OF INTEREST AND USER PROFILE INFORMATION" and filed on Dec. 14, 2007; 61/013,944 entitled "NEAR FIELD COMMUNICATION TRANSACTIONS WITH USER PROFILE UPDATES IN A MOBILE ENVIRONMENT" and filed on Dec. 14, 2007; 61/013,949 entitled "NEAR FIELD COMMUNICATION IN A MOBILE ENVIRONMENT" and filed on Dec. 14, 2007; and 61/080,988 entitled "METHOD AND SYSTEM FOR MULTI-LEVEL DISTRIBUTION INFORMATION CACHE MANAGEMENT IN A MOBILE ENVIRONMENT" and filed on Jul. 15, 2008.

This Application also incorporates the entire content of U.S. Non-Provisional patent application Ser. Nos.: 12/268,905 entitled "USER PROFILE MATCH INDICATION IN A MOBILE ENVIRONMENT METHODS AND SYSTEMS" and filed on Nov. 11, 2008; Ser. No. 12/268,914 entitled "METHOD AND SYSTEM USING KEYWORD VECTORS AND ASSOCIATED METRICS FOR LEARNING AND PREDICTION OF USER CORRELATION OF TARGETED CONTENT MESSAGES IN A MOBILE ENVIRONMENT" and filed on Nov. 11, 2008; Ser. No. 12/268,927 entitled "METHOD AND SYSTEM FOR USING A CACHE MISS STATE MATCH INDICATOR TO DETERMINE USER SUITABILITY OF TARGETED CONTENT MESSAGES IN A MOBILE ENVIRONMENT" and filed on Nov. 11, 2008; Ser. No. 12/268,939 entitled "METHOD AND SYSTEM FOR MESSAGE VALUE CALCULATION IN A MOBILE ENVIRONMENT" and filed on Nov. 11, 2008; Ser. No. 12/268,945 entitled "METHOD AND SYSTEM USING KEYWORD VECTORS AND ASSOCIATED METRICS FOR LEARNING AND PREDICTION OF USER CORRELATION OF TARGETED CONTENT MESSAGES IN A MOBILE ENVIRONMENT" and filed on Nov. 11, 2008; Ser. No. 12/271,638 entitled "METHODS AND SYSTEMS FOR DETERMINING GEOGRAPHIC POINTS OF INTEREST AND USER PROFILE INFORMATION" and filed on Nov. 14, 2008; Ser. No. 12/333,024 entitled "NEAR FIELD COMMUNICATION TRANSACTIONS WITH USER PROFILE UPDATES IN A MOBILE ENVIRONMENT" and filed Dec. 11, 2008; and Ser. No. 12/333,060 entitled "NEAR FIELD COMMUNICATION TRANSACTIONS IN A MOBILE ENVIRONMENT" and filed Dec. 11, 2008.

FIELD OF THE DISCLOSURE

This disclosure relates to wireless communications. In particular, the present disclosure relates to wireless communications systems usable for targeted message delivery and related transactions.

BACKGROUND

Mobile Targeted-Content-Message (TCM)-enabled systems can be described as systems capable of delivering targeted content information, such as local weather reports and advertisements targeted to a particular demographic, to wireless communication devices (WCDs), such as cellular telephones or other forms of wireless access terminals (W-ATs). Such systems may also provide a better user experience by presenting non-intrusive targeted-content-messages that are likely to be of interest to a user.

An example of a mobile TCM-enabled system is a mobile targeted advertisement system (MAS) capable of delivering advertisements to wireless communication devices (WCDs). Generally, a MAS can provide such things as an advertisement sales conduit for a cellular provider to provide advertisements on a W-AT, as well as some form of analytical interface to report back on the performance of various advertisement campaigns. A particular consumer benefit of mobile advertising is that it can provide alternate/additional revenue models for wireless services so as to allow more economical access to the wireless services to those consumers willing to accept advertisements. For example, the revenue generated through advertising may allow W-AT users to enjoy various services without paying the full subscription price usually associated with such services.

In order to increase the effectiveness of TCMs on W-ATs, it can be beneficial to provide targeted information, i.e., TCMs which are deemed likely to be well received by, and/or of likely interest to, a particular person or a designated group of people.

Targeted-Content-Message (TCM) information can be based on immediate needs or circumstances, such as a need to find emergency roadside service or the need for information about a travel route. Targeted-Content-Message information can also be based on specific products or services (e.g., games) for which a user has demonstrated past interest, and/or based on demographics, for example, a determination of an age and income group likely to be interested in a particular product. Targeted Advertisements are an example of TCMs.

Targeted advertisements can provide a number of advantages (over general advertisements) including: (1) in an economic structure based on cost per view, an advertiser may be able to increase the value of his advertising budget by limiting paid advertising to a smaller set of prospects; and (2) as targeted advertisements are likely to represent areas of interest for a particular user, the likelihood that users will respond positively to targeted advertisements increases substantially.

Unfortunately, the information that makes some forms of targeted advertising possible may be restricted due to government regulations and the desire of people to limit the dissemination of their personal information. For example, in the US, such government restrictions include the Graham-Leach-Bliley Act (GLBA), Title 47 of the United States Code, Section 222—"Privacy of Customer Information." Common carriers also may be restricted from using personal information about their subscribers for marketing purposes. For example, the GLBA prohibits access to individually identifiable customer information, as well as the disclosure of location information, without the express prior authorization of the customer.

Thus, new technology for delivering targeted advertising in a wireless communication environment is desirable.

SUMMARY OF THE DISCLOSURE

In an exemplary embodiment, a method for updating memory content in a mobile client includes maintaining a list of first attributes relating to a set of first messages on the mobile client, wherein each of the set of first messages resides on the mobile client, maintaining a list of second attributes relating to set of second messages on the mobile client, wherein each of the set of second messages does not reside on the mobile client, identifying target attributes associated with a message request by the mobile client, selecting by the mobile client a selected message from one of the set of first messages and the set of second messages by applying a set of selection rules to the target attributes, and in the situation where a second message is selected, requesting the selected second message from a remote server using a wireless link.

In another exemplary embodiment, a method for determining display information in a first device having at least two sources of information including a first source and a second source, and wherein the second source has a substantially variable data throughput connectivity, includes selecting by the first device a message from either the first source or the second source based on the data throughput connectivity of the second source to the first device, the message not being an indicator of the data throughput connectivity of the second source or a null message, and displaying the selected message to a user.

In another exemplary embodiment, a mobile client capable of updating its internal memory includes means for maintaining a list of first attributes relating to a set of first messages on the mobile client, wherein each of the set of first messages resides on the mobile client, a means for maintaining a list of second attributes relating to set of second messages on the mobile client, wherein each of the set of second messages does not reside on the mobile client, a means for identifying target attributes associated with a message request by the mobile client, a means for selecting a selected message from one of the set of first messages and the set of second messages by applying a set of selection rules to the target attributes, and in the situation where a second message is selected, requesting the selected second message from a remote server using a wireless link.

In another exemplary embodiment, a mobile client capable of determining display information and having at least two sources of information including a first source and a second source, and wherein the second source has a substantially variable data throughput connectivity includes a means for selecting a message from either the first source or the second source based on the data throughput connectivity of the second source to the first device, the message not being an indicator of the data throughput connectivity of the second source or a null message, and a means for displaying the selected message to a user.

In another exemplary embodiment, a mobile client capable of updating its internal memory includes first processing circuitry configured to maintain a list of first attributes relating to a set of first messages on the mobile client, wherein each of the set of first messages resides on the mobile client, the first processing circuitry also configured to maintain a list of second attributes relating to set of second messages on the mobile client, wherein each of the set of second messages does not reside on the mobile client, second circuitry configured to identify target attributes associated with a message request by the mobile client; third circuitry configured to select a selected message from one of the set of first messages and the set of second messages by applying a set of selection rules to the target attributes, and in the situation where a second message is selected, requesting the selected second message from a remote server using a wireless link.

In another exemplary embodiment, a mobile client capable of determining display information and having at least two sources of information including a first source and a second source, and wherein the second source has a substantially variable data throughput connectivity includes first circuitry configured to select a message from either the first source or the second source based on the data throughput connectivity of the second source to the first device, the message not being an indicator of the data throughput connectivity of the second source or a null message, and display circuitry configured to display the selected message to a user.

In another exemplary embodiment, a computer program product includes a computer-readable medium that itself includes instructions for maintaining a list of first attributes relating to a set of first messages on the mobile client, wherein each of the set of first messages resides on the mobile client, maintaining a list of second attributes relating to set of second messages on the mobile client, wherein each of the set of second messages does not reside on the mobile client, identifying target attributes associated with a message request by the mobile client, selecting by the mobile client a selected message from one of the set of first messages and the set of second messages by applying a set of selection rules to the target attributes, and in the situation where a second message is selected, requesting the selected second message from a remote server using a wireless link.

In another exemplary embodiment, a computer program product includes a computer-readable medium that itself includes instructions for: selecting by the first device a message from either the first source or the second source based on the data throughput connectivity of the second source to the first device, the message not being an indicator of the data throughput connectivity of the second source or a null message, and displaying the selected message to a user.

BRIEF DESCRIPTION OF THE DRAWINGS

The features and nature of the present disclosure will become more apparent from the detailed description set forth below when taken in conjunction with the drawings in which reference characters identify corresponding items and processes throughout.

DETAILED DESCRIPTION

Figure 1:
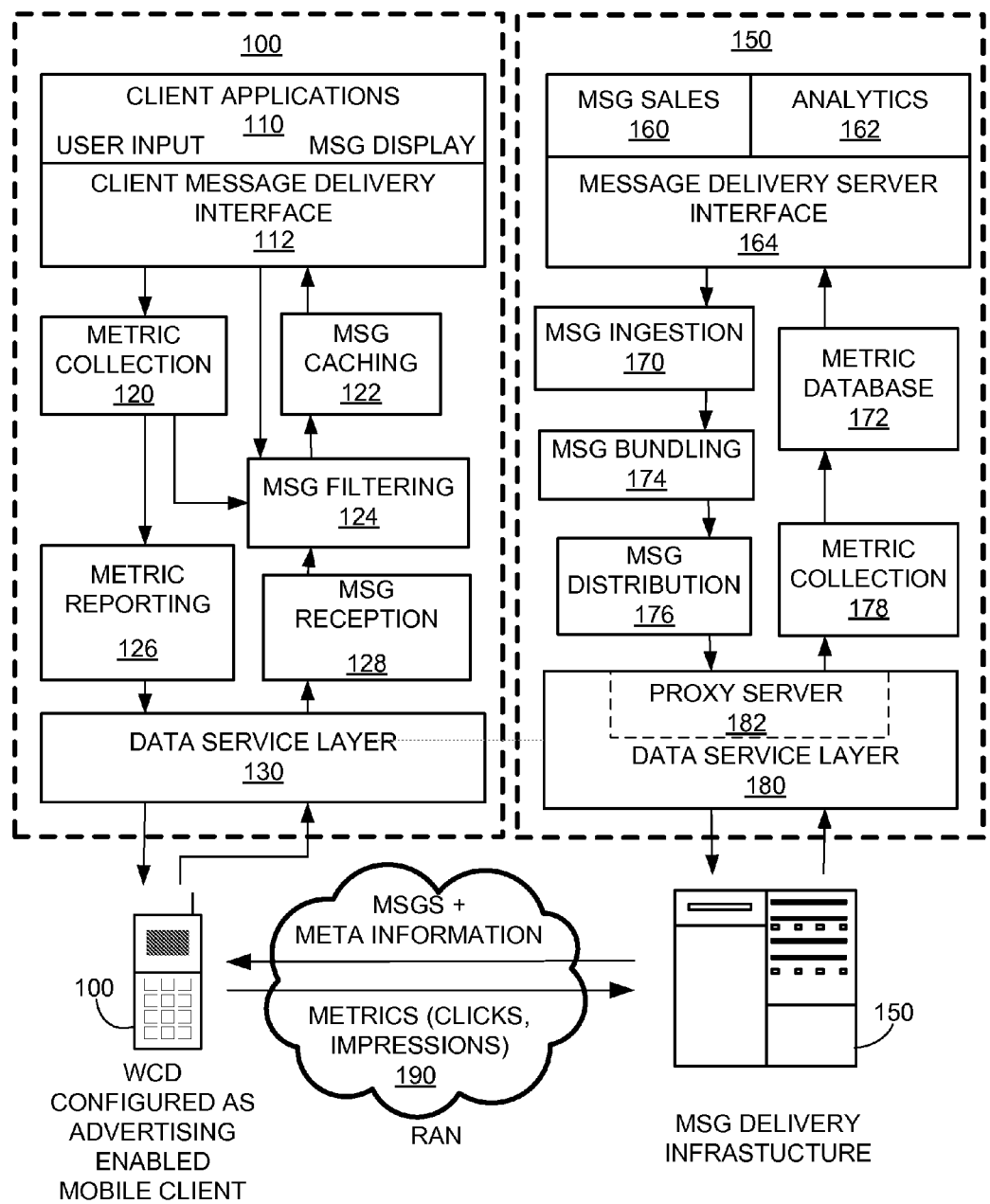
FIG. 1 is a diagram showing the interaction between an exemplary wireless access terminal (W-AT) and an advertising infrastructure. An advertising infrastructure is an example of a targeted-content-message-processing infrastructure.

The disclosed methods and systems below may be described generally, as well as in terms of specific examples and/or specific embodiments. For instances where references are made to detailed examples and/or embodiments, it should be appreciated that any of the underlying principals described are not to be limited to a single embodiment, but may be expanded for use with any of the other methods and systems described herein as will be understood by one of ordinary skill in the art unless otherwise stated specifically.

For the purpose of example, the present disclosure is often depicted as being implemented in (or used with) a cellular telephone. However, it is to be appreciated that the methods and systems disclosed below may relate to both mobile and non-mobile systems including mobile phones, PDAs and laptop PCs, as well as any number of specially equipped/modified music players (e.g., a modified Apple iPOD®), video players, multimedia players, televisions (both stationary, portable and/or installed in a vehicle), electronic game systems, digital cameras and video camcorders.

The terms and respective definitions/descriptions below are provided as a reference to the following disclosure. Note, however, that when applied to certain embodiments, some of the applied definitions/descriptions may be expanded or may otherwise differ with some of the specific language provided below as may be apparent to one of ordinary skill and in light of the particular circumstances.

TCM—Targeted-Content-Message. An advertisement can be an example of a Targeted-Content-Message.

M-TCM-PS—Mobile Targeted-Content-Message Processing System

MAS—Mobile advertising system, which may be considered a form of M-TCM-PS.

UPG—User Profile Generation Agent

M-TCM—Mobile TCM-Enabled Client

MAEC—Mobile advertising enabled client. This can be an example of a Mobile TCM-Enabled Client Mobile TCM Provider (M-TCM-P)—A person or an entity that may want to display a targeted-content-message through a targeted-content-message processing system.

Advertiser—A person or an entity that may want to display advertisements through a mobile advertising system (MAS). An advertiser may provide the advertisement data along with respective targeting and playback rules, which may in some instances form advertisement metadata to a MAS. An advertiser is an example of a Mobile TCM Provider.

TCM Metadata—A term used to identify data that can be used to provide additional information about a respective Targeted-Content-Message (TCM).

Advertisement Metadata—A term used to identify data that may be used to provide additional information about a respective advertisement. This may include, but is not limited to, mime type, advertisement duration, advertisement viewing start time, advertisement viewing end time, etc. Respective advertisement targeting and playback rules provided by the advertiser may also get attached to an advertisement as metadata for the advertisement. Advertisement Metadata is an example of TCM metadata.

Application Developer—A person who or an entity that develops an application for the mobile advertising enabled client (MAEC) that can feature advertisements.

System Operator—A person who or entity that operates a MAS.

Third Party Inference Rule Provider—A third party (other than a system operator) who may provide user profile inference rules to be used by a User Profile Generation Agent User Profile Generation Agent—A functional unit at the client that may receive various pertinent data, such as advertisement inference rules, user behavior from a metric collection agent, location data from a GPS, explicit user preferences entered by a user (if any) and/or user behavior from other client applications, then generate various user profile elements. A User Profile Generation Agent may continuously update a profile based upon information gathered that may be used to characterize user behavior.

User Behavior Synthesizer—A functional device or agent within a User Profile Generation Agent that may be used to receive a variety of data, such as user behavior information, location information and user profile inference rules to generate synthesized profile attributes.

Profile Element Refiner—A functional device or agent within a User Profile Generation Agent that may receive profile attributes generated by a user behavior synthesizer as well as a number of user profile inference rules. A Profile Element Refiner may refine profile attributes, process them through queries sent to a profile attribute processor, and generate user profile elements.

Profile Attribute Processor—A server and/or resident agent of a server that may process profile attribute requests that may require data-intensive lookups, and then respond with refined profile attributes.

TCM Filtering Agent—A client agent that may receive a number of TCMs with their respective meta-data, TCM targeting rules and TCM filtering rules, then store some or all of the TCMs in a TCM-cache memory. The filtering agent may also take a user profile as input from the User Profile Generation Agent.

Advertisement Filtering Agent—A client agent that may receive a number of advertisements with their respective metadata, advertisement targeting rules and advertisement filter rules, then store some or all of the received advertisements in an advertisement cache memory. The filtering agent may also take a user profile as input from the User Profile Generation Agent. An advertising filtering agent is an example of a TCM filtering agent.

TCM Cache Manager—A client agent that can maintain a targeted content-message cache. A cache manager may take cached targeted content-messages from a filtering agent, and respond to content-message requests from other applications on the access terminal. Note that, for the present disclosure, the term 'cache' can refer to a very broad set of memory configurations, include a single storage device, a set of distributed storage devices (local and/or not local) and so on. Generally, it should be appreciated that the term 'cache' can refer to any memory usable to speed up information display, processing or data transfer.

Advertisement Cache Manager—A client agent that can maintain an advertisement cache. A cache manager may take cached advertisements from a filtering agent and respond to advertisement requests from other applications on the access terminal. An advertisement cache manager is an example of a TCM cache manager.

User Profile Attributes—User behavior, interests, demographic information, and so on that may be synthesized by a user behavior synthesizer to form profile attributes, which may be viewed as intermediate pre-synthesized forms of data that may be further processed and refined by a profile element refiner into more refined user profile elements.

User Profile Elements—Items of information used to maintain a user profile, which may include various types of data useful to categorize or define the user's interests, behavior, demographic, etc.

TCM Targeting Rules—These may include rules related to the presentation of a targeted-content-message specified by a Mobile TCM Provider.

Advertisement Targeting Rules—These may include rules specified by advertisers to impose rules/restrictions on how advertisements may be displayed and/or rules to target an advertisement towards a particular segment of users. They may be specific to a number of criteria, such as an advertisement campaign or advertisement group. Advertisement Targeting Rules are an example of TCM Targeting Rules.

TCM Playback Rules—These can include display rules specified by a client application while querying a TCM Cache Manager for TCMs to display in the context of their application.

Advertisement Playback Rules—These can include display rules specified by a client application while querying an Advertisement Cache Manager for advertisements to display in the context of their application. Advertisement Playback Rules are an example of TCM Playback Rules.

TCM Filter Rules—These can include rules upon which TCMs may be filtered. Typically, a system operator may specify these rules.

Advertisement Filter Rules—These can include rules upon which advertisements may be filtered. Typically, a system operator may specify these rules. Advertisement Filter Rules are an example of TCM-Filter-Rules.

User Profile Element Inference Rules—These can include rules, specified by a system operator (and/or a third party), that may be used to determine one or more processes usable to build a user profile from demographic and behavioral data.

TCM Telescoping—A display or presentation function for a TCM whereby additional presentation material may presented to a user in response to a user request.

Advertisement Telescoping—An advertisement display or presentation function whereby additional presentation material may be presented to a user in response to a user request. Advertisement Telescoping is an example of TCM telescoping.

As mentioned above, various regulations regarding telecommunications and privacy can make the delivery of messages with targeted content difficult. However, the present disclosure can provide a variety of solutions to deliver targeted content to wireless access terminals (W-ATs), e.g., cellular phones, while paying attention to privacy concerns.

One of the many approaches of this disclosure used to alleviate privacy issues includes offloading a variety of processes onto a user's W-AT that may, in turn, be used to generate a set of information that likely characterizes the user, i.e., it can create a "user profile" of the user on the W-AT itself. Accordingly, targeted-content-messages, such as advertisements and other media, may be directed to the user's W-AT based on the user's profiles without exposing potentially sensitive customer information to the outside world.

The various disclosed methods and systems may be used in a Mobile TCM Processing System (M-TCM-PS) (and, in particular, in a Mobile Advertising System (MAS)), which for the present disclosure may include an end-to-end communication system usable to deliver targeted-content-messages (or in particular, advertisements) to TCM-Enabled W-ATs (or in particular Mobile Advertising Enabled W-ATs). A M-TCM-PS may also provide an analytical interface capable of reporting on the performance of a particular advertisement campaign. Accordingly, an appropriately constructed M-TCM-PS may provide a better consumer experience by presenting only non-intrusive advertisements that are likely to be of interest to consumers.

While the following examples are generally directed to content, such as commercial advertising, a broader scope of directed content is envisioned. For example, instead of directed advertisements, content such as stock reports, weather reports, religious information, news and sports information specific to a user's interests, and so on is envisioned within the bounds of this disclosure. For example, while directed content may be an advertisement, a score for a sports event and a weather report may just as easily be directed content. Accordingly, devices such as advertising servers may be viewed as more general content servers, and advertising-related agents and devices may be more generally thought of as content-related agents and servers. All further discussion is provided in the context of advertisements as an example of a TCM (Targeted Content Message), and it should be noted that such discussion is applicable to Targeted-Content-Messages in general.

FIG. 1 is a diagram of some of the various functional elements of an M-TCM-PS showing the interaction between a TCM-enabled W-AT 100 with a communication network having an advertising infrastructure. As shown in FIG. 1, the exemplary M-TCM-PS includes the TCM-enabled mobile client/W-AT 100, a radio-enabled network (RAN) 190 and an advertising infrastructure 150 embedded in the network associated with the wireless WAN infrastructure (not shown in FIG. 1). For example, the messaging infrastructure could be available at a remote server not geographically co-located with a cellular base station in the wireless WAN.

As shown in FIG. 1, the W-AT can include a client applications device 110, a client message delivery interface 112, a metric collection agent 120, a message caching manager 122, a message filtering agent 124, a metric reporting agent 126, a message reception agent 120 and a data service layer device 130. The message delivery infrastructure 150 can include a TCM sales agent 160, an analytics agent 162, a message delivery server interface 164, a message ingestion agent 170, a message bundling agent 174, a message distribution agent 176, a metric database 172, a metric collection agent 178, and having a proxy server 182.

In operation, the "client side" of the M-TCM-PS can be handled by the W-AT 100 (depicted on the left-hand side of FIG. 1). In addition to traditional applications associated with W-ATs, the present W-AT 100 may have TCM-related applications at the applications level 110, which in turn may be linked to the rest of the M-TCM-PS via a client advertisement interface 112. In various embodiments, the client message delivery interface 112 may provide for metrics/data collection and management. Some of the collected metrics/data may be transferred to the metric reporting agent 126 and/or to the W-AT's data service layer 130 (via the metric collection agent 120), without exposing individually identifiable customer information, for further distribution to the rest of the M-TCM-PS.

The transferred metrics/data may be provided through the RAN 190 to the message delivery infrastructure 150 (depicted on the right-hand side of FIG. 1), which for the present example includes a variety of TCM-related and privacy-protecting servers. The message delivery infrastructure 150 can receive the metrics/data at a data service layer 180, which in turn may communicate the received metrics/data to a number of metrics/data collection servers (here metric collection agent 178) and/or software modules. The metrics/data may be stored in the metric database 172, and provided to the message delivery server interface 164 where the stored metrics/data may be used for marketing purposes, e.g., advertising, sales and analytics. Note that information of interest may include, among other things, user selections at a W-AT and requests for advertisements executed by the W-AT in response to instructions provided by the message delivery infrastructure 150.

The message delivery server interface 164 can provide a conduit for supplying advertisements (advertising ingestion), bundling advertisements, determining a distribution of advertisements and sending advertising through the data service layer 180 of the message delivery infrastructure 150 to the rest of the M-TCM-PS network. The a message delivery infrastructure 150 can provide the W-AT 100 with the appropriate TCMs, and metadata for the TCMs. The W-AT 100 can be instructed by the message delivery infrastructure 150 to select TCMs based on any available metadata according to rules provided by the message infrastructure 150.

As mentioned above, the exemplary W-AT 100 may be enabled to generate, in whole or in part, a user profile for the W-AT's user that, in turn, may be useful to enable the M-TCM-PS to deliver TCMs of likely interest to the user. This may result in better "click-through rates" for various advertisement campaigns and other TCM delivery campaigns. However, as mentioned above, generating a user profile may raise privacy concerns because of the potentially sensitive nature of data that may reside in the user profile.

Nevertheless, as will be shown below in the various device and system embodiments, privacy concerns may be alleviated by enabling a user's W-AT to generate a user profile while subsequently limiting the user profile to the confines of the user's W-AT except in very limited (and controlled) circumstances.

Figure 2:
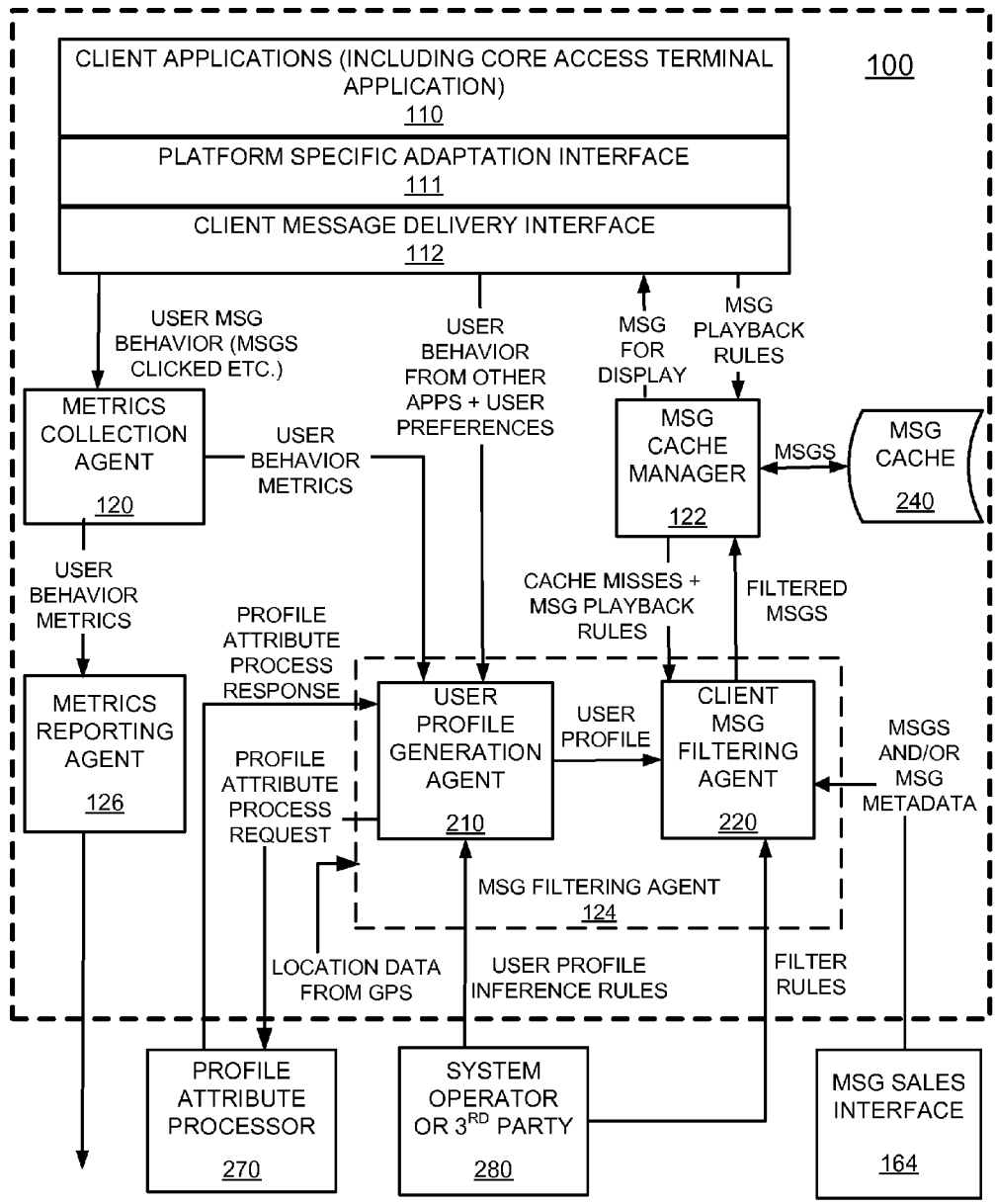
FIG. 2 is schematic block diagram showing the operation of an exemplary W-AT having an on-board user profile generation agent.

FIG. 2 is a block diagram showing operational details of the exemplary W-AT of FIG. 1 configured to generate and use a user profile. As shown in FIG. 2, the exemplary W-AT includes a processing system capable of processing a number of applications including a number of core client applications and a client message delivery interface. Note that some components, such as the message reception agent 128 and data service layer 130, are omitted from FIG. 2 for simplicity of explanation for the functions relevant to FIG. 2. The exemplary W-AT 100 of FIG. 2 is shown having a platform specific adaptation interface 111 between the client message delivery interface 112 and the client applications device 110, and a message filtering agent 124 having a user profile generation agent 210 and a client message filtering agent 220 responsive to the user profile generation agent 210. A cache memory 240 is shown in communication with the cache manager 122. External devices, e.g., profile attribute processor 270, system operator (or $3^{rd}$ party) 280 and message sales interface 164, are shown in communication with the client message filtering agent 124. Devices 270, 280 and 164 are generally not part of a W-AT, but likely to reside in another portion of a M-TCM-PS network.

While the various components 110-240 of the W-AT 100 are depicted as separate functional blocks, it should be appreciated that each of these functional blocks may take a variety of forms including separate pieces of dedicated logic, separate processors running separate pieces of software/firmware, collections of software/firmware residing in a memory and being operated upon by a single processor, and so on.

In operation, the client applications device 110 may perform any number of functional applications useful for telecommunications (e.g., calls and text messaging) or other tasks (e.g., games) using the platform specific adaptation interface 111 to interface with the client message delivery interface 112. The client message delivery interface 112, in turn, can be used to allow the W-AT 100 to perform a number of useful processes, such as monitor user behavior and pass user-related information to the user profile generation agent 210.

In addition to receiving information directly from the client applications interface, the user profile generation agent 210 may accrue user behavior information from the metrics collection agent 120, which itself may receive the same or different information from the client message delivery interface 112. Examples of user behavior may include TCM-related responses, such as advertisement clicks and other metrics indicating types and frequency of usage. Other user behavior information may include direct user preferences or authorizations.

The metrics collection agent 120 may provide metrics/data to the metrics reporting agent 126, which in turn may provide the metrics/data information to other components of M-TCM-PS (discussed below) that may be internal or external to a W-AT.

The profile attribute processor 270 can process incoming profile attribute processing requests from the W-AT 100 that require (or can otherwise benefit from) data-intensive lookups and respond with refined profile attributes to the user profile generation agent 210.

One function of the user profile generation agent 210 may include providing TCMs that may be provided to the W-AT's user in accordance with relevant filter rules, as well as TCM data and TCM metadata from the sales interface 164. The filtering agent 220 may also provide filtered messages to the cache manager 122, which in turn may store and later provide such messages (via cache memory 240) for presentation to the user.

A user profile generation agent can be any collection of hardware and/or software residing in a Mobile Advertising Enabled W-AT that can be used to collect user behavior information. Potential information sources may include, but are not limited to, applications residing on the user's W-AT, public information available in various accessible databases, previous user responses to advertisements, location data from a resident GPS radio and explicit user preferences entered by the user (if any). Any user profile information gathered may then be processed/synthesized to generate user profile attributes or elements, which may better characterize the user while using less memory resources.

In various embodiments, user profile inference rules provided by a system operator (and/or a third party) may drive the particular actions of a W-AT's user profile generation agent. Note that these rules may be of a number of types, including: (1) Basic Rules, which include actions to be performed by a user profile generation agent on a pre-determined schedule associated with each action; and (2) Qualified Rules, which include "action(s)" that are qualified by a "condition", where the "condition" may define a behavior that needs to be true, and the "action" may define an action taken by a rule engine of the user profile generation agent when the condition is detected to be true. Such rules may be useful in inferring information from specific user actions or behavior.

For example, a simple rule for a user profile generation agent might be to store GPS derived location information for the user's W-AT every five minutes. An associated rule could be that the location most frequented within a 09:00-17:00 time range in the day be marked as the user's likely work location.

By way of a second example, a rule qualified by a condition might be to add a "game" category to the user's list of interests if the user often spends more than 30 minutes a day in the gaming applications on his W-AT.

Also note that the user profile generation agent may also take as input user preferences including user selection concerning express authorization of the user to derive a profile using location data, other authorizations made by the user and other specific information entered by the user. For example, the user might input his preference to view travel-related advertisements.

Various rule-driven approaches incorporated in a user's W-AT usable to gather and refine/categorize behavior data may alleviate some of the privacy concerns users might have. For example, by mining data and synthesizing raw data into more meaningful/useful forms within the W-AT (as opposed to using an external server), sensitive or personal information can be developed and later used for targeted advertising without exposing this information to the rest of the W-AT's communication network.

In various embodiments, particular aspects of a user's profile may control portions of the user's W-AT. For example, a user profile generation agent may utilize any retrieved W-AT information to tailor information content in a manner best suited for the W-AT, including the choice of menu layout, such as linear, hierarchical, animated, popup and softkeys.

As mentioned above, while most profile generation rules can be interpreted by the W-AT's embedded user profile generation agent, there might be some rules that require large database lookups, e.g., government census data. Since memory on the W-AT may be too limited to accommodate large databases, it may be possible to further refine the already synthesized user behavior and demographic data by offloading the appropriate refinement tasks to a specially configured server at the W-AP side of the M-TCM-PS network. For the present disclosure, any such external server capable of assisting in user profile generation may be referred to as a "profile attribute processor." Additional discussion of profile attribute processors is provided below with respect to FIG. 4.

Figure 3:
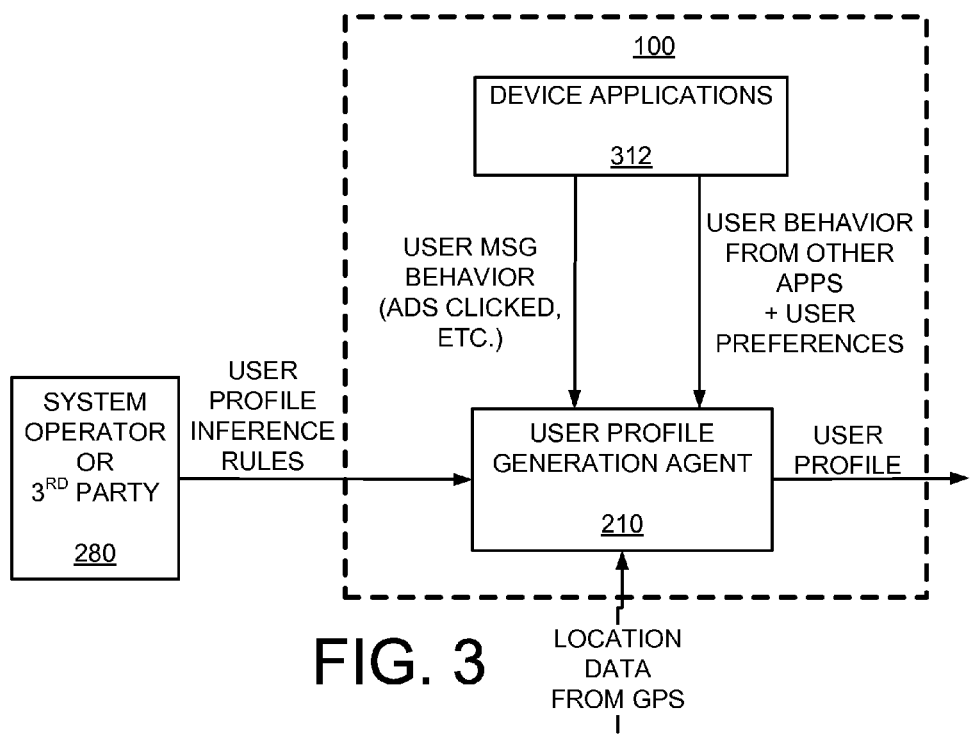
FIG. 3 is a schematic block diagram showing an exemplary operation of a data transfer of a user profile generation agent.

FIG. 3 is a schematic block diagram of the previously presented user profile generation agent 210 shown in the context of interacting with other devices 312 and 280. Various capabilities of the user profile generation agent 210 (in addition to those discussed above) are provided in part below.

One of the features of a mobile phone is that it can be carried by a user wherever he/she goes. Utilizing the GPS capabilities of a W-AT, the W-AT can determine where the user is periodically or a-periodically spending some or most of his/her time. As there is often demographic data associated with locations, the use of GPS information and demographic data associated with locations that the user frequents may allow the development of at least some portions of a demographic profile associated with the user. Typical demographic profile elements associated with the user's profile using the location information may include, but are not limited to:

Location ZIP code
Gender
Median age for the frequented location
Age distribution and associated probability
Mean travel time to work
Household income or household income range
Household size
Family income or family income range
Family size
Marital status
Probability of owning a house
Probability of renting a house
Life-stage group/classification Note that multiple demographic user profiles can be maintained at the W-AT for the user. For example, an M-TCM Enabled Client might be configured by the network to maintain two demographic profiles for the user—one for his "home" location (most frequented location between, say, 21:00-06:00) and one for his "work" location (most frequented location between, say 09:00-17:00).

In addition to general demographics, a user profile may be further developed using any of a W-AT's numerous applications. Which applications, e.g., games, a user tends to spend most of his time with or how he interacts with the various applications on the phone may provide an opportunity to build a profile for the user based on his behavior and preferences. Most of the data mining and user behavior profile determination of this sort can be done on the W-AT itself, being driven by user profile inference rules fed to the user profile generation agent 210. Typical behavioral profile elements associated with a user may include, but are not limited to, the following:

- Application ID and time spent in the application
- Interest categorization
- Favorite keywords
- Favorite websites
- Advertisements of interest
- Music album
- Games of interest Many profile elements (including demographics) can be inferred from behavior mined by adding hooks to observe application behavior through a native user interface application on a W-AT. It is through such applications that the user may launch other applications. Applications of interest to the user and time spent in these applications can be inferred by monitoring when the user launches and exits a particular application.

Rules fed to the user profile generation agent 210 can associate interest categories for a user based on the user's interactions with applications. Interest categories can also be assigned to the user profile using server assisted collaborative filtering on the behavior data collected at the W-AT.

Rules that may get downloaded to the user profile generation agent 210 may allow a server to control the functioning of the user profile generation agent 210 in a dynamic fashion. By mining raw data on the incumbent W-AT and synthesizing it into more meaningful information (profile attributes), particular sensitive user behavior information can be transformed into advertisement behavior categories and user profile elements versus maintaining data in raw form.

An exemplary W-AT can keep track of the messages of interest to the user and the keywords associated with such messages. For example, multiple clicks on the same advertisement may indicate to a user profile agent an interest level associated with the associated keywords and advertisement. On the same lines, games and music of interest to the user can be maintained at the W-AT. Server-assisted mode can also be used to associate user interest categories with the user's profile based on the user's music and game play-lists.

As a user profile is developed and maintained, such a profile can take a variety of forms, e.g., synthesized profile attributes and elements.

Note that some or all data attributes and elements in a user profile may have some confidence level associated with them. That is, because certain elements and attributes are based upon inferences and rules, their results may not be certain and have "fuzziness" associated with them. This fuzziness may be expressed as a confidence level associated with a user profile attribute and element.

By way of example, noting that a user is sending more than five-hundred SMS messages per month, the profile generator might say that the user is likely to be in the age group from 15-24 with a confidence level of 60%. That means that if 100 users sending more than five-hundred SMS messages per month were to be polled for their age, about 60 of them are likely to fall within the age group of 15-24.

Similarly, when a demographic profile is inferred for a user based on his/her home location, there may be a confidence level associated with the profile attributes. The confidence level here may indicate the number of times the profile attribute is expected to be accurate in a sample of one-hundred users with the same home location.

The exemplary user profile generation agent 210 can also be fed rules to combine confidence levels on the same profile attribute from multiple sources to come up with a unified confidence level for the attribute. For example, if the SMS usage rate indicates that the user is within the age group of 15-24 years with a 60% confidence level and demographic profile for the home location indicates that the user is in age group of 15-24 years with a 20% confidence level, then these two items can be combined with fuzzy logic rules to come up with a unified confidence level for the user lying in the same age group.

In contrast, if a user enters his interest preferences into the client, then such values might be given a confidence level of close to 100% since they are coming directly from the user. Similarly if the carrier specifies any user profile attributes/elements based on the user data it has (billing data or optional profile data collected from the user during service sign-up), then that too will have a higher confidence level associated with it.

As more user behavior data is collected on a W-AT and inferences made based on that, subsequent confidence level, in the profile attribute and element values, is expected to increase.

Figure 4:
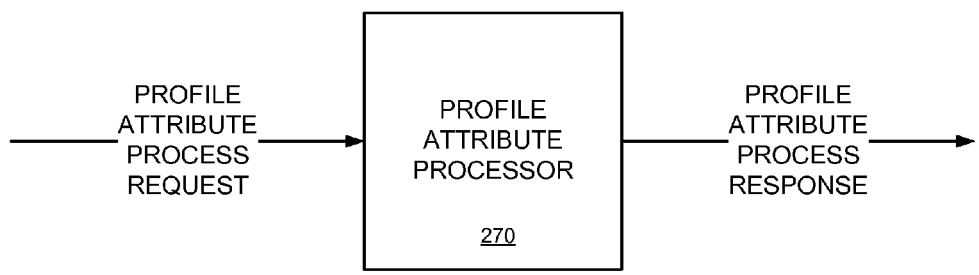
FIG. 4 is a schematic block diagram handling an exemplary request for profile data processing.

FIG. 4 is a schematic block diagram for a profile attribute processor 270 handling a request by a W-AT for profile attribute processing. As discussed above, while a W-AT may be able to handle most processing, there may be cases where huge database lookups are required to determine portions of a behavior or demographic profile. An example of such cases includes instances where census databases, which may require gigabytes of storage, are useful. Accordingly, a profile attribute processor (or other assisting server) may be used to process user information to provide more refined forms of user profile information.

Before a request is received by a profile attribute processor 270, synthesized profile attributes may be gathered at the relevant W-AT, and sent to the profile attribute processor 270 noting that the use of synthesized profile attributes can result in better use of bandwidth. Some of the user profile attributes, which require data-intensive lookups, can be processed by the profile attribute processor 270 optionally by anonymously querying techniques to protect user identities. The profile attribute processor 270 may further refine any received attributes, and provide the refined data to the appropriate W-AT in what may be referred to as a set of refined user profile attributes.

Figure 8:
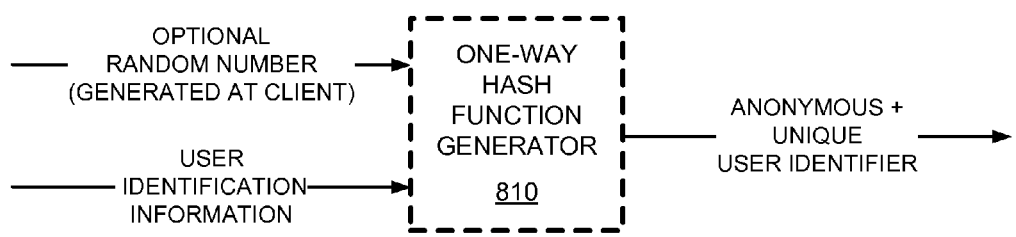
FIG. 8 is a diagram illustrating the use of a one-way hash function for client identity protection when identifiable data is transferred to a mobile advertising/mobile targeted-content-message processing server.

When activated by a request from a W-AT, the profile attribute processor 270 may process various types of specific and non-specific synthesized data regarding a user's behavior and demographics (e.g., profile attributes) and respond with the appropriate refined profile information. In order to maintain user privacy, some form of data scrambling, e.g., a hashing function and a number of other tools may be employed via a device, such as the one-way hash function generator 810 of FIG. 8. In operation, it is possible to use a hash function at a W-AT to hide the user's identity from the rest of the M-TCM-PS network.

In various operations, a hashing function employed in a W-AT can generate a predictable and unique, but anonymous, value associated with a particular user. Such an approach can enable the W-AT to query external servers without compromising on the privacy of the user. In various embodiments, a hashing function may be based on a primary identifier of the W-AT, e.g. a serial number associated with the W-AT, as well as a random value, a pseudo-random value, and a time-based value. Further, the hashing function may be calculated to provide a low probability of collision with other generated values.

The W-AT may use the same random number for subsequent queries to allow external servers to associate multiple queries from the same client. The use of the random number can help to prevent external servers (or unauthorized agents) from doing a reverse lookup on a subscriber base to determine a user's identity.

Once a hashed value is generated, the hashed value may be used as an alternate user identifier for the W-AT and provided, along with geographic information or some or items of information from a user profile, and provided to a remote apparatus.

Subsequently, one or more targeted content messages can be received from the remote apparatus based on the alternate user identifier and first advertisement-related information to the remote apparatus and/or other information capable of supplementing a user profile. Such information can be incorporated into the user profile of the W-AT.

Figure 9:
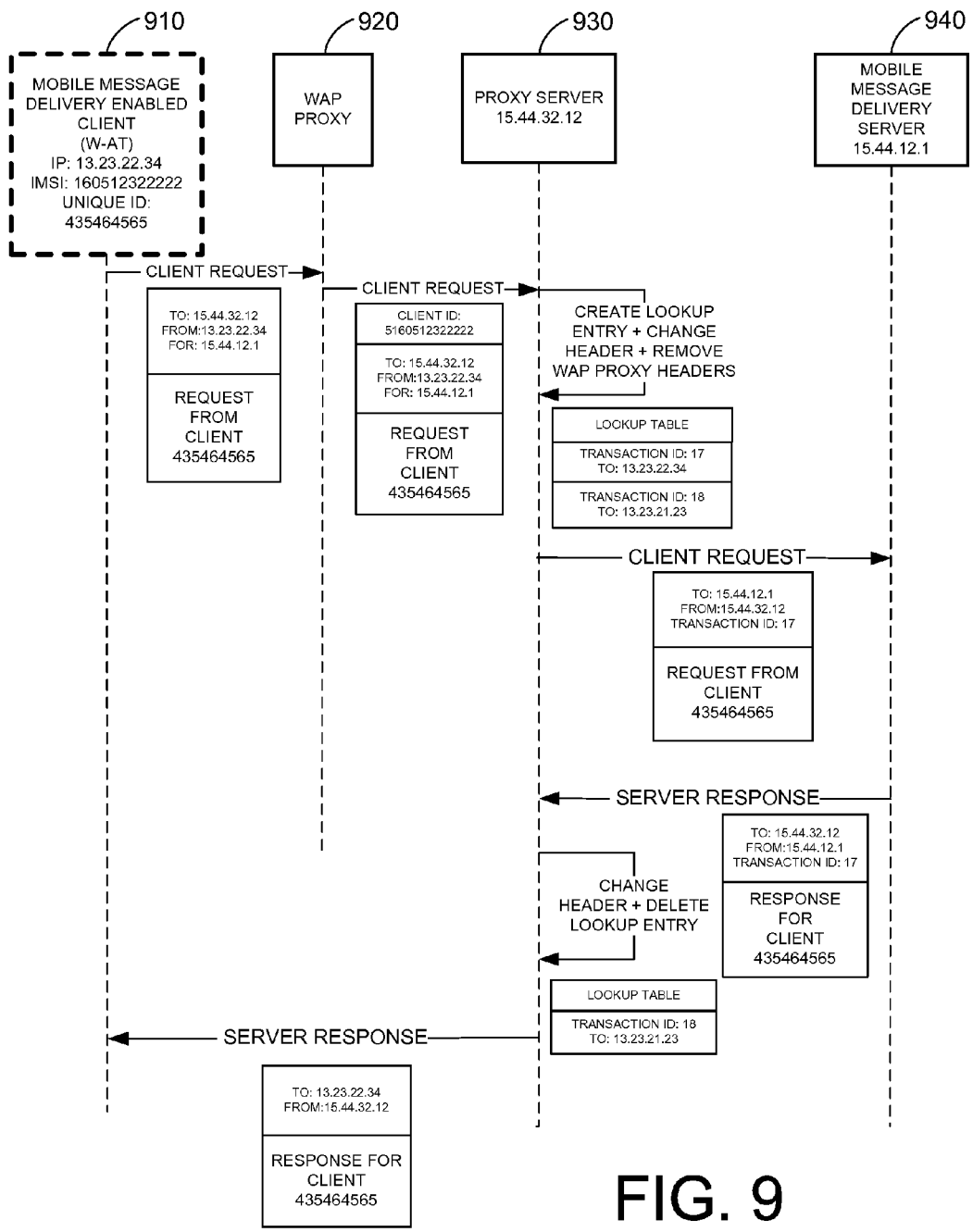
FIG. 9 is a diagram illustrating data flow implemented by a proxy server for anonymizing identifiable data transferred to a mobile advertising server/mobile targeted-content-message processing server.

In order to further maintain user privacy, a proxy server at the wireless access point (W-AP) side (see, e.g., FIG. 1) may be used. FIG. 9 depicts a particular communication scheme employing a proxy server for securely communicating in a mobile advertising-enabled network. As shown in FIG. 9, a W-AT 910 (the "M-TCM-Enabled Client") can send a request (or other message, such as a report or reply) related to a number of services, such as for refinement of user profile information or a request for advertising content, to a wireless application protocol (WAP) proxy 920. The WAP proxy 920, in turn, can forward the request to a secure proxy server 930, which may then create a transaction ID, change out the header to remove the W-AT's identification information in favor of the transaction ID, and forward the request to a mobile message delivery server 940 while creating a look-up table containing that information, e.g., the W-AT's IP address, useful to relay a reply.

Once the mobile message delivery server 940 receives and replies to the request, the proxy server 930 may use the appropriate transaction ID to forward the mobile message delivery server's reply. Later, the proxy server 930 may delete the look up table entry.

Note that the scheme depicted in FIG. 9 can be employed to disallow the mobile message delivery server 940 access to the user's W-AT IP address, which in turn has a number of benefits, such as allowing the delivery of targeted content, e.g., targeted ads, without compromising user identity.

In order to alleviate concerns of users that their location is possibly being tracked in real-time by their W-ATs, such W-ATs may elect not to query the server for refinement of location data in real-time. Note that such queries can be sent anonymously and sparsely over an extended period of time (e.g., once a month). A typical schedule could be, for example, to collect location information every 5 minutes for 72 hours. The most frequented location during this time frame or during specific time frames can be used to query the demographic profile of the user from the server at a randomly selected time between 30 and 40 days or by some other schedule specified by a the system operator.

The above case is an example of a hybrid approach using both the rule driven operation of the user profile generation agent along with the server-assisted mode to generate profile elements for the user while maintaining the user's privacy.

Figure 5:
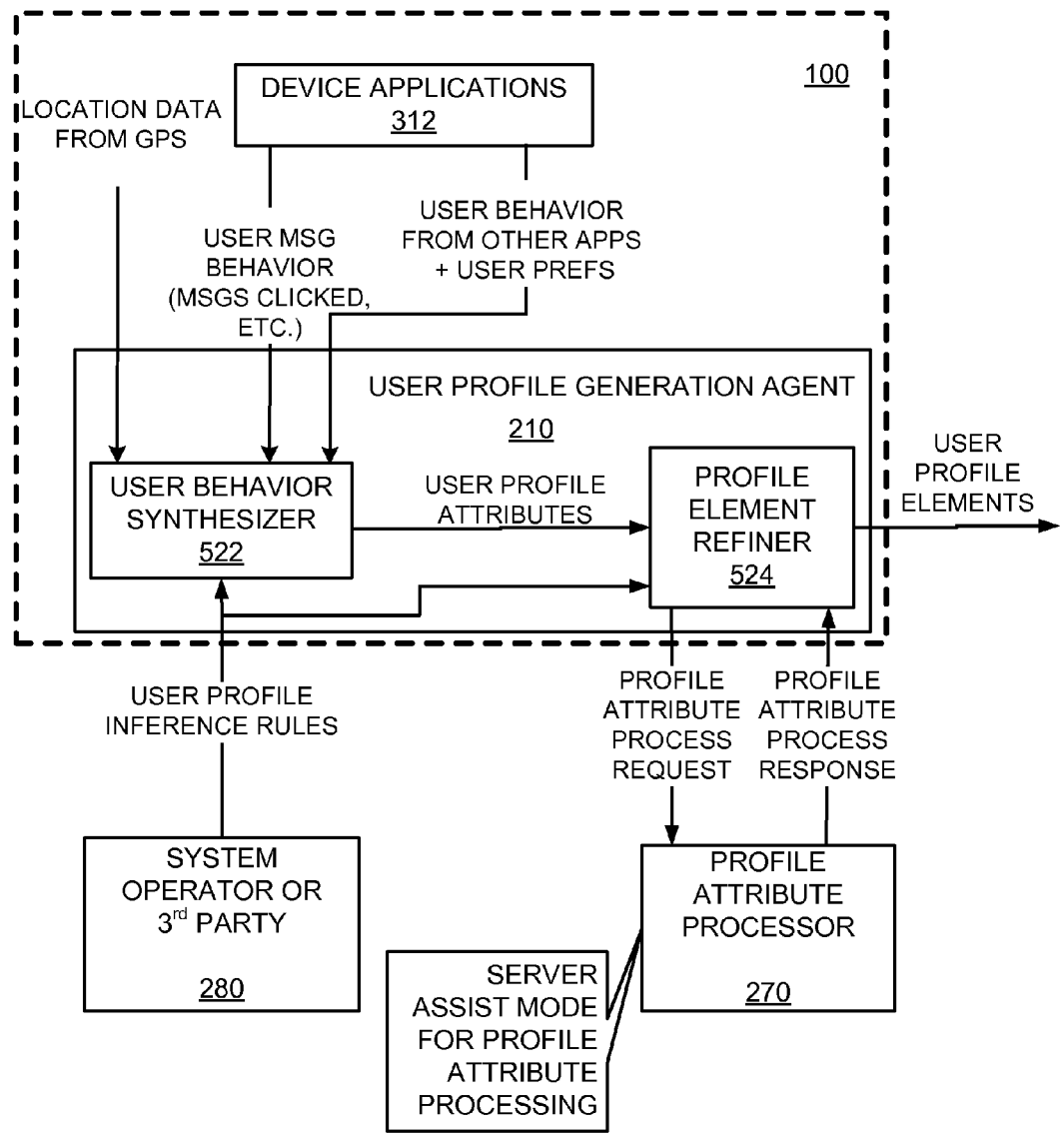
FIG. 5 is a schematic block diagram showing an exemplary operation of a user profile generation agent.

FIG. 5 is a schematic block diagram shown depicting an exemplary operation of such a hybrid approach using a user profile generation agent 210 having a user behavior synthesizer 522 and a profile element refiner 524. While the majority of functionality of the various devices of FIG. 5 has already been discussed above, further functionality will be described below with respect to the following flowcharts.

Figure 6:
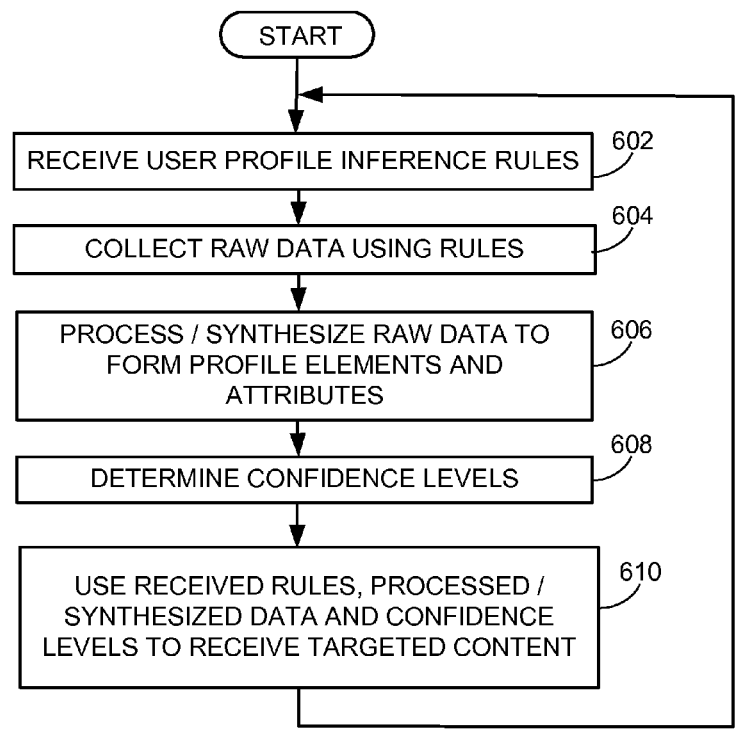
FIG. 6 is a flowchart outlining an exemplary operation for generating and using a user profile.

FIG. 6 is a flowchart outlining an exemplary operation for generating and using a user profile. The operation starts in step 602 as a number of user profile inference rules (basic and/or qualified rules) can be received (and subsequently stored) by a W-AT from a system operator or other party.

As discussed above, basic rules may include pre-scheduled events, e.g., performing a query of the user at a specific time. Similarly, a respective qualified rule might require the same query to be preceded by a condition and/or event, such as physical status information or operational status information.

Next, in step 604, the received rules can be used to collect raw data, and in step 606 the raw data may be processed/synthesized into user profile elements or attributes noting that while all such processing/synthesizing may occur on board the W-AT, some refinement may occur using external devices, such as the profile attribute processors discussed above. That is, as discussed above raw data and/or synthesized data may be incorporated to form a user profile for the W-AT's user. For example, a rule relating to monitoring SMS messages may be used to change a dynamic property of a user profile when applied to collect raw data and synthesize profile attributes/elements regarding SMS messages. Static data, e.g., a user's birth date, may be likewise collected using a rule to query the user, and then applied as an element in a user profile.

Then, in step 608, confidence levels for user profile data can be determined. Note that confidence levels can have a variety of forms, such as a range of numbers, variance statistic, or distribution profile.

In step 610, various received rules plus raw data and synthesized data relating to various user profile elements and attributes, which may form all of a user profile, may be used to receive TCMs. That is, as discussed above, in various embodiments a used/usable rule on a W-AT may be used to generate a user profile—along with collected raw data and synthesized data—to provide any number of static or dynamic properties of the user profile, and such information may be used to receive content, such as advertisements, sports scores, weather reports and news directed to subjects of likely interest.

Note that in various embodiments where user profile data can have confidence levels associated with them, rules may be applied to the confidence levels and targeted content messages may be received and displayed based on such confidence information.

Continuing, control of the operation may jump back to step 602 where new/more rules may be received and used to collect data and modify the user's profile.

Note that, as referenced above rules may be used based on physical configuration of an W-AT so as to utilize W-AT information to tailor content display in a manner suited for the W-AT to create suitable displays, such as menu layouts having linear, hierarchical, animated, popup and/or softkey attributes.

Figure 7:
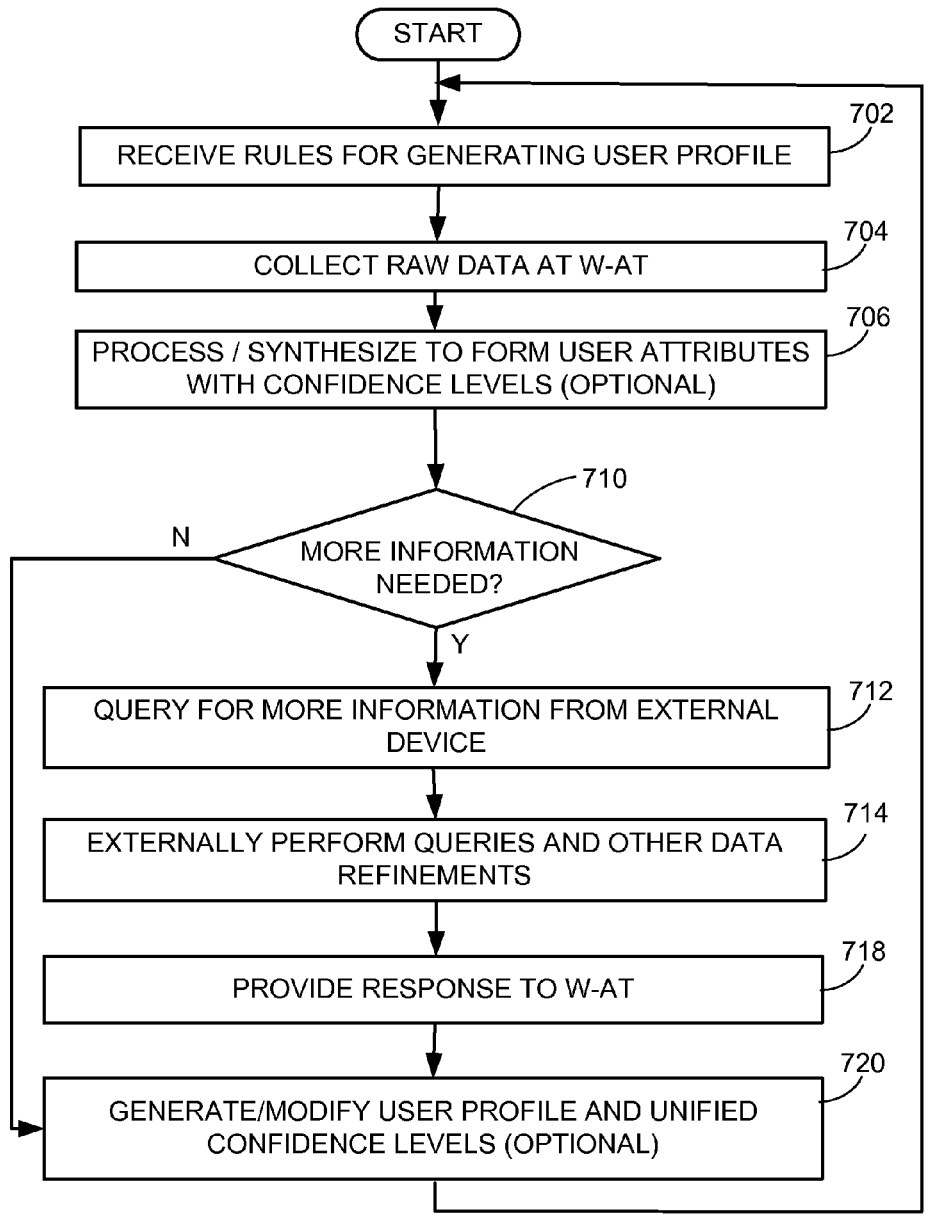
FIG. 7 is a flowchart outlining another exemplary operation for generating and using a user profile.

FIG. 7 is a flowchart outlining another exemplary operation for generating and using a user profile. The operation starts in step 702 as a number of user profile inference rules are received by a W-AT from a system operator or other party. Next, in step 704, the received rules can be used to collect raw data, and in step 706 the raw data may be processed/synthesized into user profile elements or attributes using onboard resources. Again note that any item of user profile information may have confidence level information processed and synthesized along with the basic data.

Continuing to step 710, a determination may be made as to whether further information or processing is required that may not be practical on a W-AT. For example, assuming that a W-AT has accrued a series of locations for which the W-AT regularly has visited using a GPS, a software agent on the W-AT using one or more rules may determine the need to query a large external database, such as a geographic information service or a national census database on a remote server, to determine a likely ethnicity (or other demographics) of the user. If further information or processing is required, control continues to step 712; otherwise, control of the operation may jump to step 720 where profile attributes are used to generate/modify the user's profile.

For instances where further information or processing is required, a request may be made of an external device (step 712), such as by the profile attribute processor discussed above (optionally using hashing functions and/or proxy servers) to protect user information.

Next, in step 714, the external device can perform any number of refinement steps, such as query large databases, to produce refined user profile attributes. Then, in step 718, refined user profile attributes may then be provided to the appropriate W-AT, where (in step 720) they may be used to generate, modify or otherwise incorporated in a user profile. Note that when confidence levels are available for processing, unified confidence levels may be determined based on individual confidence levels. Control of the operation may then jump back to the step 702 where new/more rules may be received and used to collect data and modify the user's profile.

Figure 10:
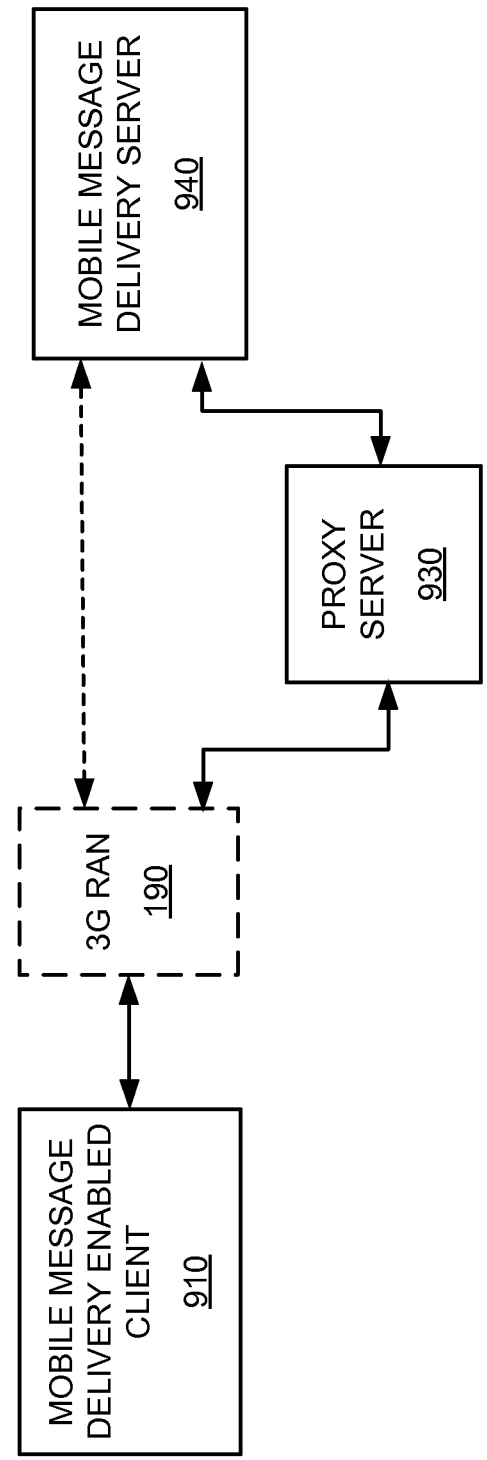
FIG. 10 is a diagram illustrating a second data flow implemented by a proxy server for anonymizing identifiable data transferred to a mobile advertising server mobile targeted-content-message processing server.
Figure 11:
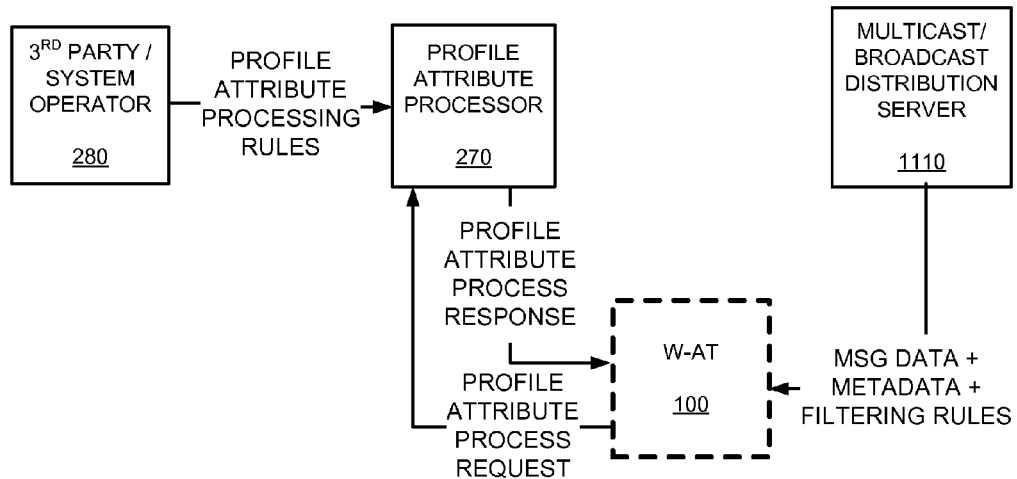
FIG. 11 depicts a communication protocol for advertisement distribution in a mobile targeted content message-enabled network.

Jumping forward to FIG. 11, a first communication protocol for TCMs distribution in a M-TCM-enabled network is depicted. This exemplary figure illustrates a possible data flow during a multicast "push" of messages from a message distribution infrastructure. Note that the User Profile Generation Agent (in the Mobile Device (W-AT) 100 of FIG. 10) can retrieve messages, then select one or more of the received the messages by internal filtering.

In operation, a network system operator 280 (and/or a third party) may provide profile attribute processing rules to the profile attribute processor 270. The profile attribute processor 270 may also receive a profile attribute process request from modules on the W-AT 100 and provide an appropriate response through modules on the W-AT 100.

Additionally, multicast or broadcast advertisements may be received by the W-AT 100 by a multicast/broadcast distribution server 1110. In this configuration, the W-AT 100 (or other Mobile Device) can be able to receive all messages and determine which messages are to be stored and presented to the user in accordance with the user profile generated at the W-AT 100 and the filter rules also received from the multicast/broadcast distribution server 1110 of FIG. 11.

Figure 12:
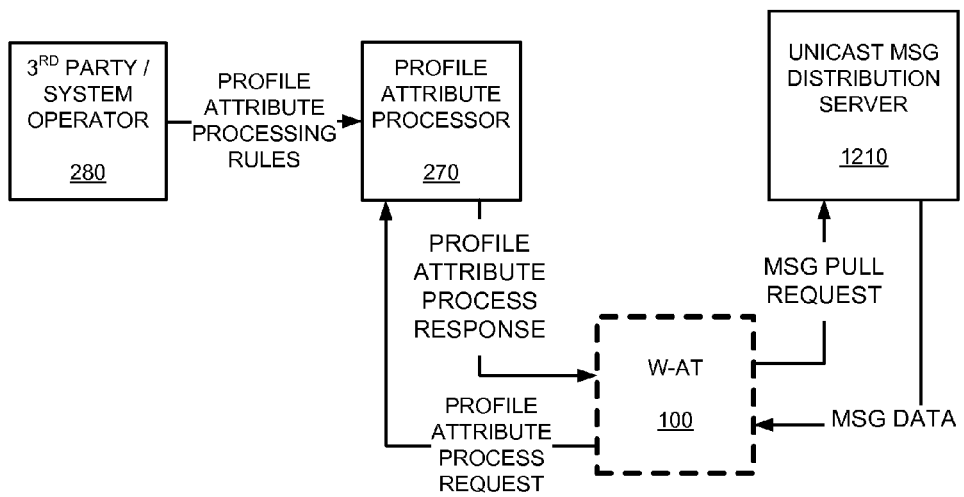
FIG. 12 depicts another communication protocol for targeted-content-message distribution in a mobile message delivery-enabled network.

FIG. 12 depicts a second communication protocol for message distribution in a M-TCM-enabled network. As with the example of FIG. 11, a network system operator 280 (and/or a third party) may provide profile attribute processing rules to the profile attribute processor 270, and the profile attribute processor 270 may also receive a profile attribute process request from modules on the W-AT 100 to provide an appropriate response through modules on the W-AT 100.

However, in this embodiment unicast messages may be requested by the W-AT 100 from the unicast message distribution server 1210. The W-AT 100 may be able to receive all messages over a unicast communication link and determine which messages are to be stored and presented to the user in accordance with the user profile generated at the W-AT 100 and the filter rules also received from the unicast message distribution server 1210.

Figure 13:
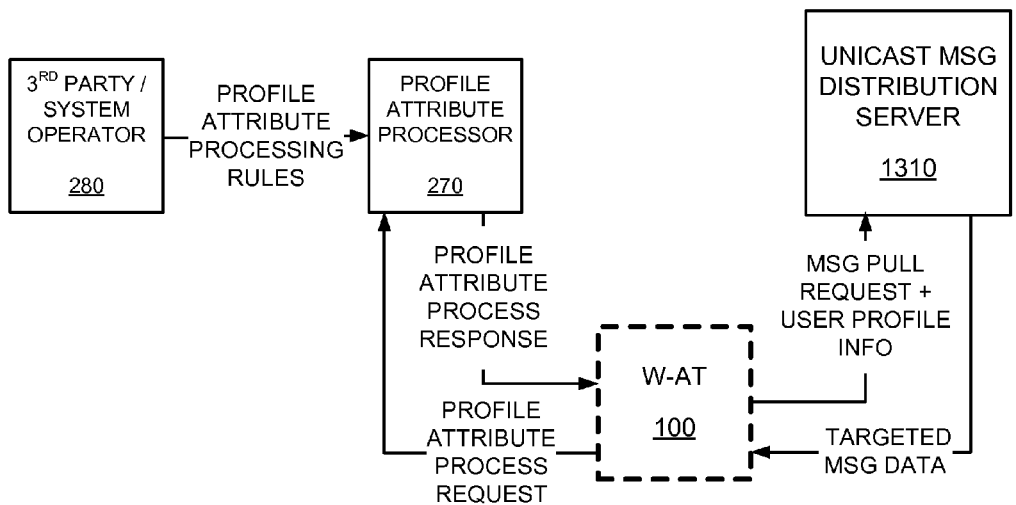
FIG. 13 depicts another communication protocol for targeted-content-message distribution in a mobile message delivery-enabled network.

FIG. 13 depicts another communication protocol for message distribution in a M-TCM-enabled network. Again, as with the previous examples, a network system operator 280 (and/or a third party) may provide profile attribute processing rules to the profile attribute processor 270, and the profile attribute processor 270 may also receive a profile attribute process request from modules on the W-AT 100 to provide an appropriate response through modules on the W-AT 100.

However, in this embodiment, the unicast messages distribution server 1310 may receive user profile information provided by the W-AT 100, process the received user profile information, and then provide the appropriate TCMs to the W-AT 100.

Figure 14:
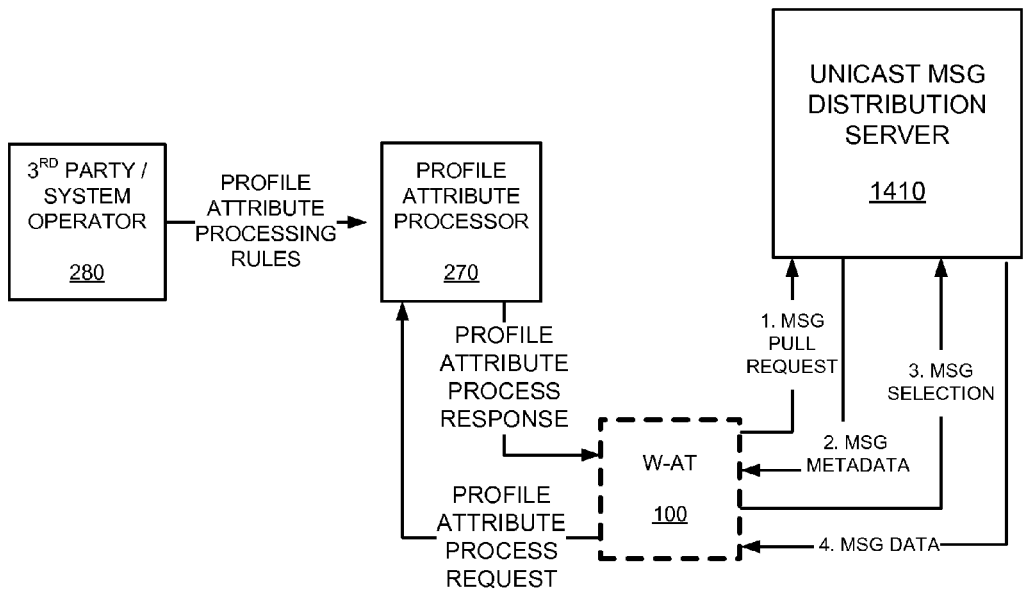
FIG. 14 depicts another communication protocol for targeted-content-message distribution in a mobile message delivery-enabled network.

FIG. 14 depicts yet another communication protocol for message distribution in a M-TCM-enabled network. This example may work much the same as the previous examples with respect to the profile attribute processor side of operation. However, message retrieval over the unicast communication link is substantially different.

In operation, the W-AT 100 may send a request for messages where after the W-AT 100 can receive a set of metadata representative of the various messages available in the message distribution server 1410. The W-AT 100 may then select a number of messages based on the metadata and on the filtering rules within the W-AT 100, and provide the selection information to the message distribution server 1410. Accordingly, the selected messages can then be provided to the W-AT 100 and presented to the user in accordance with the user profile rules.

The above approach keeps the user profile local on the W-AT while using optimal network bandwidth when delivering advertisements to the W-AT over the unicast communication link.

Figure 15:
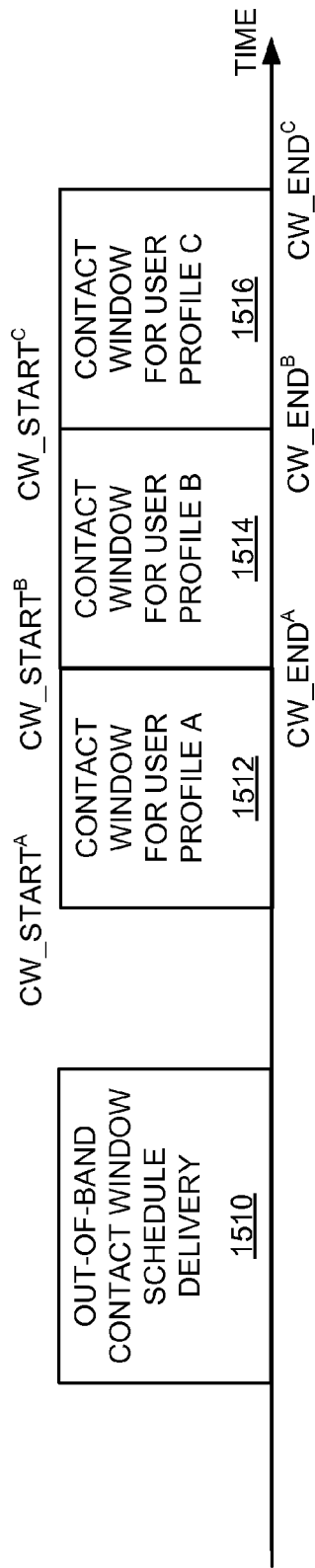
FIG. 15 depicts a timeline for a first communication protocol for downloading advertising content according to "contact windows" approach.

FIG. 15 depicts a timeline for a first communication protocol for downloading message content according to "contact windows" (see exemplary windows 1510-1516) approach. This may be used to permit downloading of TCMs at an opportune time without burdening other functions of the W-AT. In various embodiments, the W-AT may be able to adjust its sleep mode, if engaged, to the contact windows. In operation, a W-AT can be put into a sleep mode to optimize energy consumption on the platform during content message delivery. It is possible that in a sleep mode, the W-AT may be engaged in other useful operations. That is, a W-AT may be able to be put into a sleep mode while various timing circuitry (not shown) may be programmed or otherwise manipulated to respond to the sleep mode and a contact window or other schedule by disengaging the sleep mode before and/or during the contact window, and possibly re-engaging sleep mode subsequent to receiving TCMs or at the end of the relative contact window.

Figure 16:
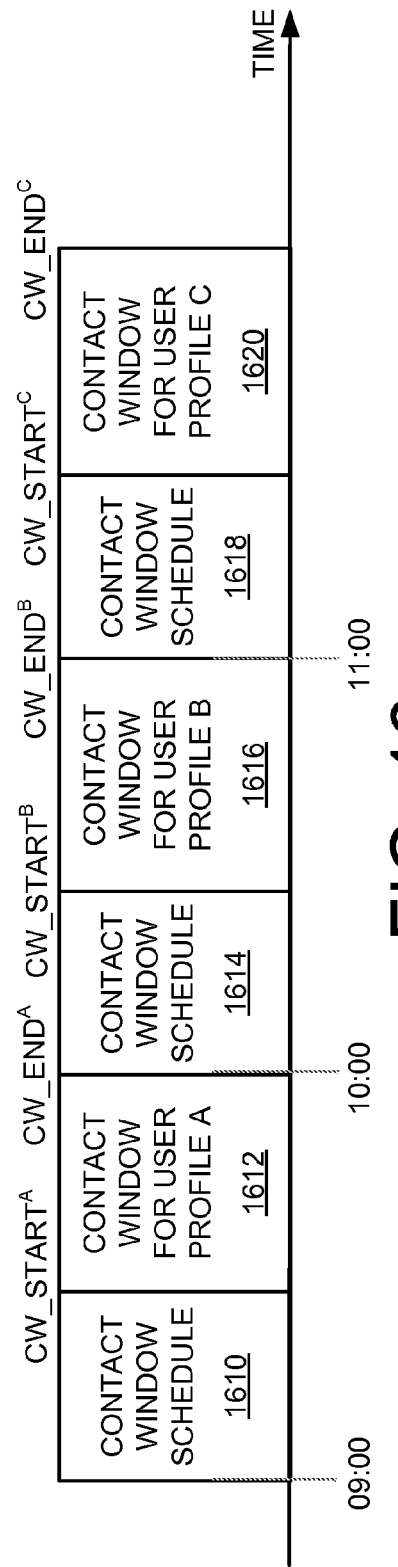
FIG. 16 depicts an alternate timeline for a communication protocol for downloading advertising content according to a defined time schedule.

FIG. 16 depicts an alternate timeline for a first communication protocol for downloading targeted-content-message information according to a defined time schedule. Referring to exemplary windows 1610-1620, this approach may be used to permit downloading of TCMs at an opportune time without burdening other functions of the W-AT. The defined time schedule permits the W-AT to remain in sleep mode except during the defined time schedule. Again, various timing/clock circuitry may be employed to engage and disengage a W-AT to/from sleep mode. Additionally, it is possible that when the W-AT wakes up to receive TCM information, it can receive targeting meta-data and reception times for future TCMs, which can then be used to determine whether to receive a future TCM based on the user profile and the targeting metadata, and to schedule an appropriate wakeup time prior to the reception time for a future TCM delivery.

Figure 17:
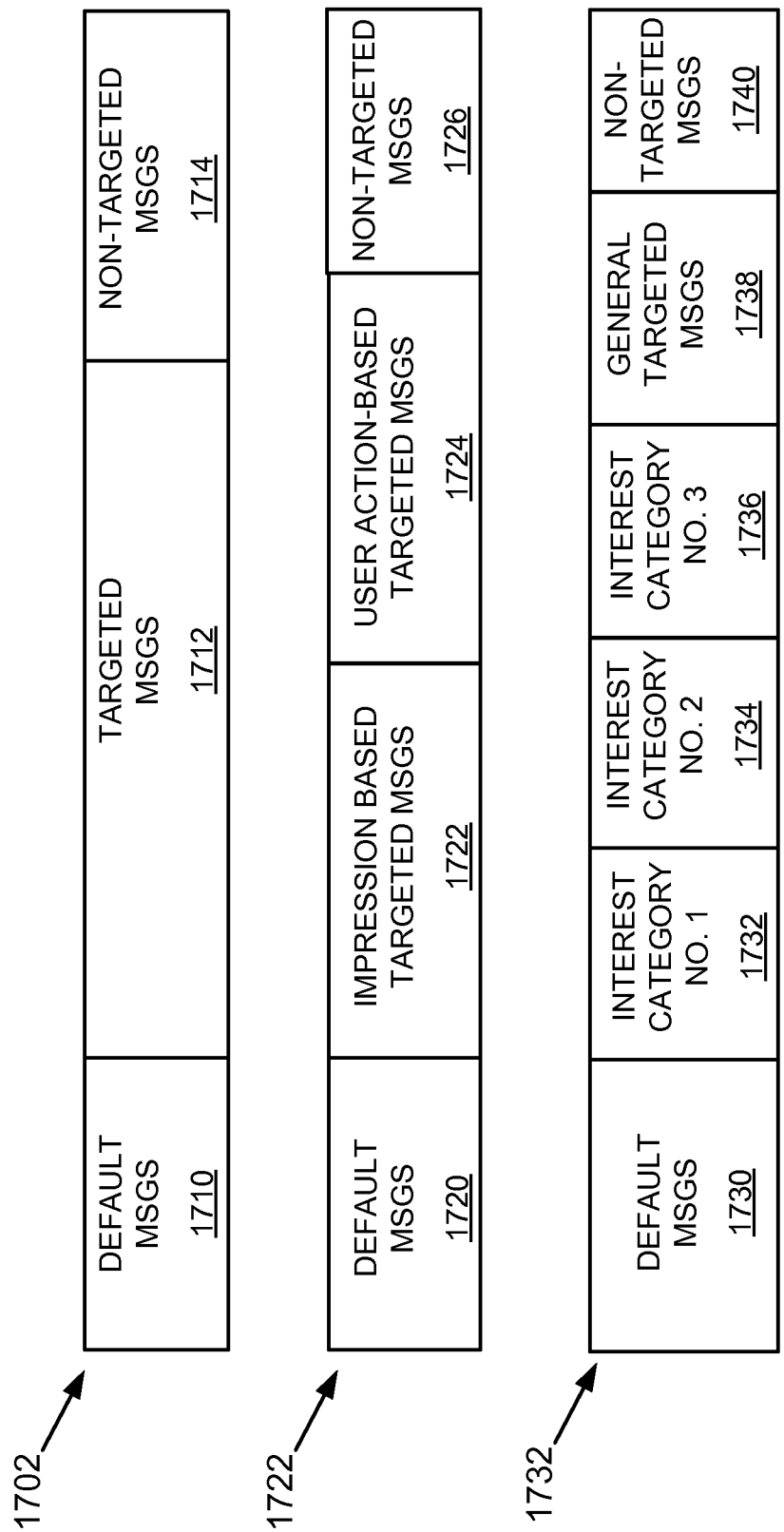
FIG. 17 depicts an alternate timeline for a first communication protocol for downloading content according to a defined time schedule.

FIG. 17 illustrates some of the cache modeling scenarios based on exemplary information streams 1702, 1722 and 1732. As shown in FIG. 17, the cache modeling scenarios are based on various listed classifications. Note that a message cache can be a store house for the messages at a M-TCM-enabled client. Messages may be cached locally to enable immediate play-out of the messages when there is an opportunity to serve a TCM.

The actual storage space in a cache may be divided into multiple categories based on different types of classifications. These classifications can be defined by System Operator using filter rules. The amount of space allocated to each category within a classification may be fixed or may be dynamic based on some defined criterion, again defined through a filter rule by the System Operator. Some categories of interest include:

Default messages (1710, 1720 and 1730): These may be thought of as "fallback" messages that can be marked such by the System Operator. They are shown when no other message satisfying the message type requested by a device application is available for display.

Default messages can be candidates for a cache as long as there is at least one message delivery-capable application subscribed with the respective client message delivery engine with the same message type as the candidate default message. In addition, default messages may be made to satisfy the minimum gating criteria of device and application capability compliance.

Based on the value calculated for a default message, a previously stored default message may be replaced by a new one as long as the "normalized" value of the new message is greater than the value of previously stored default messages under the same message type.

The maximum number of default messages allowed on a client for each message type may be defined by the system operator through a filtering rule. In various embodiments there may be a fixed number of messages or message memory, or message number and/or memory may be determined dynamically based on a particular message capable application, usage, etc. Typically, in a number of embodiments, the maximum number of default message allowed for each message type is 1.

Messages that are marked as default messages primarily serve two purposes: (1) they serve as "fallback" messages in each category and help the system to take advantage of each opportunity to present a message to a user; and (2) they allow a System Operator to offer "tiered pricing" and (optionally) charge more for default messages.

Targeted messages (1712, 1722, 1724 and 1738) and non-targeted messages (1714, 1726 and 1740): One classification scheme would be to divide a cache store into space for targeted and non-targeted messages. The targeted message cache space can be used to store only messages for which the user profile for the user of the M-TCM-enabled client matches the target user profile contained in the relevant metadata.

For messages where the target user profile does not match the device user's profile, as long as the messages are not marked as "targeted-display-only", such messages can be candidates to be placed in the non-targeted message cache space. Having non-targeted messages for display can allow a system to gauge change in user interest with time, and modify the respective user profile and cache accordingly.

Impression-based messages (1722) and action-based messages (1724): Another classification would be to divide the targeted or non-targeted portion of a cache space based on whether a message is an impression type of TCM delivery campaign or the message is one which solicits a user action to gauge user interest. Partition sizes or ratios for such a sub-classification might be defined by a System Operator or might be dynamically decided by the capabilities and usage rate of message delivery capable applications onboard a respective W-AT.

User Interest Based classification (1732-1736): A sub-classification under the targeted message classification could be based on a user interest classification. For example, most of a particular cache space within a targeted message section of a cache could be reserved for the top three user interest categories while any remaining cache resources may be devoted to other categories matching a user's profile. Again the actual ratios or number of interest based categories within such a classification may be defined by a System Operator and/or may be dynamic based on the relative click-through rates for ads (or other messages) within each interest category.

Figure 18:
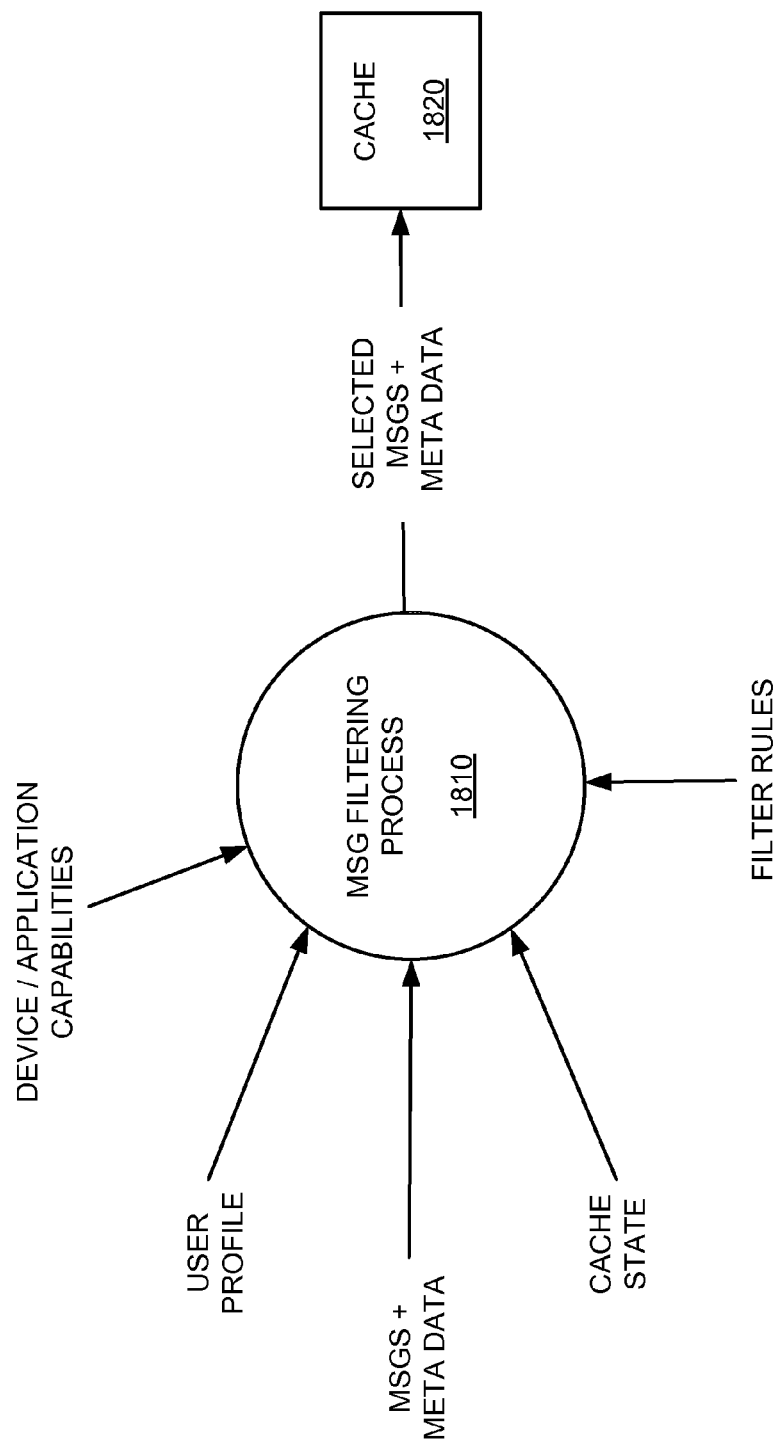
FIG. 18 is an illustration of a message filtering process.

FIG. 18 is an illustration of a message filtering process context. One purpose of a message filtering process within a mobile targeted content message delivery system can be to decide which of any available new messages entering the system should be cached at a particular mobile client.

In operation, a filtering process 1810 may use a number of inputs, such as a user profile of the user maintained within the system, the device and application capabilities on the mobile client, the current cache state on the mobile client and filtering rules defined by a System Operator or some $3^{rd}$ party 280 to determine which new messages to cache. Upon processing each received messages, a number of selected messages may be determined and stored in cache 1820 along with the respective metadata.

Figure 19:
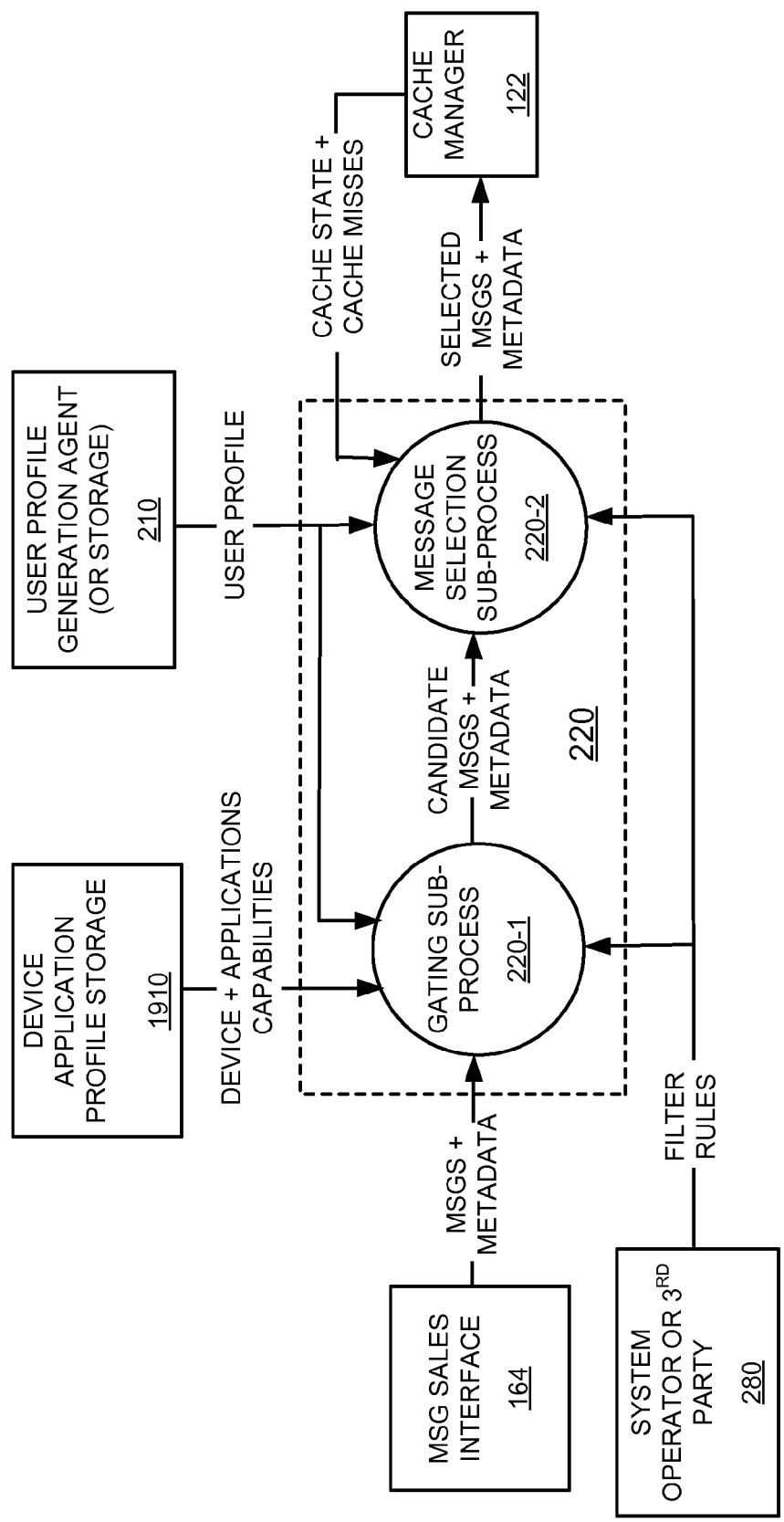
FIG. 19 is an illustration of message filtering process components.

FIG. 19 is a data flow diagram for a TCM filtering process within a TCM delivery system in the context of various exemplary functional components. As shown in FIG. 19, message filtering may be a multi-step process. New messages entering a filtering agent 220 from sales interface 164 may first pass through a gating sub-process 220-1 that may determine which received messages are possible candidates for an message cache. Note that the exemplary gating sub-process 220-1 may use device and capabilities information from an appropriate storage device 1910 associated with the mobile client, as well as filter rules by the System Operator or some $3^{rd}$ party 280 and user profile information from an appropriate agent 210 or storage device.

Continuing, the possible candidates of the gating sub-process 220-1 may then be processed by a selection sub-process 220-2 that may determine which candidate messages may be replaced in case of message space contention. Note that the selection sub-process 220-2 may use filter rules by the System Operator or some $3^{rd}$ party 280, user profile information from an appropriate agent 210 or storage device and feedback cache information from a cache manager 122.

Figure 20:
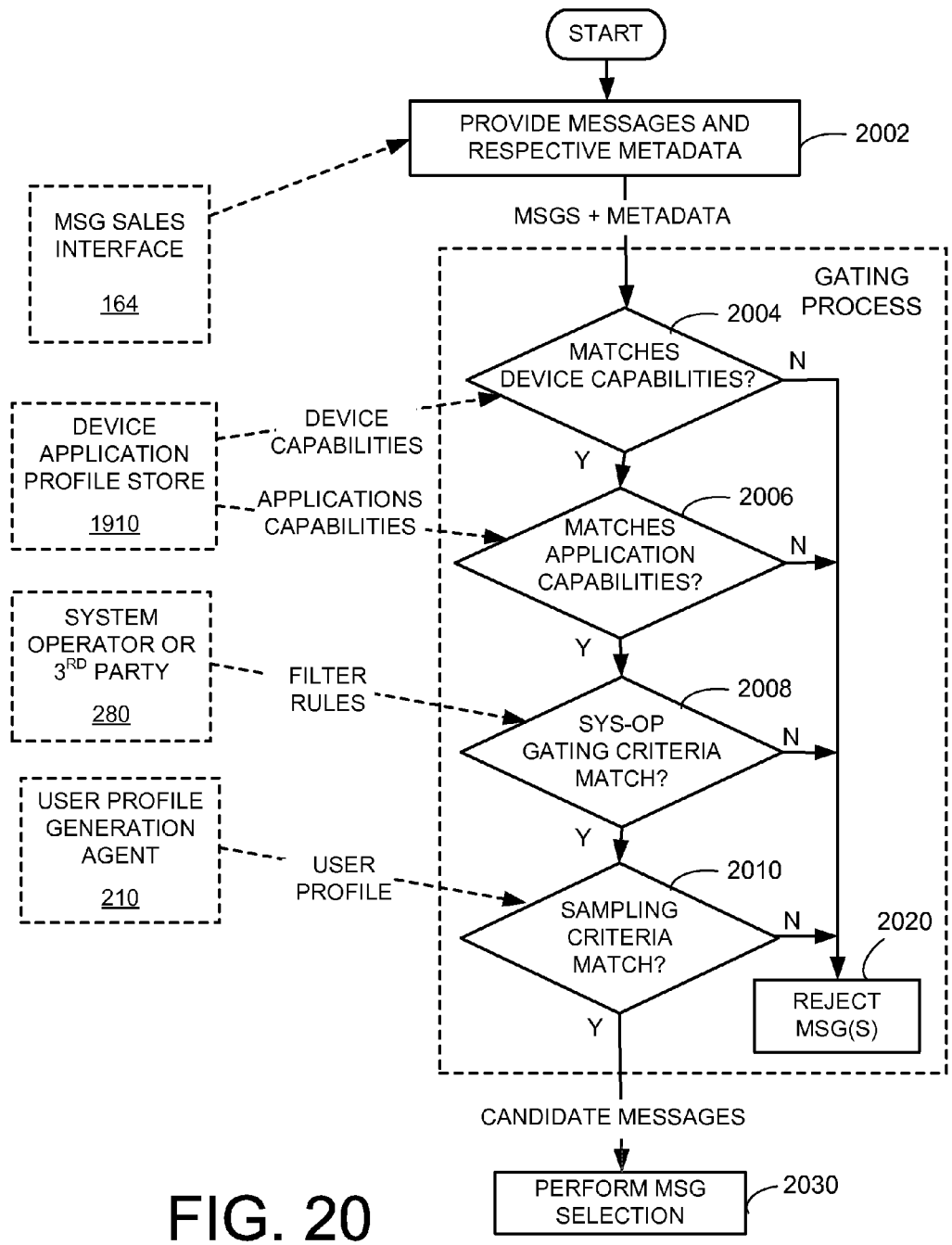
FIG. 20 is an illustration of a gating process.

FIG. 20 shows an exemplary data flow within the gating process of FIG. 19. One purpose of this process is to ensure that targeted content messages, such as targeted ads, meet certain requirements before they are forwarded to a selection process. The present process starts in step 2002 where messages and respective metadata may be provided from a sales interface 164 or other device. Next, in step 2004, a determination is made as to whether the messages of step 2002 are within the capabilities of the mobile client. That is, messages should be such that they can be supported by the physical plant of a mobile device. For example, if a message is meant only for the secondary device screen but the mobile device at issue does not have one, the message is not suitable. Should the message match device capabilities, control continues to step 2006; otherwise, control jumps to step 2020 where the message is rejected for use.

In step 2006, a determination is made as to whether the messages of step 2002 are within the applications capabilities of the mobile client. That is, messages should be such that they can be supported by the various software/firmware registered for use with the mobile device. For example, if a message includes a video of 15 seconds but there is no CODEC facility within any of the device applications to show such a video, the message not suitable. Should the message match applications capabilities, control continues to step 2008; otherwise, control jumps to step 2020 where the message is rejected for use.

In step 2008, a determination is made as to whether the messages of step 2002 pass a system operator specified gating criteria match within the applications capabilities of the mobile client. For example, if a message is suitable for adult audiences only, such message would be likely best filtered out for any user that is identified as a minor. Should the message match the specified system operator specified gating criteria, control continues to step 2010; otherwise, control jumps to step 2020 where the message is rejected for use.

In step 2010, a determination is made as to whether the messages of step 2002 pass a sampling criteria match. For example, if a particular advertisement is slated to be provided to only 30% of a demographic, a random number generator (RNG) having a range of 1 to 100 and seeded with its own ESN and a server specified seed may qualify the advertisement if the resultant random number is less than 30%. If the ad/message passes the sampling criteria, control continues to step 2030 where message selection may be performed; otherwise, control jumps to step 2020 where the message is rejected for use.

Figure 21:
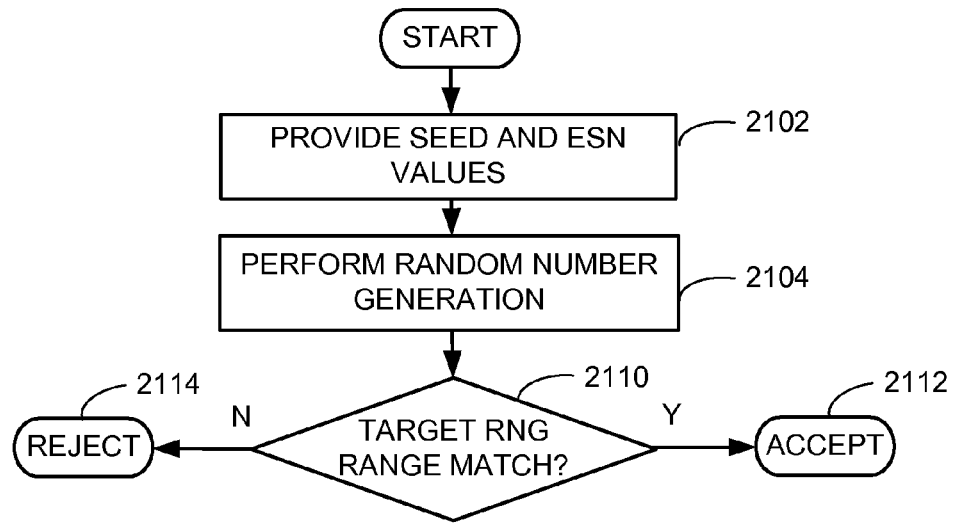
FIG. 21 is an illustration of a random sampling logic diagram.

FIG. 21 is a flowchart depicting a random sampling scheme, which is presented for situations where an operator might want to divide the users into mutually exclusive sets and target different messages to each set. For example, the operator might be under contractual obligation not to show any Pepsi ad and any Coke ad to the same user. Accordingly, the operator might want to target the Pepsi ad to 50% of the subscriber base and Coke ad to the remaining 50% of the subscriber base, making sure that both ads are not shown to the same user.

The process starts in step 2102 where a random number generator seed and ESN (electronic serial number) are provided to a mobile client/W-AT. Next, in step 2104, a random number generation process is performed to generate a random number between 1 and 100—or between any other range of numbers. Control continues to step 2110.

In step 2110, a determination is made as to whether a match is made between the random number of step 2104 and a defined range, e.g., 1 to 50 or 51 to 100 out of a total range of 1 to 100. If a match is made, then control jumps to step 2112 where the message at issue is accepted, or if there are competing ads as with the Coke/Pepsi example above, the first of two messages is accepted; otherwise, control jumps to step 2114 where the message at issue is rejected, or if there are competing ads as with the Coke/Pepsi example above, the first of two ads is rejected while the second ad is accepted.

Figure 22:
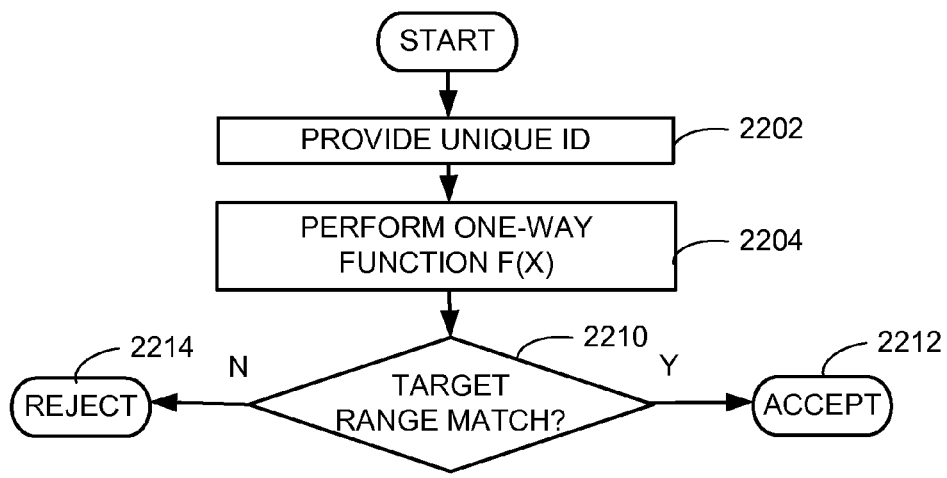
FIG. 22 is an illustration of a one-way function based sampling logic diagram.

Continuing to FIG. 22, it should be appreciated that mutually exclusive message targeting within the subscriber base can be done using a one-way function like a hashing scheme on some unique ID, such as a user ID or device ID. In operation, an operator can specify different target user segments based on the result of the hashing calculations. Such a sampling might be done to target a section of users defined by a range of the hash values for their respective ESNs.

The process starts in step 2202 where unique ID is provided to a mobile client/W-AT. Next, in step 2204, a one-way hashing process may be performed to generate a value between any range of numbers. Control continues to step 2210.

In step 2210, a determination is made as to whether a match is made between the hashed value of step 2204 and a defined range. If a match is made, then control jumps to step 2212 where the message at issue is accepted, or if there are competing ads as with the Coke/Pepsi example above, the first of two messages is accepted; otherwise, control jumps to step 2214 where the message at issue is rejected, or if there are competing ads as with the Coke/Pepsi example above, the first of two ads is rejected while the second ad is accepted.

Note that when a client's hash value does not fall in a sampling range specified by the system operator, the message may be rejected; otherwise, message processing may continue to the next gating criteria or selection phase. Also note that an operator might also choose a hybrid approach to sampling users for a particular ad/message distribution campaign by targeting randomly within mutually exclusive sets. As an example, a particular ad campaign might be targeted to a random 20% of the subscriber base that did not get a first ad. This would be achieved by first using a one-way function based sampling to come up with a mutually exclusive set and then to target randomly within the mutually exclusive set.

Figure 23:
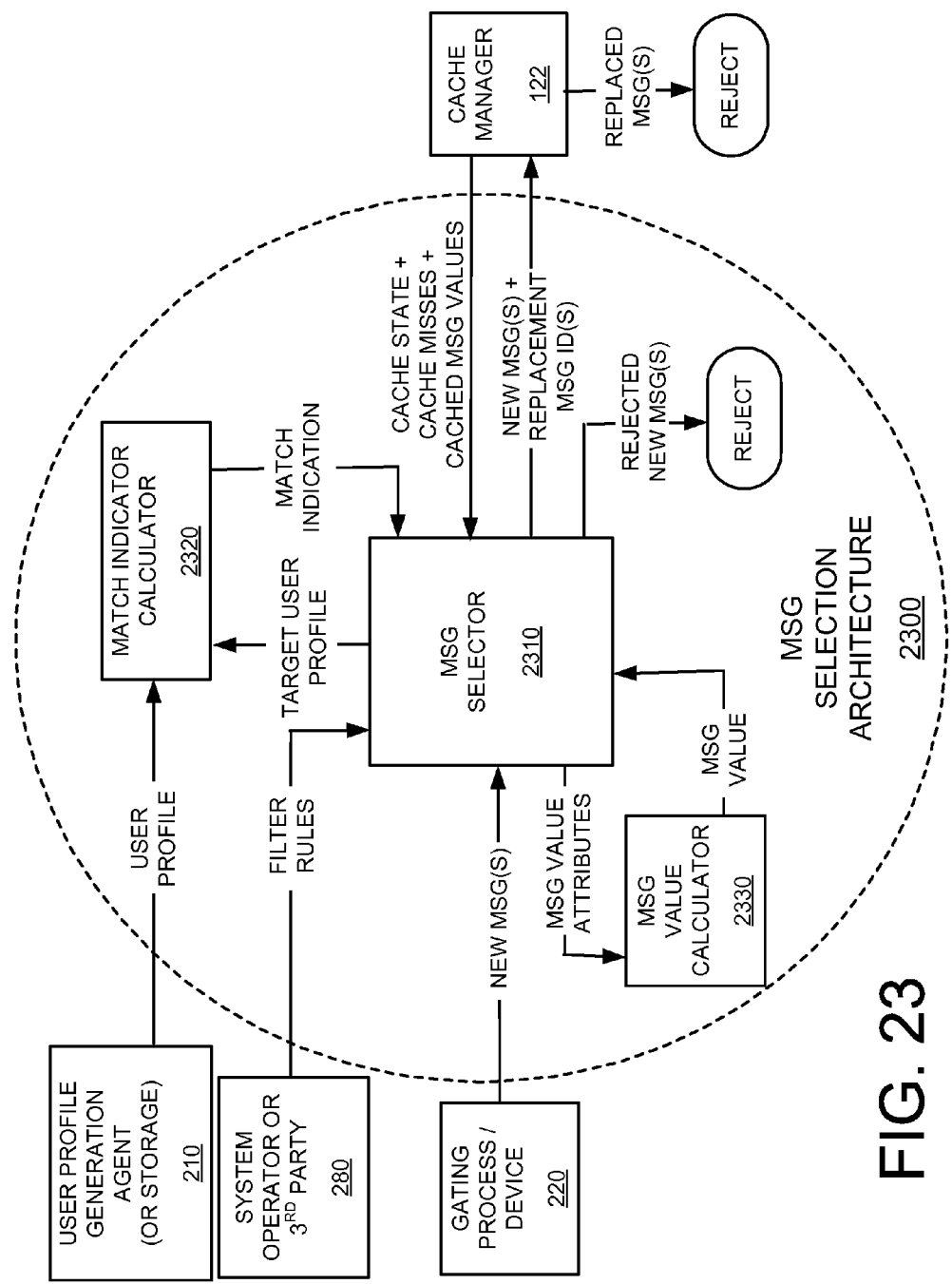
FIG. 23 is an illustration of selection process flow diagram.

Continuing, FIG. 23 shows an exemplary data flow within a message selection process 2300. A purpose of the selection process can be to select messages from a pool of messages that are forwarded to a mobile client/W-AT by a gating process, and store the selected messages in a memory, such as a special client ad/message cache. In case of message space contention, the selection process 2300 may also be employed to select previously cached-messages that need to be replaced from the cache.

Message selection may come into play when there is contention over cache space, i.e., there is not enough space in the cache to accommodate all the new messages and the previously cached messages. Message selection may be a multi-step process, and because a cache may be divided into among different categories (dynamically or statically), contention and selection may happen in each message category.

In operation, a message selector 2310 may receive new messages from a gating device 220 or other instrument performing a gating process, as well as a number of message filter rules from a system operator or $3^{rd}$ party 280. The message selector 2310 may then apply the various filter rules to each new message to determine whether each new message passes some basic criteria, such as whether the new message is age or gender appropriate. Should a particular message not comply with the filter rules, it may be categorized as a rejected new message and discarded.

Messages not discarded under the filter rules may be further processed by the message selector 2310 to derive a "target user profile" for each received message to a match indicator calculator 2320, which may then compare the target user profile(s) to a user profile provided by a user profile generation agent 210 or some other device storing information on a user. In turn, the match indicator calculator 2320 may perform a match between each target user profile and the user profile associated with the user or mobile client/W-AT, and provide a match indication "score" to the message selector 2310 that quantizes how well a particular incoming/new message is compatible with the user profile.

If the match indication "score" ranks well enough, the respective message can be further considered; otherwise, it may become a rejected new message.

Messages that are further processed by the message selector 2310 may provide the match indication "score", along with other message value attributes, such as the message size, duration, memory and display requirements and so on, to a message value calculator 2330, which in turn can provide a "message value" for such messages back to the message selector 2310.

Continuing, the message selector 2310 may receive information from a cache manager 122 about the state of an available cache (or portion of a cache devoted to a particular message category), along with cache hit/miss information and the message value for each message in the cache (or relevant portion). Depending on the hit/miss information for a particular message, a message value for a given message may optionally be adjusted.

The message selector 2310 may then determine whether a newly received message is to replace one or more existing messages in the cache based on relative message values, and any newly selected messages may then be sent to the cache manager 122 along with the respective message IDs and respective message values, and any replaced messages may be discarded/rejected for further use.

Figure 24A:
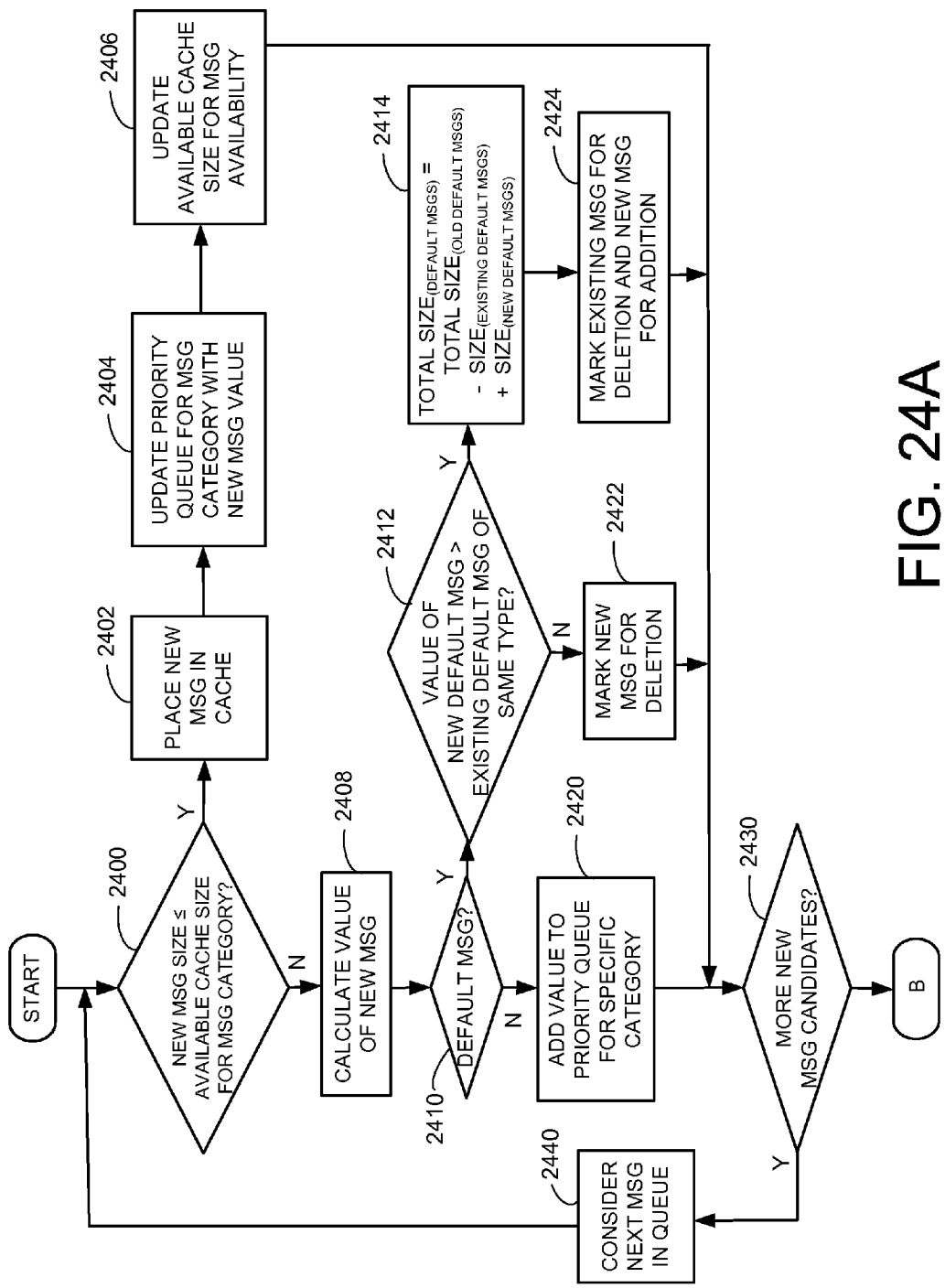
FIGS. 24A and 24B depict a flowchart of a message selection process.
Figure 24B:
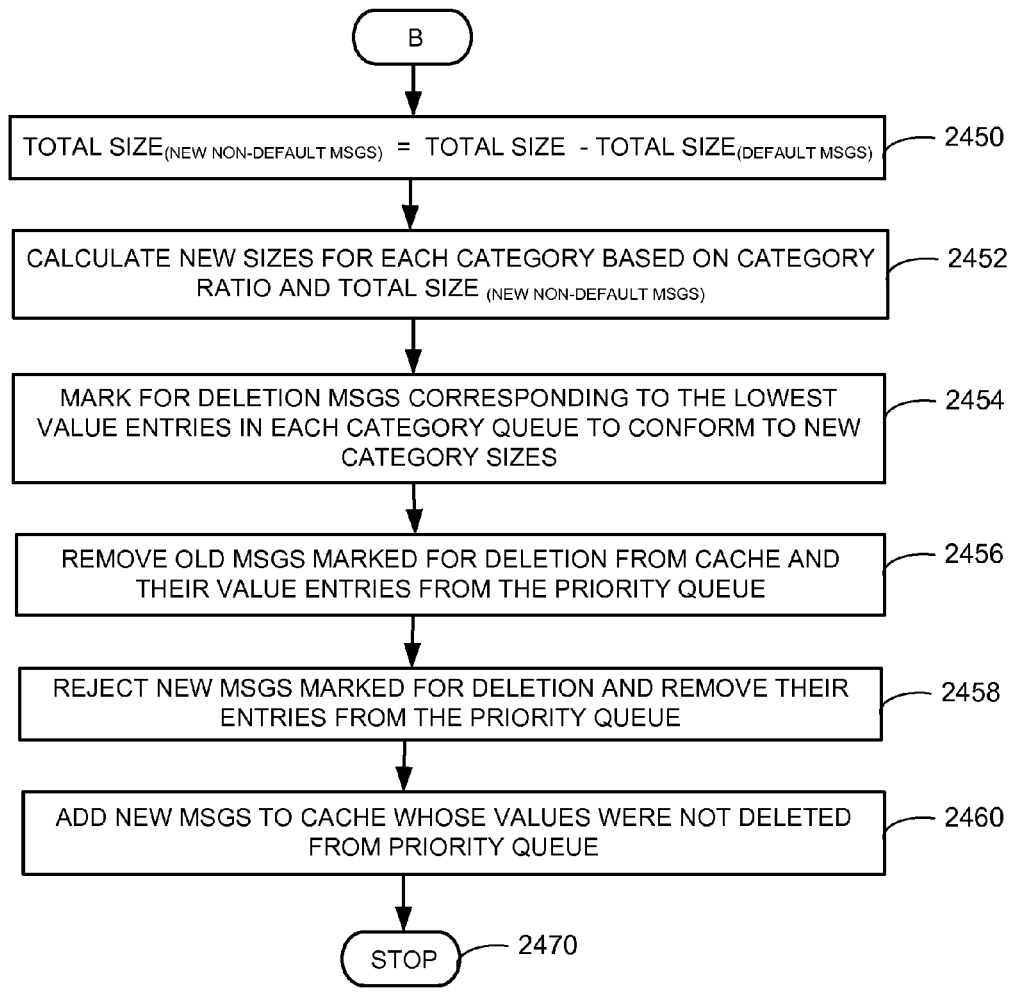

FIGS. 24A and 24B depict a flowchart outlining a message selection process for one or more new messages received at a mobile device, such as a W-AT. The exemplary process flowchart shows the high level flow of actions that take place during message selection to determine which new messages to add to a cache and which previously cached message are to be replaced/discarded.

The process starts in step 2400 where a determination is made for a first new message whether the size of the message is less than or equal to some maximum message size for a particular cache memory and (optionally) for a particular message category, e.g., movie trailers, baseball highlights, weather reports and clothing sales. If the new message size conforms with the cache memory requirements of step 2400, control jumps to step 2402; otherwise, control continues to step 2408.

In step 2402, the new message is placed in cache memory. Next, in step 2404, a message value for the new message is calculated, and a "priority queue" for various messages in the cache—and optionally for a message category of the cache—is updated with the message value of the new message. Then, in step 2406, the available cache size is updated (again with an optional updating for the particular message category) based on the new message. Note that such message values may used to maintain a priority queue for each category within the cache. Periodically (on a pre-defined schedule), an engine may recalculate the various message values in the cache and re-adjusts the priority queues based on the new values. Such periodic updates to the value based priority queues may result in lesser time being spent when new messages are being considered as cache replacement candidates, since the values in the queue are a good approximation of what the current values would be. The process then continues to step 2430 (discussed below).

In step 2408, a message value for the new message is calculated. Next, in step 2410, a determination is made as to whether the new message is to be a default message. If the new message is to be a default message, control jumps to step 2412; otherwise, control continues to step 2420.

In step 2412, a determination is made as to whether the value of the new message is greater than the value of a default message of the same type already existing in the cache. New messages marked as default messages and having value greater than one or more of already stored messages can be given priority. The additional size (if they are greater in size than the message(s) to be replaced—of if the new message(s) are catering to a new message type for which there are no previous default messages of such category can be calculated since these messages can be accommodated in the cache. Old default messages that are of lower value than the new ones may be marked for replacement. Each message type may typically have a fixed number (typically 1) of default candidates. If the new message value is greater, control jumps to step 2414; otherwise, control continues to step 2422.

In step 2414, the total size for all default messages is updated, and in step 2424, existing cached message(s) to be replaced are marked for deletion while the new message is marked for addition to the cache. Note that based on how the cache is divided or allocated to the various categories of messages, new space allocations can be calculated for each category. Control continues to step 2430.

In step 2422, the new message is marked for deletion, and control continues to step 2430.

In step 2420, a new message value for each new non-default message may be added to a respective priority queue for various message categories, and control continues to step 2430.

In step 2430, a determination is made as to whether there are any more message candidates to be considered. If more message candidates are available, control jumps back to step 2440 where a next message is selected for consideration, and then back up to step 2400 where the next message is made available for processing; otherwise, control continues to step 2450.

In step 2450, the available size for all new non-default messages can be determined based on the difference between the total cache size and the amount of memory taken up by default messages. Next, in step 2452, the available memory for each category of messages can be calculated based on some "category ratio", parametric equation, or by some other set of rules and/or equations. Control continues to step 2454.

In step 2454, various messages having the lowest associated value can be marked for deletion for each message category in order to conform with the available memory for each respective category of messages. Next, in step 2456, those messages marked for deletion can be removed from the cache, and their respective value entries may also be removed from the respective priority queue. Then, in step 2458, those new messages marked for deletion can be requested, and their respective value entries may also be removed from the respective priority queue. Control continues to step 2460.

In step 2460, those new messages not marked for deletion can be added to the cache, and their respective value entries may be retained in the respective priority queue. Control continues to step 2470 where the process stops.

Multi-Level Cache Systems

In various embodiments, it should be appreciated that any of the cache systems discussed above (or later described below) may be modified into a "multi-level cache system" where information/attributes of a variety of targeted content messages may be stored locally, but some of the messages usable for display are stored locally while others are stored remotely. That is, for a particular mobile client a first section of cache memory may be reserved to store information about a set of content messages of interest while a second section of cache memory may be reserved to store a subset of those content messages on the mobile client while the remainder of content messages are stored in some remote server. Generally, the determination of whether content messages of interest reside in a mobile client or off-board may be determined by a set of rules residing in a message selector, such as the message selector 2310 of FIG. 23, and/or a related cache manager, such as the cache manager 122 of FIG. 23. Note that off-board storage may take place in any number of locations, such as the message delivery infrastructure 150 of FIG. 1, or any of the message distribution servers 1110, 1210, 1310 and/or 1410 of FIGS. 11-14.

Figure 25:
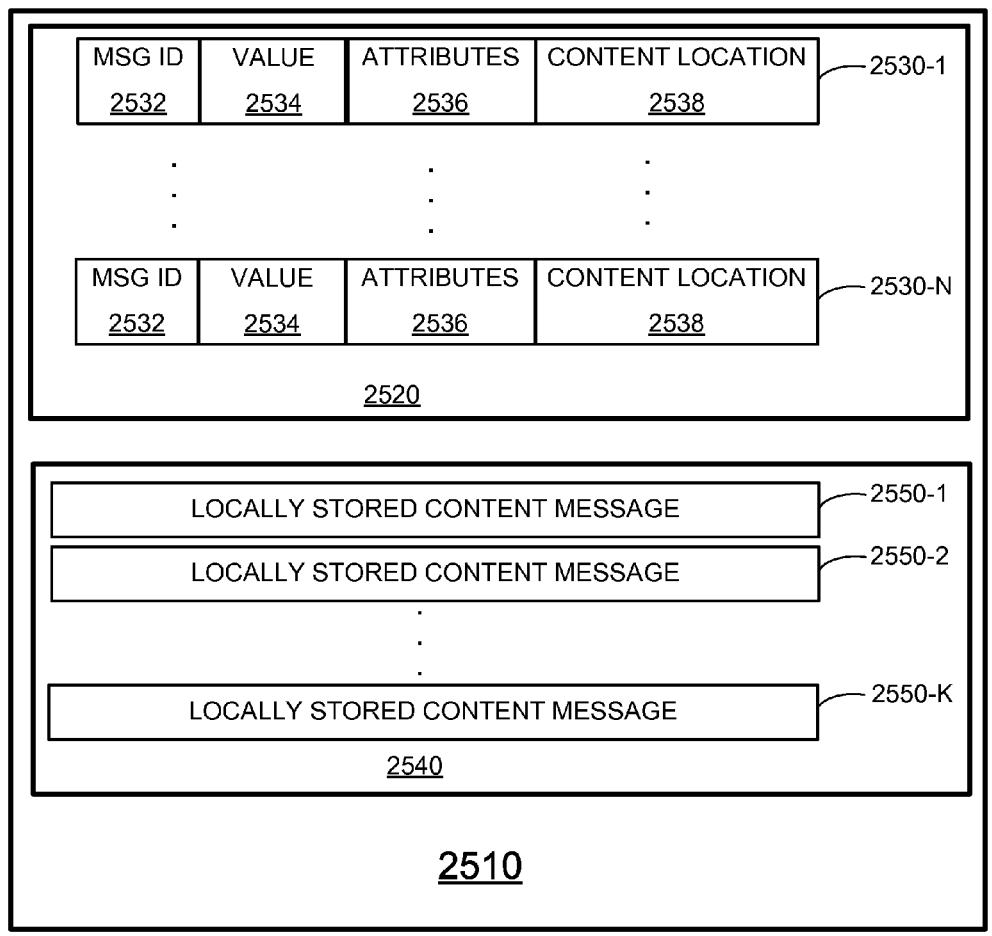
FIG. 25 depicts an exemplary multi-level cache system.

Continuing to FIG. 25, an exemplary multi-level cache system 2510 is depicted. The exemplary multi-level cache system 2510 includes an index cache 2520 and a message content cache 2540. As shown in FIG. 25, the index cache 250 can include a plurality of message records 2530-1 . . . 2530-N with each message record 3530-k (1≤k≤N) including a plurality of fields including a message ID field 2532, a message value field 2534, a message attributes field 2536, an a message content location field 2530.

The term "attributes" as it pertains to the immediate embodiment includes any number of features that may pertain to a targeted content message that may be used to derive a message value. Attributes may include message meta-data, the size of the message, the number of times each message has been viewed, a value representing the length of time a message has been available and/or will continue to be available and any other information that might be helpful in either describing the content of the respective message or some other aspect of the message. Other attributes are described below in greater detail. Note that the location information may be considered an attribute of each message in that locally stored messages may be given a greater value as compared to remotely stored messages.

Figure 26A:
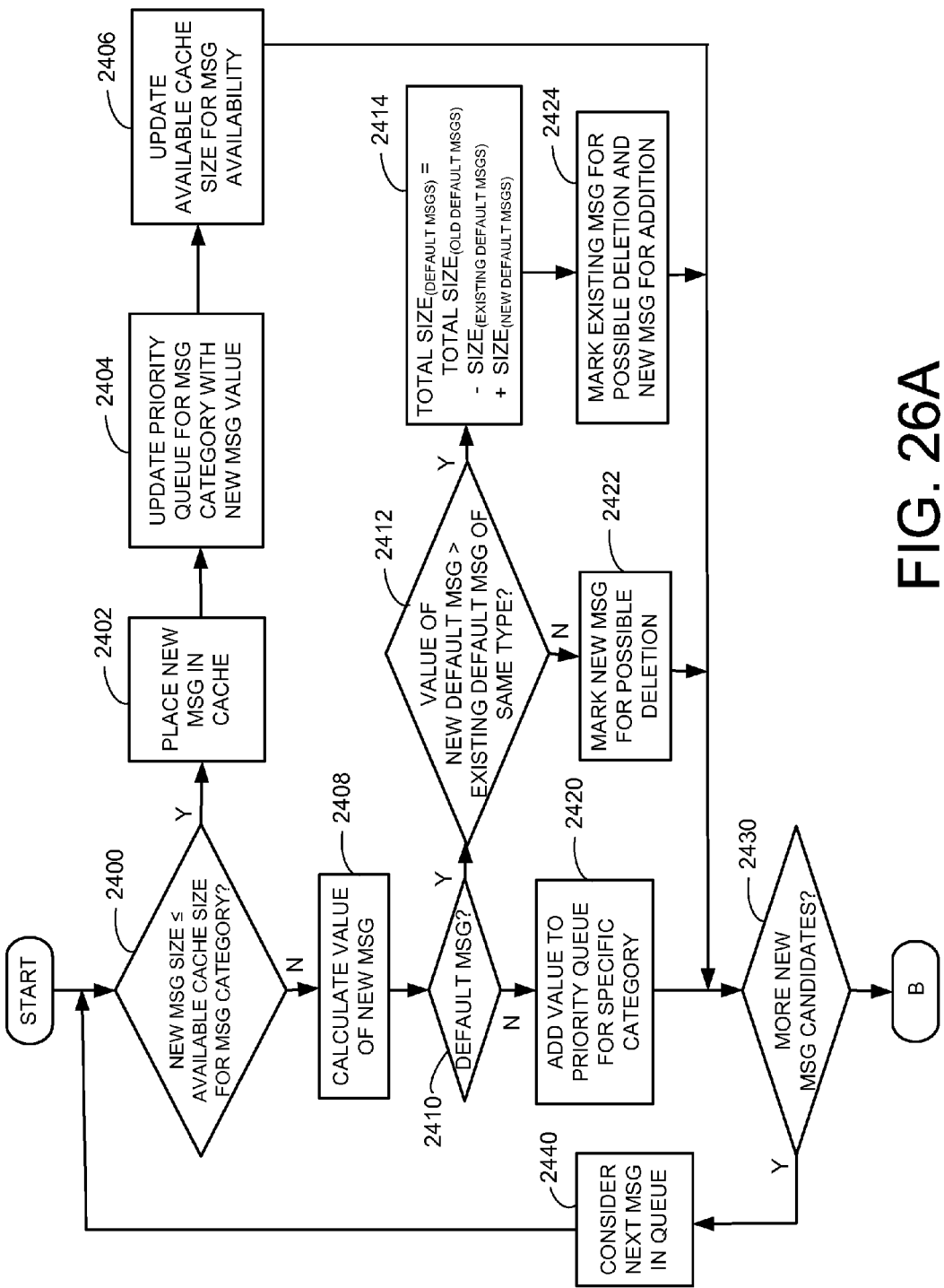
FIGS. 26A and 26B depict a flowchart of a message selection process incorporating a multi-level cache system.
Figure 26B:
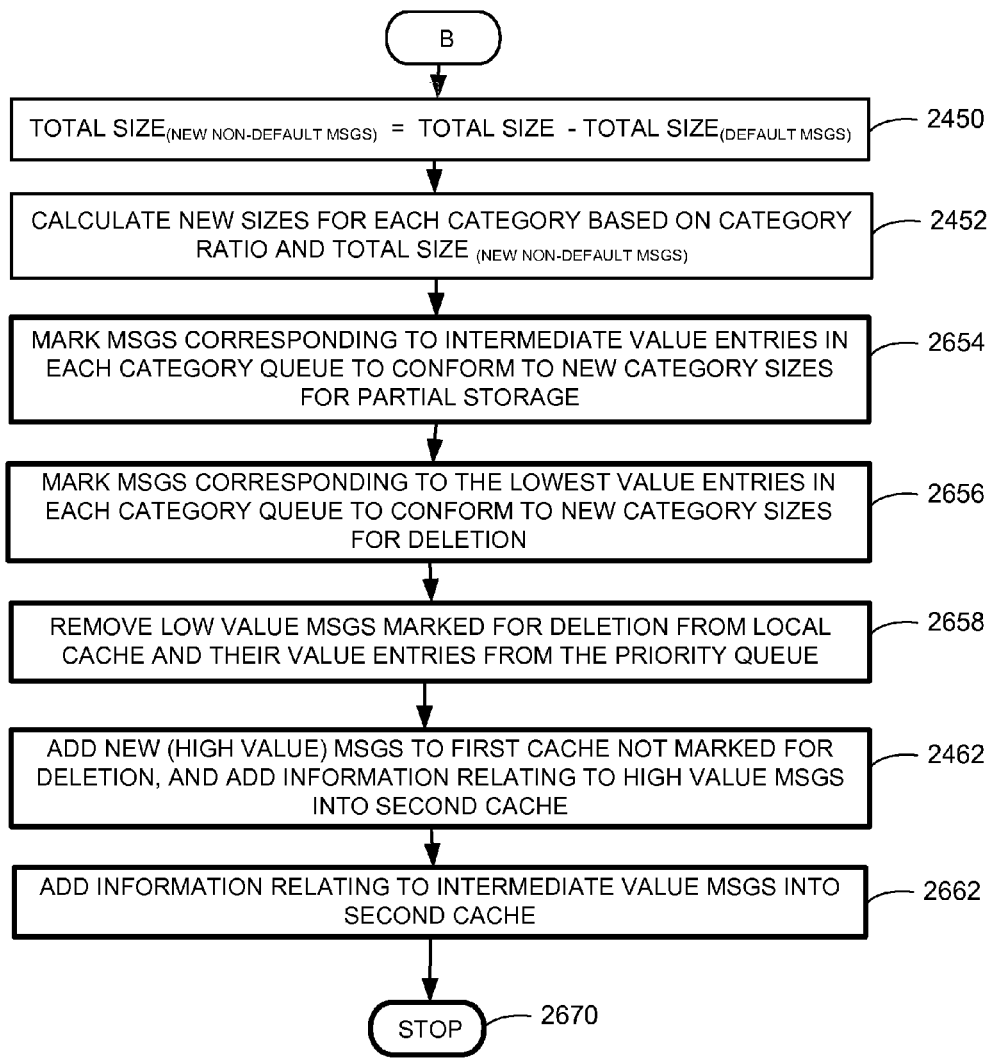

FIGS. 26A and 26B depict a flowchart for forming and populating a multi-level cache. As can be seen in FIGS. 26A and 26B, steps 2400 to 2452 can be identical or very similar to steps 2400 to 2452 of FIGS. 24A and 24B, and so no further discussion will be provided other than noting that new and existing messages are marked for "possible deletion" in steps 2422 and 2424, i.e., further consideration of the lower valued targeted content messages may be warranted.

Continuing to step 2654 of FIG. 26B, content messages having an "intermediate" value, i.e., a value showing that there may be some likelihood of interest to a user, but not a high enough value to store the message locally (possibly due to a large message size or some other attribute) are marked as intermediate-valued messages. Next, in step 2656, the content message having the lowest value entries may be marked for deletion, and in step 2658, the lowest-valued messages may be deleted/removed from a mobile client's memories. Control continues to step 2462.

In step 2462, high level message may be stored in a message content cache, such as the content cache 2540 of FIG. 25, and information relating to such high-valued messages may be stored in respective records in a message information cache, such as the index cache 2520 of FIG. 25, with some form of location indicator that the high-valued messages are available on-board of the subject mobile client. Next, in step 2464, information relating to the intermediate-valued messages can be stored in respective records in a message information cache, such as the index cache 2520 of FIG. 25, with some form of location indicator that the intermediate-valued messages are available off-board of the subject mobile client. Control then continues to step 2670 where the process stops.

In operation of a multi-level cache system, the mobile client (such as any of the mobile client embodiments described above) may need to display a content message. Accordingly, mobile client (using information from an available user profile) can create or modify a set of rules that, when applied to the attributes in the local message storage 2540, can allow the mobile device to select and display a message that a user of the mobile client will likely favorably receive. In various embodiments, such rules may take the form of any number of processes, such as a number of weighted parametric equations, a number of statistical operations, a number of artificial neural networks and so on.

Thus, by maintaining the various attributes 2536, various processing circuitry of a mobile client (such as circuitry processing the client applications 110 of FIG. 1) may compare the attributes of each message with a set of target attributes associated with a message request by the mobile client, and subsequently select a target message from one of the local storage 3310 or from a remote server, such as the server 150 of FIG. 1.

Should the mobile client select a remotely located message, the mobile client may download the requested message from the remote server onto the mobile client (typically, but not necessarily) via a wireless link. Such message may then be displayed at display, and (optionally) stored locally depending on some computed likelihood that the message would be again displayed.

Note that, given that a remote may not always be readily available and/or the quality of the link between the remote server and mobile client may vary substantially, link quality may be factored into message selection. In various embodiments, such factoring may take the form of weighting each remote message downward/negatively as compared to each locally stored message.

For situations where the link quality between the mobile client and remote server may drop so low as to be very small or nil, the mobile client' processing circuitry and/or embedded software applications may shape the rules such that the source of a target/displayed message, if not the actual message, is dictated by link quality. Thus, for situations where link quality drops below some threshold, the mobile client may select a local message rather than "hang up"/freeze or fail to display some content message.

Figure 27:
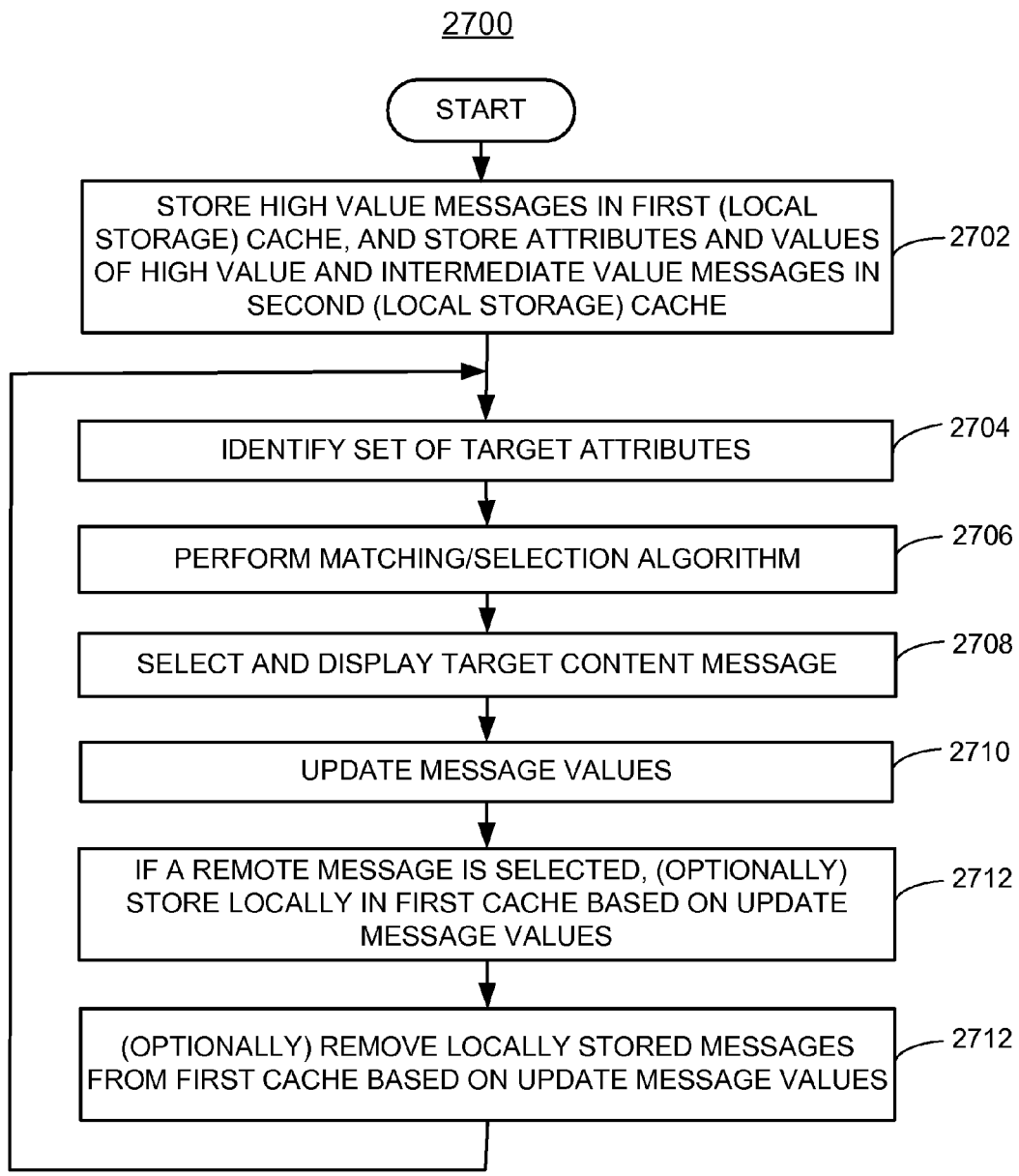
FIG. 27 is a flowchart of a second message selection process incorporating a multi-level cache system.

Continuing to FIG. 27, a flowchart outlining the steps for using a multi-level cache system is disclosed. The process starts in step 2702 where a set of locally stored content messages and a set of remotely stored content messages are provided for use by a mobile client noting that the flowchart of FIGS. 26A and 26B outline but one of many possible processes to accomplish step 2702. Note that step 2702 includes forming a set of attributes for both locally and remotely stored content messages. Control continues to step 2704.

In step 2704, a set of target attributes is identified by the respective mobile client in response to some need to provide a message to a user of the mobile device. For example, the mobile client may need to identify a set of attributes including meta-data relating to alcoholic beverages, a form attribute of a video stream lasting between 10 and 20 seconds, and a requirement that the respective content message be provided by a specific set of advertisers. Next, in step 2706, a matching algorithm/process, such as a parametric equation, may be used to match the target attributes and the various attributes of locally and remotely stored content messages to provide a selected content message. In various embodiments, non-locally stored content messages may be optionally weighted lower than locally stored messages, and that the quality of an available link between the mobile client and the remote source containing a remote content message may come into play. For example, if an available wireless link to the mobile client is at full capacity, there may be no negative weighting for off-board content message while a link quality below a 50% threshold may cause off-board content message to be weighted negatively by some first amount and a link quality below a 10% threshold may completely preclude the use of off-board content messages. As it may be desirable to avoid delivering some "null" message or some unproductive "message not available" indication, low link quality may play an important role in the selection of locally available content messages, even when such locally available content messages score poorly compared to their remote counterparts.

Continuing, in step 2708, the selected content message may be displayed noting that in the situation where an off-board message is selected, the mobile client may need to request the selected message from a remote server using a wireless (or other) link, and the selected message will need to be provided to the mobile client via an appropriate link. Control continues to step 2710.

In step 2710, various message values may optionally be updated to reflect issues such as the selected content message has been played too much, the user reacted favorable/unfavorably, and so on. Then, in step, 2712, if a remote content message was selected and downloaded, the remote content message may be stored locally depending on its respective value. Next, in step 2712, locally stored content messages may be removed from local storage and their information entries possibly (but not necessarily) removed as well based on their updated values. Control then jumps back up to step 2704 where steps 2704-2712 may be repeated as desired or necessary.

Message Values and Message Value Attributes

With respect to determining message values and message value attributes, the following may be considered:

Message Value Attributes: Calculating a value for a message may consider a number of attributes, based on the type of message. While a number of these attributes may be defined by a server to maintain centralized control over a message delivery scheme, e.g., an advertising campaign, across a message-enabled communication system, some of the attributes that go into message value calculation may be determined on the mobile client/W-AT based on how the respective user interacts with the message.

Server Based Value Attributes:

Revenue indicator (RI): A value in the range of 1 to N (e.g., 100) indicative of the revenue earned per serving/clicking of the message/ad. Higher values indicate higher revenue.

Priority indicator (PI): A value in the range of 1 to M (e.g., 10) indicative of the priority level the system operator has scheduled for the message based on some measure of performance, e.g., the effectiveness of an advertiser's ad campaign, over a mobile message delivery system. This number may be increased by an operator to increase the priority of a given message delivery campaign.

Start and end time of message delivery campaign ($T_{START}$ and $T_{END}$): UTC time for the message delivery campaign viewing start time and message campaign viewing end time. After the message campaign viewing end time, the message can expire and may be no longer shown within the mobile message delivery system. It also may be removed from the respective cache at this time.

Overall system click-through rate (CTR): This is an optional attribute included by a server to indicate the overall click through rate of a message campaign across all clients with the target user profile that were served the message within the mobile message delivery system. CTR may be applicable only for user-action or click based messages/ads. The CTR also may have a confidence level ($CTR_{CONFIDENCE}$) associated with it that is indicative of the accuracy of the CTR. If $CTR_{CONFIDENCE}$ is below a certain threshold, a random CTR in the range of 1 to P (e.g., 100) may be generated to be alternatively used in the respective value calculation. This can allow the system to test how a particular new message/ad campaign would do with a subscriber segment.

Target message serve count ($MAX_{SERVE}$): This is an attribute that defines the maximum number of times the same message can be shown to the same user.

Target user actions count ($MAX_{USERACTION}$): This is an attribute that defines the maximum number of times a user acts upon a served message after which the message can be expired from the respective cache. In various embodiments, this attribute may be applicable only for user-action or click-based messages/ads.

Max message serve count per day ($DAILYMAX_{SERVE}$): This is an attribute that defines the maximum number of times the same message can be shown to the same user within a single day.

Max user action count per day ($DAILYMAX_{USER\_ACTION}$): This is an attribute that defines the maximum number of times a user acts upon a served message after which the message is not served to the user for that day. In various embodiments, this attribute may be applicable only for user-action or click-based messages/ads.

Client Based Value Attributes:

Cumulative message served count ($CUM_{SERVE}$): The number of times an existing message has already been served to a particular user.

Cumulative user action count ($CUM_{USER\_ACTION}$): The number of times an existing message has invoked a user action. Together with the cumulative message served count, the cumulative user action count can be used to calculate a local client click-through rate (LCTR) for the message. In various embodiments, this attribute may be applicable only for user-action or click-based messages/ads.

Cumulative message served count per day ($DAILYCUM_{SERVE}$): The number of times an existing message has already been served to the user in a given day. This value may be reset to 0 at the beginning of each 24 hour period.

Cumulative user action count per day ($DAILYCUM_{USER\_ACTION}$): The number of times an existing message has invoked a user action in a given day. This value can be reset to 0 at the beginning of each 24 hour period. In various embodiments, this attribute may be applicable only for user-action or click-based ads.

User Profile match indicator (MI): This number, typically between 1 and 100, may be indicative of how well the target user profile matches the user profile of the user of the mobile message distribution enabled client.

Cache miss state match indicator ($FLAG_{CACHE\_MISS\_MI}$): There may be cases where applications ask for messages from the cache manager but none of the messages in the cache match the application gating criteria. Such instances can be recorded by the cache manager. This attribute determines whether the new message matches the most recent recorded cache misses. It can be a logical "1" if it matches one of the recent cache misses and a logical "0" otherwise. The flag can be reset once the message is accessed by an application from the cache. If the new message is selected for cache entry, the cache miss entry can be removed from the list of recorded cache misses.

Playback Probability Indicator (PPI): This number, between 0 to P (e.g., 100), can be indicative of the playback probability of the message, based on the number applications subscribed with the filtering agent capable of playing back the particular message type, the relative usage of the applications by the device user, and so on.

Since some of the value attributes are applicable for only certain kind of messages, the value calculation can be different for different categories of messages. A separate priority queue can be maintained for each category based on the values calculated using the formula for that particular category.

Message Value Calculation Formulae: The filter rules from the System Operator may determine the value calculation formula for each category and any weights that go into the calculation. An exemplary generic representation of a formula used to calculate a message value (V) in each category is:

$$V = (\Pi_{a=1\ to\ m} MULT\_ATTR_a * (\Sigma_{b=1\ to\ n} ADD\_ATTR_b / MAX\_ADD\_ATTR_b * WT_b)) / (\Sigma_{b=1\ to\ n} WT_b * Size_{AD})$$

with the normalized message value being:

$$\text{Normalized } V = \Sigma_{i=k\ to\ N} V * (MAX_{SERVEi} - CUM_{SERVEi}) * f(\tau)$$

where $MULT\_ATTR_a$ is the $a^{th}$ multiplicative value attribute, $ADD\_ATTR_b$ is the $b^{th}$ additive value attribute, $MAX\_ADD\_ATTR_b$ is the max value for the $b^{th}$ additive value attribute, $WT_b$ is the weight assigned to the $b^{th}$ additive attribute in the formula, $\tau = t_{ELAPSEDi}/T_{INTERVALi}$, and $f(\tau)$ is a time-based value decay function, $T_{INTERVALi}$ is the $i^{th}$ interval duration during which the message will be shown, $t_{ELAPSEDi}$ is the time that has already elapsed in the $i^{th}$ interval, $MAX_{SERVEi}$ is the maximum number of times the same message can be shown to the same user within the $i^{th}$ interval, and $CUM_{SERVEi}$ is the number of times an existing message has already been served to the user within the $i^{th}$ interval.

Following are some examples of value calculation formulae for different categories.

Value calculation for impression based targeted messages:

$$VAL = (PI/10 * [(RI/100 * WT_{RI}) + (MI/100 * WT_{MI}) + (FLAG_{CACHE\_MISS\_MI} * WT_{CACHE\_MISS\_MI}) + (PPI/100 * WT_{PPI})]) / ((WT_{RI} + WT_{MI} + WT_{CACHE\_MISS\_MI} + WT_{PPI}) * Size_{MSG})$$

Value calculation for impression based non-targeted messages:

$$VAL = (PI/10 * [(RI/100 * WT_{RI}) + (FLAG_{CACHE\_MISS\_MI} * WT_{CACHE\_MISS\_MI}) + (PPI/100 * WT_{PPI})]) / ((WT_{RI} + WT_{CACHE\_MISS\_MI} + WT_{PPI}) * Size_{AD})$$

Value calculation for user-action based targeted messages:

$$VAL = (PI/10 * [(RI/100 * WT_{RI}) + (MI/100 * WT_{MI}) + (FLAG_{CACHE\_MISS\_MI} * WT_{CACHE\_MISS\_MI}) + (PPI/100 * WT_{PPI}) + (CTR * WT_{CTR}) + (LCTR * WT_{LCTR})]) / ((WT_{RI} + WT_{MI} + WT_{CACHE\_MISS\_MI} + WT_{CTR} + WT_{LCTR} + WT_{PPI}) * Size_{MSG})$$

Value calculation for user-action based non-targeted messages:

$$VAL = (PI/10 * [(RI/100 * WT_{RI}) + (FLAG_{CACHE\_MISS\_MI} * WT_{CACHE\_MISS\_MI}) + (PPI/100 * WT_{PPI}) + (CTR * WT_{CTR}) + (LCTR * WT_{LCTR})]) / (WT_{RI} + WT_{CACHE\_MISS\_MI} + WT_{CTR} + WT_{LCTR} + WT_{PPI}) * Size_{MSG})$$

where RI is the revenue indicator value on a scale of 1 to 100, PI is the priority indicator value on a scale of 1 to 10, CTR is the click-through rate for the message within the system for the given user profile, LCTR is the click-through rate for the message for the specific client, MI is the match indicator between the target user profile and the user's profile on a scale of 1 to 100, $FLAG_{CACHE\_MISS\_MI}$ is the match indicator between the message type and the cache miss state with a value of either 0 or 1, PPI is the message playback probability indicator on a scale of 1 to 100, $WT_{RI}$ is the weight for the revenue indicator in the calculation, $WT_{MI}$ is the weight for the match indicator in the calculation, $WT_{CACHE\_MISS\_MI}$ is the weight for the cache miss state match flag in the calculation, $WT_{CTR}$ is the weight for the user profile specific system click-through rate in the calculation, $WT_{LCTR}$ is the weight for the client specific click-through rate for the message in the calculation, and $WT_{PPI}$ is the weight for the message playback probability indicator in the value calculation.

Examples for $f(\tau)$:

Linear decay: $f(\tau) = (1-\tau) * u(1-\tau)$

Faster exponential decay bounded by linear decay: $f(\tau) = (1-\tau)e^{-\lambda\tau} * u(1-\tau)$ noting that when $\lambda=0$ linear decay occurs; when $\tau=0$, $f(\tau)=1$; and when $\tau=1$, $f(\tau)=0$.

Slower sigmoid decay bounded by linear decay: $f(\tau) = (1-\tau)[(1+\alpha)/(1+\alpha e^{\lambda\tau})] * u(1-\tau)$ noting that when $\lambda=0$ linear decay occurs; when $\tau=0$, $f(\tau)=1$; and when $\tau=1$, $f(\tau)=0$, and further noting that $u(x)=1$ when $x>0$; and $u(x)=0$ when $x<=0$. Also, $\lambda$ and $\alpha$ are value decay rate constants specified by the system operator based on time Message Match Indicator Calculation: As briefly alluded above, the User Profile Match Indicator (MI) may be a number, and not necessarily between 0 and 100, which is indicative of how well the target user profile matches the user profile of the user of the Mobile Message Delivery Enabled Client and either his past message/advertisement viewing history or some metric of the his message/advertisement preference(s). Though the MI can be described as a scalar numerical quantity, it should be appreciated that one or more alternative "weighting" schemes can be devised, for example, using a polynomial function or vectors, according to design preference. Thus, other values (scalar or non-scalar, single valued or multi-valued, for example) can be assigned without departing from the spirit and scope of this disclosure.

For illustrative purposes, several implementations of a advertisement match indication calculation is described, using a scale quantity between 0 and 100, since this is one of the simplest ranges that can be given. Other ranges may used as desired. One such implementation utilizes fuzzy logic which can be used to generate confidence level values for each of the independent target rule groups specified by the advertiser. From these confidence levels, a weighted summation of these confidence levels can be used to arrive at the match indicator value for the advertisement to the user's profile. The following, non-limiting equation, may be used as an example of one type of fuzzy logic, $$MI = (\Sigma_{b=1\ to\ n} CONF\_LEVEL_b * WT_b) / (\Sigma_{b=1\ to\ n} WT_b)$$

where the overall match indicator for the message to the user's profile (MI) is related to the sum of confidence levels (CONF_LEVEL) times a weight (WT) corresponding to an attribute value (b) divided by the sum of the weight (WT) corresponding to the $b^{th}$ additive attribute.

As an example of confidence level calculation, presume an advertiser who desires to target his advertisement(s) towards females, to females who are in the age range of 15-24 and with an income above 40K, or who are in the age range of 25-34 and with an income greater than 70K. Knowing the values of the user profile elements of interest and presuming the associated confidence levels are:

| User Profile Element Value | Confidence |
| --- | --- |
| Female | 50% |
| Age: 15-24 | 40% |
| Age: 25-34 | 35% |

| User Profile Element Value | Confidence |
|---|---|
| Income: >40K | 65% |
| Income: >70K | 45% |

The confidence level for the rule groups are: Female=50%

For the composite rule group of age 15-24 and with income above 40K, or age 25-34 and with income greater than 70K, a maximum/minimum approach can be used. For example, taking the maximum value of the minimum of the two groupings (e.g., MAX (MIN (40, 65), MIN (35, 45)) results in MAX (40, 35), which is a 40% confidence level for this grouping.

The overall MI for the entire rule groups would be the combination of the "female" confidence level 50% and the composite confidence level 40%, factored by the associated $WT_b$ and divided by the sum of the associated $WT_b$'s. As stated above, other forms of fuzzy logic may be used without departing from the spirit and scope of this invention.

While this demonstrates one approach to determining the User Profile Match Indicator value, other approaches such as statistical averaging, curve fitting, regression analysis, and so forth may be used to arrive at a reasoned indication of the match between the advertisement's target profile and the user's profile. Though the above approaches are understood to be primarily scalar approaches, non-scalar approaches using vector representations (e.g., dot-product), artificial neural net topologies, etc. may be used.

For example, the confidence levels each attribute for an individual rule group may be represented by an n-dimensional vector. The n-dimensional vector may be a dot-product with other m-dimensional individual groups, if necessary (for example, if the different individual rule groups are separately vectorized), to result in an overall intersection or projection of the advertising rule group confidence. This value can then be scalar manipulated or "dot-product ed" (depending on the projection space) with a mathematical representation of the user's profile, to generate a match indication confidence level.

Other match-type algorithms such as a bubble or hierarchal approach may be used. Of course, it should be understood that various forms of these and other approaches may be used, if so desired to arrive at a more precise and/or efficient determination of the advertisement match. Match algorithms may be resident on the mobile message delivery system or on the mobile message delivery enabled client, if so desired. Additionally, depending on a chosen configuration and resources, portions of these algorithms may be parsed between the message delivery system or the message delivery enabled client.

Figure 28:
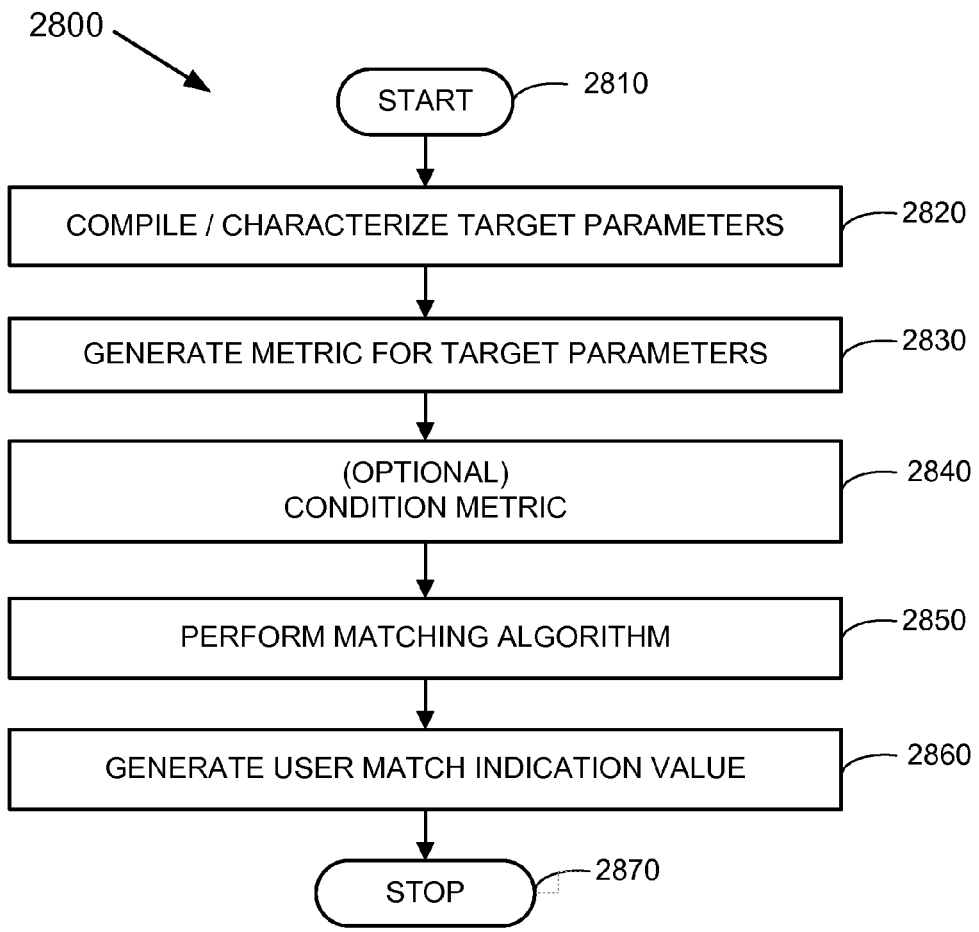
FIG. 28 is a flowchart illustrating an exemplary User Profile Match Indicator (MI) process.

FIG. 28 is a flow chart illustrating an exemplary User Profile Match Indicator (MI) process 2800 according to an embodiment of this invention. The exemplary process 2800 embodies any one or more of the algorithms/schemes discussed above. The exemplary process 2800 is initiated at step 2810, and continues to step 2820 whereupon message target parameters, e.g., an advertiser's advertisement target parameters, are compiled or characterized.

Next, in step 2830, the exemplary process can proceeds to generating a metric or mathematical representation of the target parameters. In various embodiments, this step may simply entail a conversion of the parameter characteristics into a manageable number, such as a scalar value having a range between 0 to 100. Of course, any range, whether positive and/or negative may be used, depending on design preference. Step 2830 can enable an advertisement's target parameters to be represented by a mathematical expression or value. For example, if an advertiser desires to target all females and is not privy to the female-to-male subscriber ratio, then his request would be converted according to the provider's subscriber population breakdown. That is, presuming a 1:1 female-to-male ratio in the provider's subscriber population, this would be a value of 50% or 0.50. Alternately, if the respective subscriber gender ratio for a particular provider is 1:2, then this would translate to an approximate 33.3% subscriber population, or an approximate value of 0.333.

It should be understood that other manipulations may be performed on the target parameters, such as a conversion to a vector or a parameterized expression. Also, depending on the initial format in which that the target parameters are presented, step 2830 may simply consists of forwarding the parameters to the next step with little or no manipulation. That is, target parameters may already be in a form amenable for processing by the subsequent steps and may not necessitate any conversion. Control continues to step 2840.

In step 2840, an optional conditioning or transformation of the formulated mathematical expression or metric may take place. For example, depending on the complexity of a message's target parameters and the definition space allocated to the message's target parameters, further processing and manipulation may need to be performed. For example, a correlation between different advertisement target parameters may be performed. For instance, if an advertiser desires a female target profile having an age range of between 18-24 years within a particular area code who are new subscribers, confidence levels or other types of mathematical inferences can be made, to provide a simpler or more efficient representation of the entire advertisement target parameter set. It should be appreciated that other forms of correlation or manipulation may be used as deemed appropriate. Additionally, based on the processing capabilities of the mobile client and/or other practical considerations, it may be desired to refine the metric or reduce the complexity of the metric for more effective or more efficient matching. Control continues to step 2840.

In step 2850, a message match algorithm may be performed to determine a match metric or suitability of fit for the message target profile to the user profile. It should be apparent that this process may use any one of several possible matching algorithms described herein or known in the arts. Non-limiting examples are fuzzy logic, statistical methods, neural nets, bubble, hierarchal, and so forth. Next, in step 2860, an overall user match indication value, overall confidence level or other metric of indicating the level of suitability of the message to the user's profile can be generated. Upon a determination of the user match profile indication, which may, for example, simply be a scalar number or a "yes" or "no" value, control continues to step 2870 where the process is terminated.

Based on the above exemplary process 2800, advertisements and other messages designated for target populations can be matched with a user's profile to determine the suitability of the message/advertisement to the user's profile. Thus, if a high or acceptable match indication is given, the message/advertisement can be forwarded to the user in the expectation that the user will respond favorably to the message, or as per arrangements made with the user. Accordingly, advertisements/messages that are "tailored" to the user can be efficiently disseminated to the user.

Figure 29:
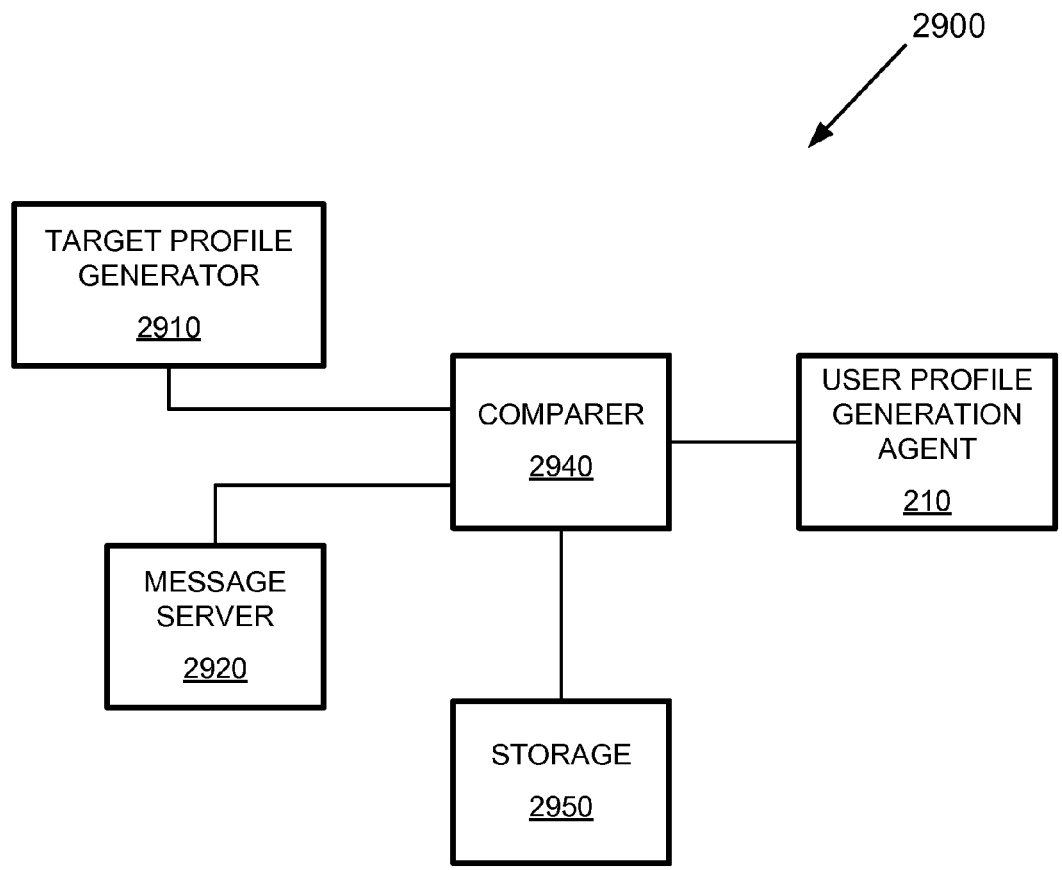
FIG. 29 is a block diagram illustrating an exemplary user profile match indicator.

FIG. 29 is a block diagram illustrating an exemplary user profile match indicator 2900, according to an embodiment of this invention. The exemplary user profile match indicator 2900 includes a target profile generator 2910, an advertisement server 2920, a user profile generator 2930, a profile-to-profile comparer 2940, and a storage system 2960.

In operation, the comparer 2940 may be housed in a user system (not shown) and can compare information forwarded by the target profile generator 2910 against information forwarded by the user profile generator 2930. The target profile generator 2910 may forward attributes related to the advertisements provided by the advertising server 2920, wherein the information/attributes can be compared to the information/attributes of the user's profile, as provided by the user profile generator 2930. Based on algorithms contained in the comparer 2940, a match indication can be formulated designating the level of suitability or confidence level of the target profile to the user profile. Based on the match indication, advertisements and/or information from the advertisement server that are consistent with the attributes of the target profile may be forwarded to storage system 2960. The storage system 2960 may be resident on the user system. Accordingly, "tailored" advertisements and/or information may be forwarded to a user without compromising the privacy of the user's profile.

Figure 30:
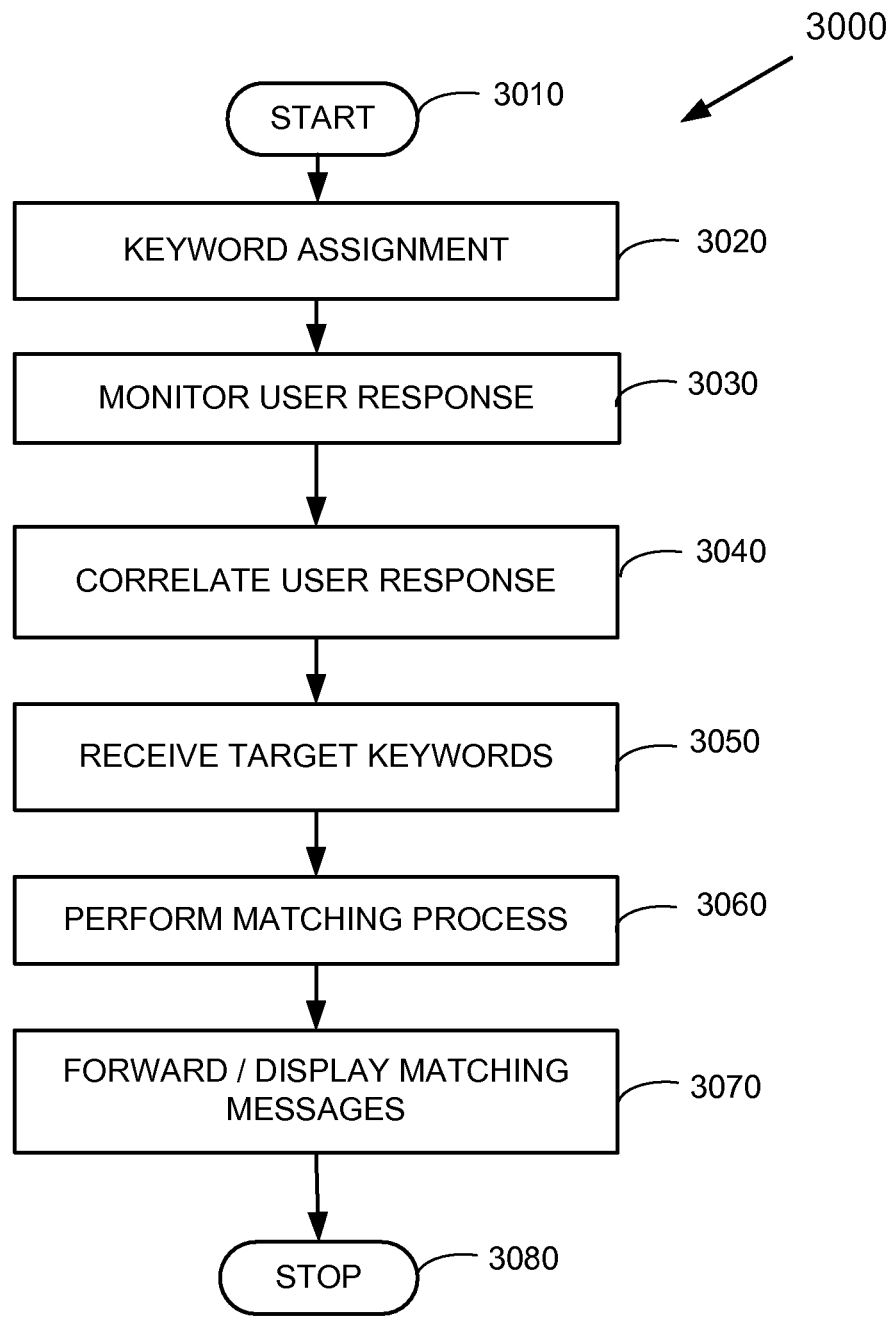
FIG. 30 is a flow chart of an exemplary keyword correlation process.

Keyword Correlation based on past viewing history: One of the potential inputs in a match indicator calculation described above may be a correlation value derived between the previous messages viewed, i.e. a "viewing history" of the user and new messages. In this context, or messages may be associated with keywords from a dictionary at the advertisement sales interface, according to design preference. With respect to FIG. 30, a process is described that describes an exemplary generation and use of keyword associated message delivery.

The process starts in step 3010 and continues to step 3020 where keywords can be assigned to various messages. For example, an advertisement directed to women's apparel may have four keywords including "fashion", "female", "clothing" and "expensive". The keyword(s) may be broadly associated with a genre of advertisements/messages or may be individually associated with a particular species of advertisement(s)/message(s). Thus, depending on the level of resolution or discrimination desired, more than one keyword may be associated with a particular advertisement/message or vice versus. In various embodiments, keywords may be limited to an advertisement/message dictionary or index.

Continuing, such keywords can be given weights (e.g., a number between 0 and 1) to help describe the strength of association between a particular message and the meaning of the keyword. If keywords are determined to not have an associated or impressed weight, their weights can be assumed to be 1/n where n is the total number of keywords associated with a message. In this manner, a gross averaging weight can be applied by the 1/n factor, in some sense to normalize the overall keyword values to within a desired range.

Assigned weights can provide some degree of normalization, especially in the context of multiple keywords (for example, 1/n, given n keywords, with each keyword having a maximum value of 1), or can be used to "value" the keyword or the advertisement/message according a predetermined threshold or estimation. For example, some keywords may have a higher or lower relevance depending on current events or some other factor. Thus, emphasis or de-emphasis can be imposed on these particular keywords via the weighting, as deemed appropriate. Step 3020 is presumed to have the measure of assigning a weight to the keyword as part of the keyword association for a fixed keyword value estimation. However, in some instances a weight may not have been pre-assigned or the weight valuation is undetermined. In those instances, an arbitrary value can be assigned to the keyword, for example, a weight of 1. It is presumed that these keywords are forwarded to a mobile client. Control continues to step 3030.

In step 3030, user response to messages may be monitored. In operation, messages can be presented to users whereupon the users may choose to "click" on them or not. As should be apparent in this technology, the term "click" can be assumed to mean any form of user response to the presence of the message or as part of an operational message sequence. In some user embodiments, a lack of response may be construed as an affirmative non-click or click-away response, analogous in some contexts to a de-selection. Thus, a mobile client user's response to various advertisements/messages can be historically gauged.

By monitoring the user's "click" response in relation to a general population or even a targeted population of advertisements/messages, an initial assessment of the user's interests can be obtained.

In various embodiments, a user's response time for a given advertisement/message or a series of advertisements/messages can also be used to gauge the user's interest therein. For example, a user may click through several advertisements/messages, each having different degrees of relevance or keywords, and the rate of click through or tunneling can be understood to be indicative of user interest. Control continues to step 3040.

In step 3040, a comparison of the user selection (for example, click) of a particular advertisement/message and its corresponding keyword(s) can be performed to establish at least a "baseline" correlation metric. Again, it may be noted that the selection of and/or rate of selection can be used in determining the user's interest in a keyword-associated advertisement/message. By this comparison, a correlation between the various keyword and the user's advertisement/message preference may be provided. This correlation can be accomplished using any one of several methods, such as, for example, statistical methods, fuzzy logic, neural techniques, vector mapping, principal components analysis, and so forth. From step 3040, a correlation metric of the user's response to an advertisement/message can be generated.

In various exemplary embodiments, a "keyword correlation engine" embedded on a message delivery system and/or W-AT may track the total number of times a particular message/advertisement may presented (or forwarded) to a user with a particular keyword (for example, N_total-keyword) along with the total number of clicks for that keyword (for example, N_click-keyword). The ratio of N_click-keyword/N_total-keyword may be computed to determine the correlation of the keyword to the user's response. The weight for a keyword for a message may be assumed to be 1 if the keyword is specified without an associated weight for a given message. By formulating a ratio as described above, a metric for gauging the reaction or interest of the user to a keyword tagged advertisement can be generated, and refinements or improvements to the match can be devised accordingly. In the above example, affirmative clicks can be used to indicate a user's interest. However, again it should also be appreciated that in some embodiments, a non-click or lack of direct response also may be used to infer an interest level or match relevance.

As an illustration of one exemplary implementation, assume that there are N keywords for a given advertisement(s). An N-dimensional vector A can be created based on the associated keyword weights. An N-dimensional correlation vector B can be created with the correlation measure of each keyword for the advertisement(s) to the user in each dimension. A scalar correlation measure C, to establish the correlation of the advertisement to the user, can then be created which is a function of the vectors A and B. The correlation measure C may be, in some embodiments, simply a dot product of the vectors A and B (C=A·B as C=(1/N)A·B). This scalar correlation measure C offers a very simple and direct measure of how well the advertisement is targeted to the specific user based on his previous advertisement viewing history. Of course, other methods may be used to correlate the A-to-B correspondence, such as parameterization, non-scalar transformations, and so forth.

The above approach assumes that the keyword dictionary has keywords that are independent of each other. Should the keywords be inter-related, fuzzy logic can be used to come up with a combined weight for the set of inter-related keywords. Other forms of logic or correlation can be implemented, such as polynomial fitting, vector space analysis, principal components analysis, statistical matching, artificial neural nets, and so forth. Therefore, the exemplary embodiments described herein may use any form of matching or keyword-to-user correlation algorithm as deemed necessary. Control continues to step 3050.

In step 3050, the mobile client or user may receive "target keyword(s)" associated with various prospective targeted messages/advertisements. Next, in step 3060, the received target keyword(s) may be evaluated to determine if there is a match or if the keyword(s) meet an acceptable threshold. In various embodiments, a matching evaluation can involve higher algorithms, such as statistical methods, fuzzy logic, neural techniques, vector mapping, principal components analysis, and so forth, if so desired. It should be appreciated that the correlation process of step 3040 and the matching process of step 3060 may be complementary. That is, different algorithms may be used with the respect processes, depending on design preference or depending on the type of advertisement/message keyword forwarded. Control continues to step 3070.

In step 3070, those targeted messages deemed to match within a threshold of acceptance may be forward and/or displayed to the user. The forwarding of the advertisement/message may take any one of several forms, one such form, for example, being simply permitting the matching advertisement/message to be received and viewed by the user's device. In some embodiments, a non-match advertisement/message may be forwarded to the user, but is disabled so as to prevent instantiation or viewing. Thus, in the event that the user's preferences or profile is subsequently modified, a prior non-acceptable advertisement/message but now acceptable advertisement/message may be resident on the user's device and appropriately viewed. Of course, other schemes for making available advertisements/messages that are deemed to be "matching" or "non-matching" may be devised without departing from the spirit and scope of this invention. After step 3070, the exemplary process 3000 proceeds to step 3080 where the process is terminated.

By use of the above exemplary process 3000, targeted advertising/messages can be filtered to be apropos to the user's interests. The user's interests can be initially established by historically monitoring the user's "click" response on the user's mobile client against a set of advertisements/messages via keyword assignment and matching. Dynamic monitoring can then also be accomplished by updating the user's interest profile, based on currently observed user response(s). Accordingly, a more direct or more efficient dissemination of targeted advertisements/messages can be obtained, resulting in a more satisfying mobile client experience.

Continuing, note that a significant amount of information can flow through a mobile device associated with a user during the lifetime of the device. The user may interact with some fraction of the information that is presented to it. Due to memory constraints, it may be impossible to store all such information on the mobile device itself. It may not even be feasible to store all the meta-data and the user responses associated with all such information flowing through the device as well. Thus, it may be desirable to create a user model that captures user preferences based on user behavior, so that relevant content/information can be presented to the user, without having to store all past information related to the user.

Figure 31:
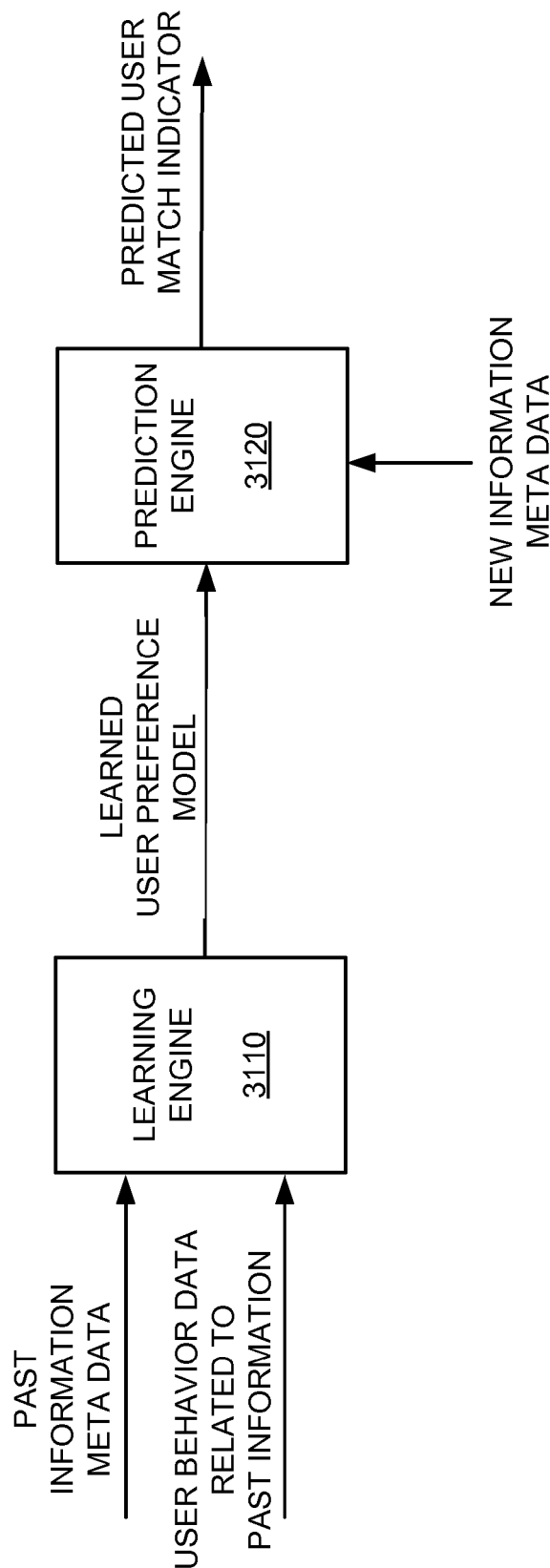
FIG. 31 block diagram illustrating an exemplary learning and prediction engine.

Accordingly, as shown in FIG. 31, it may be desirable to create a "keyword learning engine" 3110 capable of capturing user preferences and presented information. Along with the keyword learning engine, it may be desirable to have a "keyword prediction engine" 3120 based on a learned model, to suggest the likelihood of user interest for new information that is presented to the user. This could help in filtering new content as it arrives on a mobile device, so that relevant information can be presented to the user.

In operation, meta-data associated with information arriving at a mobile device can be used in the learning and prediction engines 3110 and 3120. Any user responses associated with presented information can be also used in the learning engine 3120. During operation, the learning engine 3110 may use all past information, e.g., meta-data and the user behavior associated with the respective presented information. Based on the input, the learn engine 3110 can refine such input to provide a learned user preference model. This user preference model may then be used in a prediction engine, which can receive meta-data related to new information, then correlate the meta-data with the user preference model to provide a predicted user match indicator/indication for the new information. This user match indicator/indication can then be used to determine whether or not the information is presented to the user.

It is to be appreciated that user preferences can be contextual with respect to the activity that is being learned. For example, a user may have different preferences with regard to advertisements that the user would like to see, and a different set of preferences with regard to web pages that the user would like to browse. For example, a user may read news on the web about crime in the local community news to be aware of such activity from a safety standpoint; however, that should not imply that the user would be interested in purchasing a gun through an advertisement. Therefore a message presentation engine on the platform could reflect different user preferences relative to the web browser preferences of the user. Other contexts could include user preferences related to a music application on the platform or a sports application on the platform. In general, learning and prediction engines may be required for every context.

In this document, an exemplary architecture and algorithm for learning and prediction for a given context, such as processing targeted-content-messages/advertisements, is provided. The suggested architecture and algorithms can be applied to different contexts without loss of generality.

One task at issue is to learn user preferences from a user's phone usage habits in the given context, such as learning their likes and dislikes from their response to targeted-content-messages (such as an advertisements) that are presented to the user. The goal is to provide a solution with a learning algorithm that is fast and that does not scale with amount of data presented.

Additionally, based on a model that is learned by the system, when a new message/information arrives at a mobile device, the available prediction engine may present a match indicator for the information relative to the learned preferences of the given user. This match indicator can be used along with other system constraints (such as revenue or size information optionally) to take a decision on whether to present the information real-time to the user, or to take a decision on whether to store the information on the user's mobile device such as in a space-constrained targeted-content-message cache on the mobile device.

Figure 32:
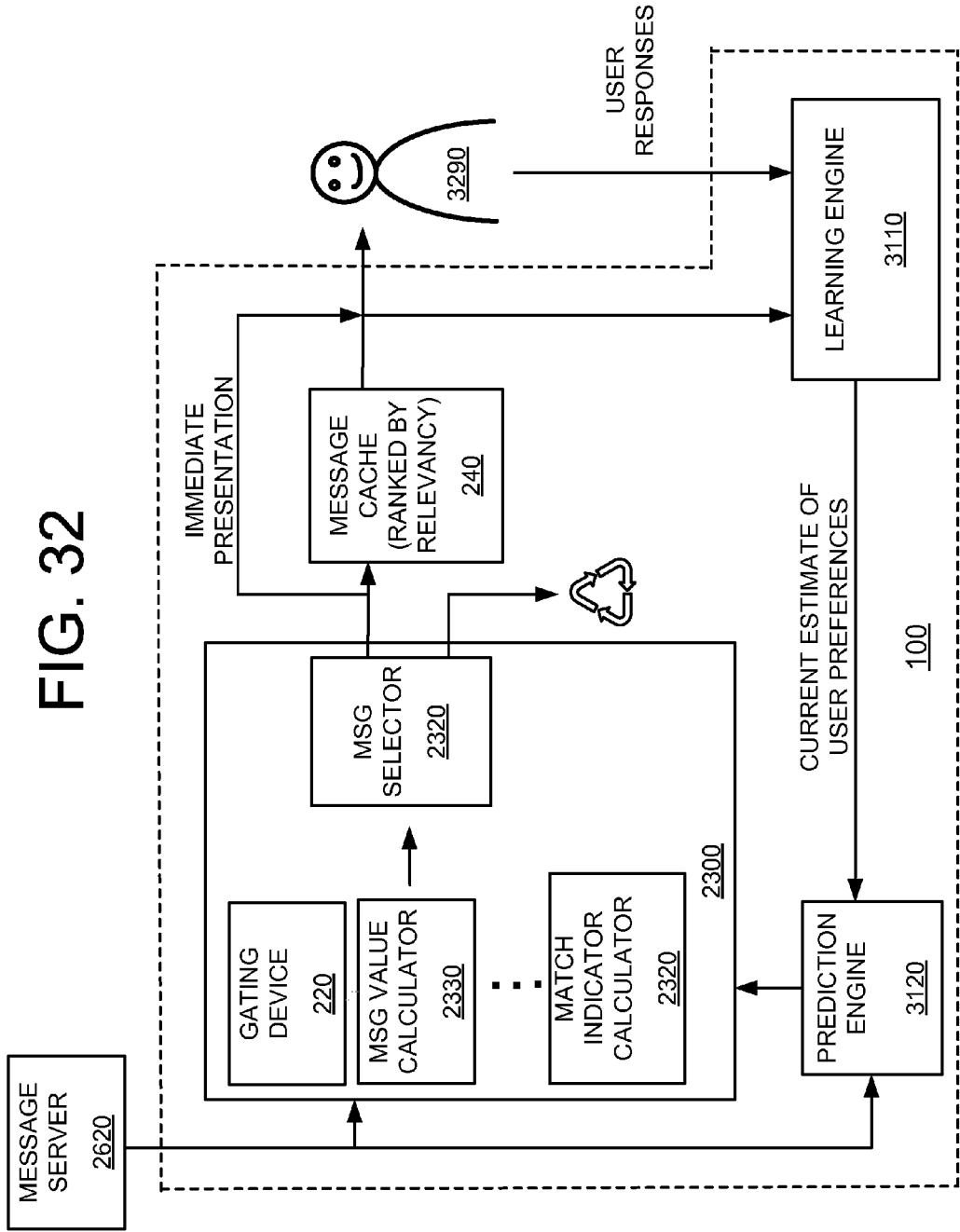
FIG. 32 block diagram illustrating an exemplary learning and prediction engine in context with other elements of a mobile client.

An exemplary architectural flow is depicted in FIG. 32. As shown in FIG. 32, a message server 2920 may deliver a single message, such as a Starbucks coffee ad, to a user's mobile device 100 in real-time when the user 3290 is either walking past or driving past a Starbucks store. Based on the prediction model, it may be useful for the mobile device 100 to take a decision on whether to present this message to the user 3290 based on a match indicator value that is generated related to this information.

Alternatively, a stream of meta-data information related to various messages may arrive at the mobile device 100, and a resident prediction algorithm may provide the relative values of match indicators for each message, so that the mobile device 100 may take a decision on which messages to store in a space-constrained cache 240 on the mobile device 100.

A selection function on the mobile device 100 may optionally use additional indictors, such as associated revenue (message value calculation criteria) and size (gating and/or message value calculation criteria), in addition to a match indicator calculation using commands and information from the prediction engine 3120 to take a decision on whether to present a given message to the user 3290.

With regard to the learning engine 3110, for information that is presented to the user 3290, if there is a user response associated with the presented information, then both the meta-data associated with the user information and the user response may used by the learning engine 3110 to generate a learned user preference model. In addition, for the mobile device 100 of FIG. 32 individual actions on a per-message basis may or may not be stored in the mobile device 100. That is, user actions, along with meta-data for a given message may be used to refine the learned user preference model and subsequently the inputs related to the user action and the ad-meta-data are discarded from the system.

In various embodiments and as discussed above, it can be useful to generate and use a keyword dictionary that describes different possible preferences of a user for a given context. In operation, the creator of a targeted-content-message may specify those keywords that are relevant to a targeted-content-message in the meta-data for a targeted-content-message. When the meta-data associated with the targeted-content-message is presented to the user 3290, the learning engine 3110 may update the user's preferences related to the keywords based on the response of the user 3290 to the information. Additionally, when the meta-data (including the keywords associated with the targeted-content-message) is presented to the mobile device 100, the prediction engine 3120 may compute the match indicator for the user that can be used to determine whether or not to present the targeted-content-message to the user 3290.

In practical operation, one can assume that a keyword dictionary is a flat representation for the purpose of learning. Note that a keyword dictionary that is exposed to the targeted-content-message provider may either be flat or hierarchical in nature.

In a hierarchical representation, nodes at a higher-level in the keyword tree may represent coarse-grain preference categories such as sports, music, movies or restaurants. Nodes lower in the keyword tree hierarchy may be specify finer-grain preferences of the user such as music sub-categories rock, country-music, pop, rap, etc.

While a given keyword dictionary may be hierarchical, the keyword tree may be flattened starting with the bottom of the tree for the purpose of learning. For example a music node in the tree with four children {rock, country-music, pop, and rap} can be flattened to a five node representation with music (general) and the 4 sub-categories. If there are L leaves for a parent node, then the flattened representation translates to (1+L) leaves for the root of the parent node in the keyword hierarchy. Thus, the flattening of the tree can be recursively accomplished starting with the leaves of the tree all the way to the top of the hierarchy such that all intermediate nodes of the tree are connected directly to the root of the tree. For example a quad-tree representation with k levels would consist of a root node along with $4+4^2+4^3+\ldots+4^{(k-1)}$ nodes. Flattening such a tree would result in a keyword dictionary tree consisting of $4+4^2+4^3+\ldots+4^{(k-1)}=(4^k-1)/(4-1)-1=4/3*(4^{(K-1)}-1)$ nodes directly connected to the root node. Note that K=1 would correspond to 0 keywords, K=2 would correspond to 4 keywords, K=3 would correspond to 20 keywords, etc.

Figure 33A:
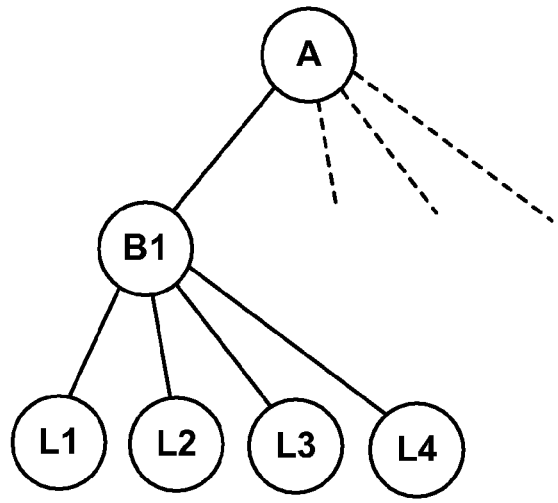
FIG. 33A depicts an exemplary hierarchical keyword organization.
Figure 33B:
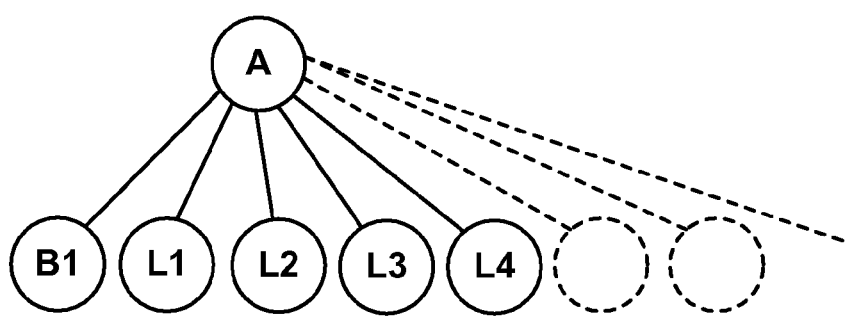
FIG. 33B depicts an exemplary non-hierarchical/flattened keyword organization.

FIG. 33A and FIG. 33B depict an exemplary flattening process at an intermediate parent node in the tree for a hierarchical representation. The learning and prediction algorithms may work on a weighted summation metric which effectively results in learning based on a flattened version of a hierarchical tree, if the decision making is done at the top of the tree.

Continuing, techniques for learning and prediction engines on mobile devices are presented. For notation purposes, let there be n keywords, each corresponding to a preference one may want to capture with regard to a user. One may abstractly represent a user's preferences as a vector $P=(p_1, \ldots, p_n)$, where the value $p_i$ corresponds to the user's preference level for the category i. Similarly, one can abstractly represent a message based on its relevance to the keywords as a vector $A=(a_1, \ldots, a_n)$, where the value $a_i$ corresponds to how relevant the message is to the keyword i. One may assume that messages are presented sequentially to the learning algorithm.

It should be noted that typically a large number (possibly several hundreds) of keywords may be used, though most of them would be irrelevant to a particular message. It may be expected that users will have strong preferences on only a few keywords. Mathematically such vectors are called "sparse vectors". One can assume that input training message keyword vectors are sparse. One may also assume that the desired user preference vector P is also sparse. The current estimated guess of the user's preferences based on the user model can represented as $\hat{P}$.

The algorithms for the learning and prediction engines are described below.

Learning Engine:
Input: Message (represented as a vector): A
User response: 'click occurred'
Persistent: Current guess of user preferences (as a vector): $\hat{P}$ (initially 0)
Decay parameter: D
Counter: C (initially 0)

$$\alpha := \begin{cases} 1/C & \text{if } C \leq D \\ 1/D & \text{otherwise} \end{cases} \qquad \text{Eq. (1)}$$

$$\hat{P} := (1-\alpha)\hat{P} + \alpha A \qquad \text{Eq. (2)}$$

$$C := C + 1 \qquad \text{Eq. (3)}$$

The estimate $\hat{P}$ may start at initial value 0. However, in the presence of available information, one can opt to use a different starting seed. For instance, knowing the local demographics can help to seed the profile of a new mobile user to some average or amalgam. If a seed vector S is available, the initial value of $\hat{P}$ may be set equal to the seed S with no changes to other steps.

Additionally it is possible that one may use a constant decay parameter $\alpha$, in which case $\alpha:=1/D$ in Eq (2) where D is a constant.

Prediction Engine:
Input: Message (represented as a vector): A
Current guess of user preferences (as a vector): $\hat{P}$
Return: $\hat{P} \cdot A$ In operation, one may provide the following operational guarantees:

(1) If the messages and user preferences are sparse, then the learning engine can quickly learn the user preferences from user responses, e.g., the user's "clicking behavior". That is, the rate of learning can be proportional to the sparseness of the messages and/or user preferences (2) The learning engine is robust to high noise. That is, even if user clicks on a large number of irrelevant messages, as long as she is clicking on a small percentage of relevant messages, a learning engine should be able to learn the underlying preferences.

(3) If the underlying user preferences change over time, then the learning engine can adapt to the new preferences well.

Besides information-space sparseness, note that the rate of learning for the user selection rates can be determined based on rate of presentation of information, value of an initial seed, and aspects of a user profile.

Figure 34:
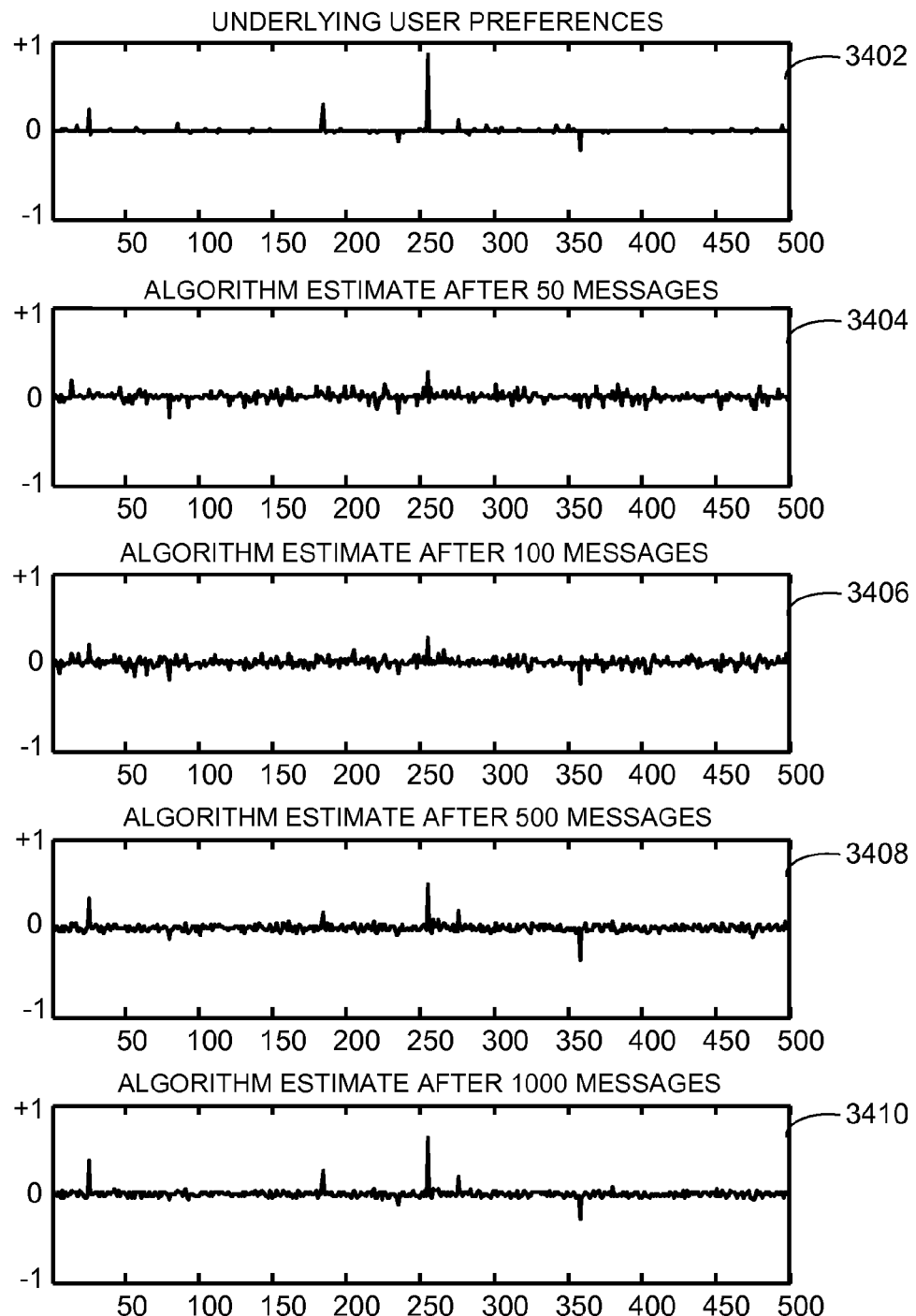
FIG. 34 depicts a series of graphs representing the expected performance of an exemplary learning process for enabling a mobile client to adapt to user preferences.

Results from a Matlab simulation for a possible keyword learning scenario are provided in FIG. 34, which depicts a modeled learning engine in action with the horizontal axes representing the different keywords (total 500), and the vertical axes represents the strength of an individual's preference—positive implies user like, negative implies dislike. The top graph 3402 shows the underlying user preferences, while the subsequent four graphs 3404-3410 show the algorithm's best guess after receiving 50, 100, 500 and 1000 messages respectively.

For the simulation represented in FIG. 34, a sparse vector is randomly chosen to represent the underlying preference vector. As messages are randomly selected, the user's behavior can be simulated as follows: The user clicks on a truly relevant message about 25% of the time and rest 75% of the time the user clicks on an irrelevant message. The decay parameter D is set to 3000. Information regarding which messages were clicked is passed to a learning engine. It should be noted that for the simulation of the present example, the learning engine is not given any information about whether each message is truly relevant to the user.

In view of FIG. 34, it is apparent that a keyword-based user preference representation for individual learning contexts can be desirable and useful on a mobile platform. It should be appreciated that the example of FIG. 34 may be improved by a number of classic adaptive techniques. For example, it may be useful to introduce small degrees of randomness to the prediction model to refine the user's model by further exploring the user's interests in effect performing an "annealing" process characteristic of classic neural network learning.

Additionally, the central learning/adaptive algorithm of Eq. (2) may be modified by varying the decay parameter over time or based on the type of user response (e.g., strong positive, weak positive, neutral, weak negative, strong negative).

A strong positive response may contribute positively (A/D(t)) to the estimate $\hat{P}$ (step 6 in the learning engine). However, if a user displays some form of strong negative behavior to certain information, then the response may contribute negatively (−A/D(t)) to the estimate $\hat{P}$. If the user displays some form of weak positive response, then the response may contribute fractionally ($\alpha$A/D(t)) to the estimate $\hat{P}$ where $0 \le \alpha \le 1$. Similarly, a weak negative response may contribute negatively and fractionally (−$\alpha$A/D(t)) to the estimate $\hat{P}$ where $0 \le \alpha \le 1$.

Alternatively, the central learning/adaptive algorithm of Eq. (2) may be modified by imposing estimate $\hat{P}$ limits, i.e., ceilings and floors, for particular keywords, either by a system operator or in response to certain user behavior. For example, a strong negative user reaction, e.g., some instruction to never show such type of message again, may impose a ceiling for one or more keywords.

Still further, it should be appreciated that, in various embodiments, training parameters and/or learning rules can be embedded in a given message, which can reflect the correlation strength of the message to the keyword. For example, a first advertisement having three related keywords KW1, KW2 and KW3, Keyword KW1 may be far more closely coupled to the content of the advertisement compared to keywords KW2 and KW3. Assuming that respective decay parameters of 500, 2500 and 3000 are transmitted with the advertisement, selection of the advertisement may cause a prediction model to change the respective estimate $\hat{P}_{KW1}$ far faster than for $\hat{P}_{KW2}$ and $\hat{P}_{KW3}$.

Note that the prediction engine may be designed to require that a baseline correlation metric exceed a threshold value to determine relevancy of the target message to the user. For example, in lieu of FIG. 34 it may be desirable to only use keywords associated with estimates that exceed 0.25 and/or are below −0.20 to select messages.

Similarly/alternatively, it may be desirable to only use the top 10 values keywords and/or the bottom 5 keywords to select messages. Such simplification of prediction models may improve performance and reliability of a mobile message delivery device by eliminating the effects of user selection "noise."

Finally, while Eqs (1)-(3) are representative of what is known as an "LMS steepest descent" adaptive/learning algorithm, it should be appreciated that other learning algorithms may be used, such as a Newtonian algorithm or any other known or later-developed learning technique.

Figure 35A:
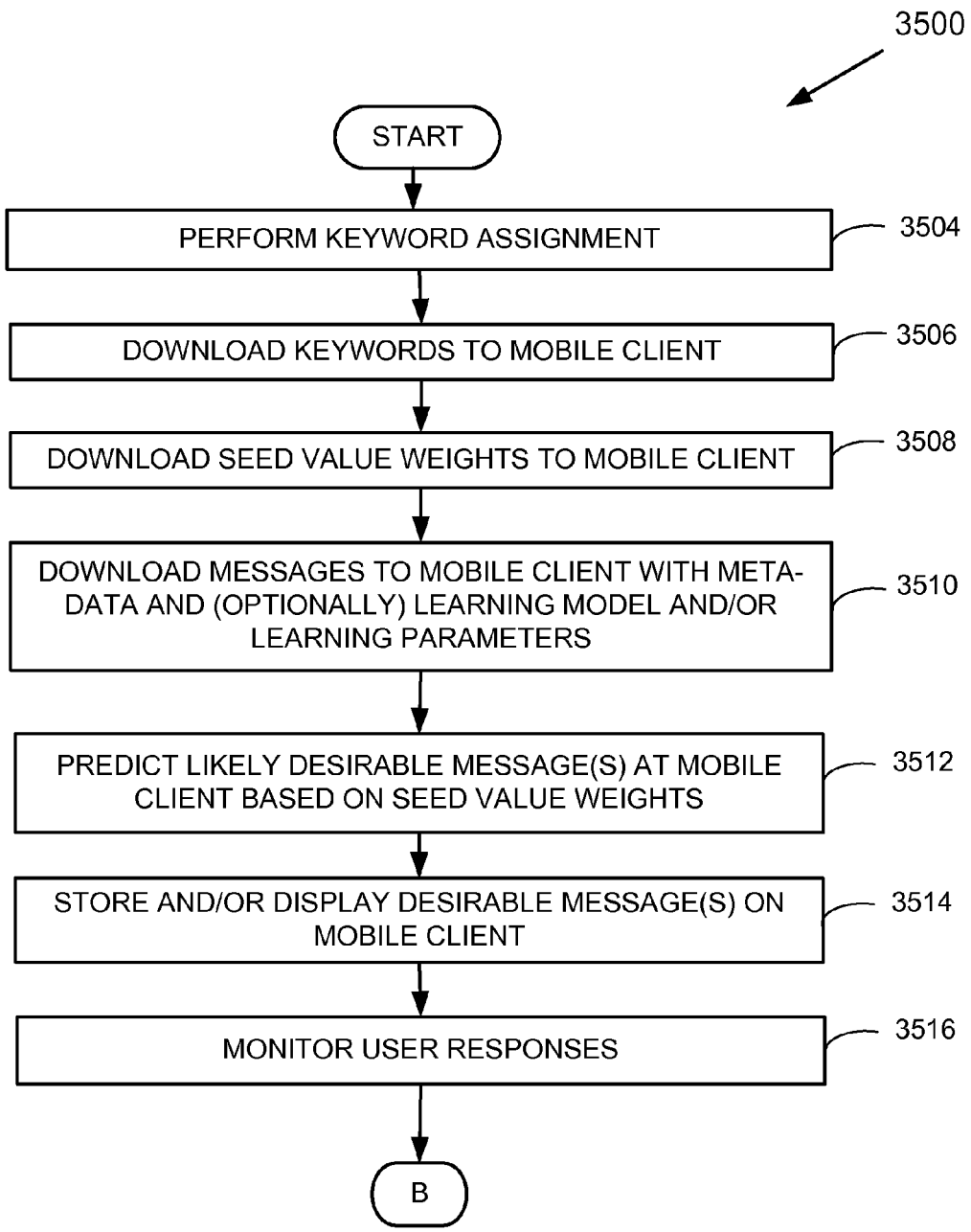
FIGS. 35A and 35B depict a block diagram illustrating an exemplary process for enabling a mobile client to adapt to user preferences.
Figure 35B:
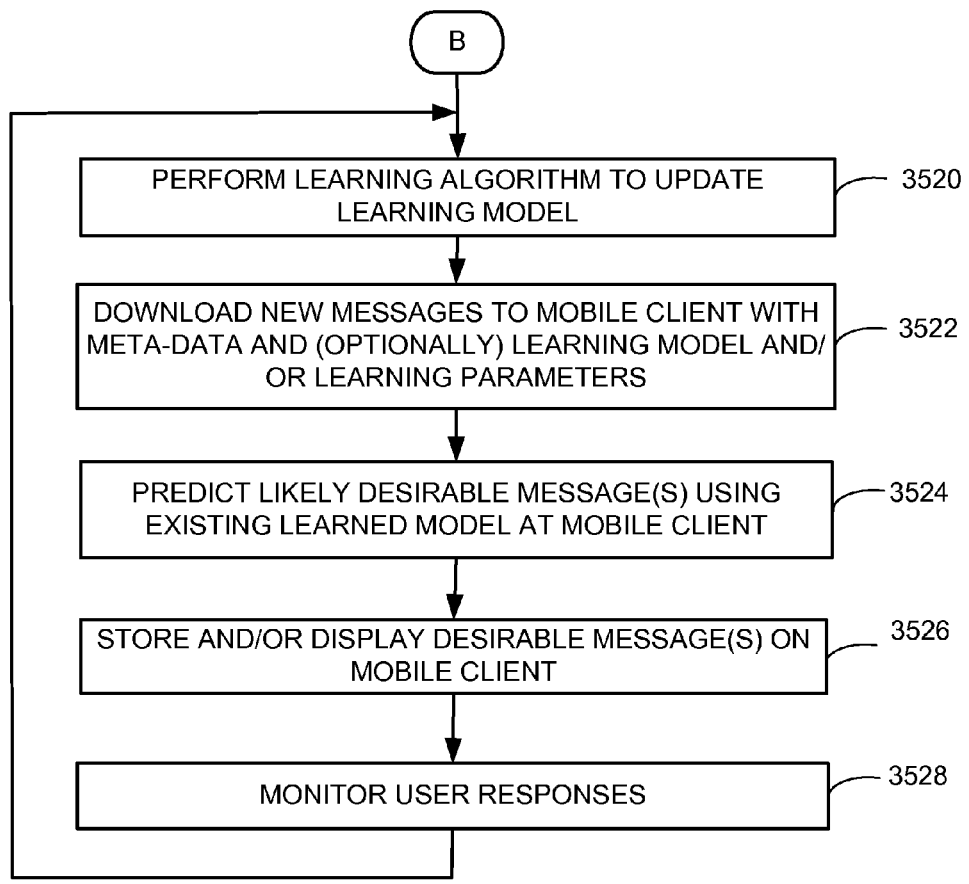

FIG. 35A and FIG. 35B outline an exemplary operation for a mobile client to perform various learning and predictive processes. The process starts in step 3504 where a set of keywords are assigned. As discussed above, the set of available keywords may be sparse or not sparse and/or arranged in a hierarchical or non-hierarchical/flat relationship. Next, in step 3506, the set of keywords may be downloaded to a mobile client, e.g., a cellular phone or wireless-capable PDA. Then, in step 3508, a set of seed values may be downloaded onto the mobile client. In various embodiments, such seed values may include a set of zero values, a set of values determined based upon known demographics of the user, or a set of values determined by any of the other processes discussed above with regard to initial/seed values. Control continues to step 3510.

In step 3510, a set of first messages may be downloaded onto the mobile client, along with the appropriate meta-data, e.g., keywords and (possibly) keyword weights, and/or any number of learning models, e.g., a modified steepest descent algorithm, and/or any number of learning parameters, such as the decay parameter discussed above, ceiling limits, floor limits, context constraints, and so on. Note that while the present set of operations allow for messages to be downloaded at the same time as meta-data and other information, in various embodiments messages may be downloaded after the mobile client determines that such messages are suitable via any number of gating or valuation operations. Control continues to step 3512.

In step 3512, a number of prediction operations may be performed to predict messages, such as targeted advertisements, that would likely be of interest to a user noting that such a prediction operation could be based on a learned model constructed from the seed values of step 3508. Next, in step 3514, the desirable message(s) could be displayed (or otherwise presented) on the mobile device. Then, in step 3516, the mobile device could monitor user responses, e.g., observe and possibly store click-through rates, to the displayed message(s). Control continues to step 3520.

In step 3520, a set of one or more learning algorithms may be performed to update (or otherwise determine) the various learned models to establish one or more sets of learned user preference weights. Note that, as discussed above, learned models may be provided for a variety of context, may use any number of adaptive processes, such as an LMS operation, may incorporate algorithms and learning parameters for particular messages and so on. Control continues to step 3522.

In step 3522, a set of second/target messages may be downloaded onto the mobile client, along with the appropriate meta-data, and/or any number of learning models, and/or any number of learning parameters. Again, note that while the present set of operations allow for messages to be downloaded at the same time as meta-data and other information, in various embodiments, messages may be downloaded after the mobile client determines that such messages are suitable via any number of gating or valuation/prediction operations. Control continues to step 3524.

In step 3524, a number of prediction operations may be performed to predict messages, such as targeted advertisements, that would likely be of interest to a user noting that such a prediction operation could be based on the learned model of step 3520. Next, in step 3526, the desirable message(s) could be displayed (or otherwise presented) on the mobile device. Then, in step 3528, the mobile device could monitor user responses, e.g., observe and possibly store click-through rates, to the displayed message(s). Control then jumps back to step 3520 where after steps 3520-3528 may be repeated as necessary or otherwise desirable.

Application to Statistics Generation—in various exemplary embodiments, a user preference vector may have N dimensions, but only some subset of M dimensions may be relevant to the user. A sparse set of K dimensions can be randomly selected from the N dimensions, and the user preference values associated with the chosen K dimensions may be transmitted. Assume that there are U users in the population for a certain demographic type (such as teenagers). If all U users transmitted all N dimensional values to a server, then each dimension may have available U samples to determine statistics associated with the dimension (such as a mean or variance). However, if only sparse (K-dimensional) components are transmitted, then, on an average, Uk/N samples may be available for each dimension. As long as U>>N, then there are sufficient samples available to compute statistics for each dimension, without requiring each user to transmit all N components of its preference vector. Additionally, if only a fraction r of users transmit information, then on an average Ukr/N samples may be available for each dimension. Thus, one can maintain a sufficient degree of privacy of information for each user while gathering statistics over an entire population of users.

Cache Miss History Attribute: Every time a particular message/ad is requested from a cache and there is no message/ad in the cache satisfying the message/ad type requested, it is a missed opportunity to show an appropriate message/ad to the user. Thus, there is a need to give more weighted value to message that are of the type for which the cache has recorded misses in the recent past. In various embodiments, a parameter, such as the cache miss state match indicator ($FLAG_{CACHE\_MISS\_MI}$) discussed above, can work to avoid such missed opportunities by aiding message/ad value calculation. In various embodiments, this attribute works to determine whether a new prospective message matches the most recent recorded cache misses. It may be a logical "1" (or equivalent) if it matches one of the recent cache misses and a logical "0" (or equivalent) otherwise. This flag may be reset once the message is accessed by an application from the cache and served to the user. If a new message is selected for cache entry, the cache miss entry can be removed from the list of recorded cache misses.

Filter rules: Filter rules may be used by a System Operator to drive the operation of a filtering agent. This allows the System Operator to control the functionality of the filtering agent in a dynamic fashion. Filter rules may be of different types and used to drive different functionalities of the filtering subsystem. Some typical use cases may include:

Filter rules that may determine message cache ratios used to divide a cache space into different categories based on different classifications. The cache ratios may be fixed or dynamic based on some defined criteria.

Filter rules that may determine the value calculation formula for each category.

Filter rules that may define λ which is the value decay rate based on time for messages.

Filter rules that may be used to specify any of the coefficients/weights that go into the calculation of a final message value from the message value attributes within a category.

Filter rules that may define the match indicator calculation formula.

Filter rules that may define a cache miss state match indicator calculation formula.

Filter rules that may define a message playback probability indicator calculation formula.

Filter rules that may define the minimum confidence level threshold below which random CTR are calculated on the device.

Filter rules that may define the number of default messages to be stored for each message type.

Architecture: Depending upon different message distribution models, gating and message selection sub-processes might be implemented by different agents that exist either on a server or on a client. The following sections below discuss the possible architectures for message filtering based on different ad distribution mechanisms.

Figure 36:
FIG. 36 is an illustration of a multicast/broadcast message distribution.

Multicast/Broadcast Message Distribution: FIG. 36 is an illustration of a Multicast/Broadcast Message Distribution scenario using a W-AT 100 and a multicast/broadcast message distribution server 150-A. In case of multicast distribution, messages (e.g., ads), respective metadata and messages filtering rules can be distributed by a message delivery network over a broadcast or multicast channel to a number of users. Consequently, the filtering and caching of messages targeted to the user profile of the user may take place on the W-AT 100 along with any gating and selection sub-processes of the filtering process.

Unicast Message Distribution: There are a number of different protocols that can be used to implement unicast fetch of messages from a message distribution server. Based on the information available at such a server, the gating and selection process can reside on either the server or the various mobile devices. The following is a discussion on some of the protocols and the corresponding message filtering architecture that may be implemented in each case.

Figure 37:
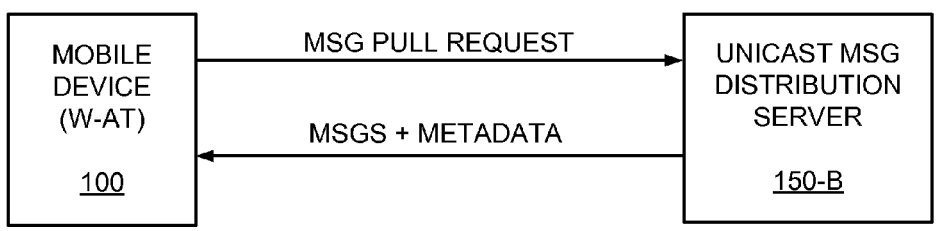
FIG. 37 is an illustration of an exemplary unicast message distribution protocol.

Unicast Message Distribution—Protocol 1: FIG. 37 illustrates a first exemplary unicast message distribution scenario using W-AT 100 and a unicast message distribution server 150-B. In operation, the W-AT 100 can send a "message pull" request to the server 150-B whereby the server 150-B can respond with all the messages available within the system. This approach can hide the mobile device's user profile from the server 150-B by generating and maintaining the profile on the W-AT 100. However it could be expensive to deliver messages to a client over a unicast session if there is a likelihood of a significant portion of the messages being rejected because of non-match with the mobile device's user profile. As in the multicast distribution case, the filtering and caching of messages targeted to the user profile of the W-AT 100 may take place on the W-AT 100 along with the gating and selection sub-processes of the filtering process.

Figure 38:
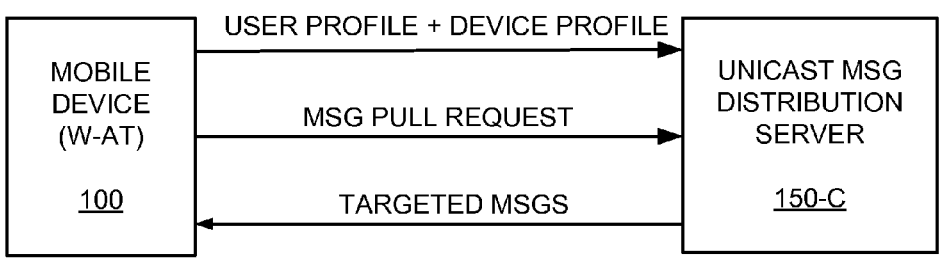
FIG. 38 is an illustration of another exemplary unicast message distribution protocol.

Unicast Message Distribution—Protocol 2: FIG. 38 illustrates a second unicast distribution scenario using W-AT 100 and unicast message distribution server 150-C. In this scenario a user profile can be generated on the W-AT 100 but can be in-sync with server 150-C in that identical copies of the user profile can reside on both devices 100 and 150-C. The device profile of W-AT 100 may also be in-sync with the server 150-C and hence, upon receiving a message pull request from the W-AT 100, the server 150-C can readily push only targeted messages to the device. The gating process—as well as parts of the selection process based on determining whether the messages can be targeted towards the user profile of the W-AT 100—can be implemented on the server 150-C. The message value determination and replacement of old messages by higher-valued new messages can be implemented on the W-AT 100.

In operation, any syncing procedures of the user and device profile between the W-AT 100 and the server 150-C may take place out-of-band using a separate protocol, or in certain embodiments the profiles might be included in the message pull request from the client.

Figure 39:
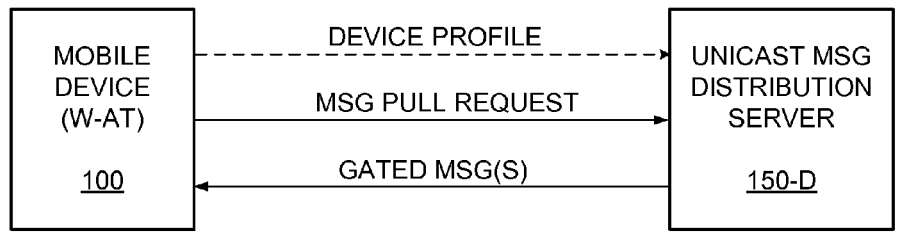
FIG. 39 is an illustration of yet another exemplary unicast message distribution protocol.

Unicast Message Distribution—Protocol 3: FIG. 39 illustrates a third exemplary unicast message distribution scenario using W-AT 100 and unicast message distribution server 150-D. In operation, a user profile can be maintained on the W-AT 100, but only the device profile is synced with the server 150-D while the user profile remains only within W-AT 100. Correspondingly, the gating process can be implemented on the server 150-D, and the server 150-D may push only messages to the W-AT 100 that have cleared the gating process. Part of the gating process, based on system operator specified filters (if any) that require the user's profile, can be implemented at the W-AT 100. Further, the selection process can be implemented completely at the W-AT 100.

As with Protocol 2, the sync of the device profile between the W-AT 100 and the server 150-D might take place out-of-band using a separate protocol or the profile might be included in the ad pull request from the client.

Figure 40:
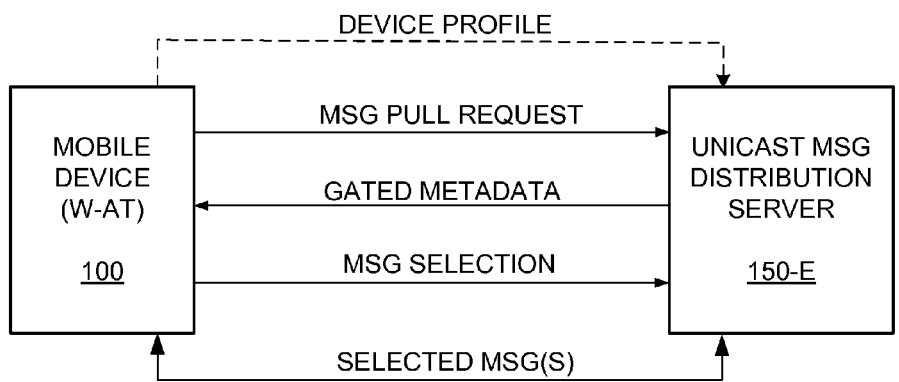
FIG. 40 is an illustration of still another exemplary unicast message distribution protocol.

Unicast Message Distribution—Protocol 4: FIG. 40 illustrates a fourth unicast message distribution scenario using W-AT 100 and unicast message distribution server 150-E. In this scenario, upon receiving a message pull request from the W-AT 100, the server 150-E can respond back with metadata for messages that clear the appropriate gating process. Hence, the gating process can be implemented on the server 150-E. Continuing, the selection process can be implemented at the W-AT 100 using the metadata provided by the server 150-E. Part of the gating process, based on system operator specified filters (if any) that require the user's profile, can be implemented at the W-AT 100. Next, the W-AT 100 may respond to server 150-E with a message selection requests for those messages that the W-AT 100 decides to display or store in its cache based upon the selection process, and the server 150-E may provide those selected messages to the W-AT 100.

Again, the device profile or the gating parameters might be included in an initial message pull request by the W-AT 100, or alternatively might be synchronized between the W-AT 100 and the server 150-E out-of-band using a separate protocol.

The techniques and modules described herein may be implemented by various means. For example, these techniques may be implemented in hardware, software, or a combination thereof. For a hardware implementation, the processing units within an access point or an access terminal may be implemented within one or more application specific integrated circuits (ASICs), digital signal processors (DSPs), digital signal processing W-ATs (DSPDs), programmable logic W-ATs (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors or demodulators. The memory unit may be implemented within the processor or external to the processor, in which case it can be communicatively coupled to the processor via various means.

In one or more exemplary embodiments, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk, High Definition DVD ("HD-DVD") and Blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the features, functions, operations, and embodiments disclosed herein. Various modifications to these embodiments may be readily apparent to those skilled in the art, and the generic principles defined herein may be applied to other embodiments without departing from their spirit or scope. Thus, the present disclosure is not intended to be limited to the embodiments shown herein but is to be accorded the widest scope consistent with the principles and novel features disclosed herein.

The invention claimed is:

1. A method for updating memory content in a mobile client, comprising:
    maintaining, on the mobile client, a list of first attributes relating to a set of first messages, wherein each of the set of first messages resides in a cache on the mobile client, wherein each of the set of first messages is associated with one of a plurality of message categories and wherein the cache on the mobile client reserves a category-specific amount of space within the cache for each message category of the plurality of message categories;
    maintaining, on the mobile client, a list of second attributes relating to a set of second messages, wherein each of the set of second messages does not reside on the mobile client;
    identifying target attributes associated with a message request by the mobile client;
    calculating a first set of relevance scores including a relevance score for each message in the set of first messages based upon degrees to which the list of first attributes conform with the target attributes;
    calculating a second set of relevance scores including a relevance score for each message in the set of second messages based upon degrees to which the list of second attributes conform with the target attributes;
    reducing each relevance score in the second set of relevance scores based on a current connection quality level between the mobile client and remote server at which the set of second messages resides;
    selecting by the mobile client a selected message in a given message category of the plurality of message categories from one of the set of first messages and the set of second messages based on the first and second sets of relevance scores; and
    determining that one of the set of second messages is selected by the selecting, downloading the selected one of the set of second messages from the remote server using a wireless link, and switching the downloaded message from the set of second messages to the set of first messages by replacing at least one existing message from the set of first messages in the given message category with the downloaded message to comply with the reserved category-specific amount of space for the given message category.

2. The method of claim 1, wherein one or more types of attributes for each message include meta-data.

3. The method of claim 1, wherein the selecting is based on a dynamically changeable set of attributes.

4. The method of claim 3, wherein at least one dynamically changeable attribute includes a cumulative user action count, the cumulative user action count being a number of times a particular message has invoked a user action.

5. The method of claim 3, wherein at least one dynamically changeable attribute includes a cumulative message served count per day, the cumulative message served count per day being a number of times a particular message has already been served to a user in a given day.

6. The method of claim 3, wherein at least one dynamically changeable attribute includes a cache miss state match indicator, the cache miss state match indicator relating to an instance where an application on the mobile client requests a particular message type, but none of the set of first messages match the particular message type.

7. The method of claim 3, wherein the dynamically changeable set of attributes change based on at least a time that a particular message has been available for viewing by the mobile client.

8. The method of claim 3, wherein the dynamically changeable set of attributes change based on at least a number of times that a particular message has been displayed by the mobile client.

9. The method of claim 1, wherein the calculation of the first set of relevance scores or the second set of relevance scores is based upon at least one parametric equation.

10. The method of claim 1, wherein the selecting excludes each relevance score from the second set of relevance scores from selection based upon the current connection quality level corresponding to a poor network connectivity of the mobile client to the remote server.

11. A mobile client configured to update its internal memory, comprising:
    means for maintaining a list of first attributes relating to a set of first messages on the mobile client, wherein each of the set of first messages resides in a cache on the mobile client, wherein each of the set of first messages is associated with one of a plurality of message categories and wherein the cache on the mobile client reserves a category-specific amount of space within the cache for each message category of the plurality of message categories, and wherein the means for maintaining further maintains on the mobile client, a list of second attributes relating to a set of second messages, wherein each of the set of second messages does not reside on the mobile client;
    a processor configured to identify target attributes associated with a message request by the mobile client;
    means for calculating a first set of relevance scores including a relevance score for each message in the set of first messages based upon degrees to which the list of first attributes conform with the target attributes;
    means for calculating a second set of relevance scores including a relevance score for each message in the set of second messages based upon degrees to which the list of second attributes conform with the target attributes;
    means for reducing each relevance score in the second set of relevance scores based on a current connection quality level between the mobile client and remote server at which the set of second messages resides;
    wherein the processor is further configured to select a selected message in a given message category of the plurality of message categories from one of the set of first messages and the set of second messages based on the first and second sets of relevance scores;
    means for determining that one of the set of second messages is selected by the processor;
    means for downloading the selected one of the set of second messages from the remote server using a wireless link; and
    wherein the processor is further configured to switch the downloaded message from the set of second messages to the set of first messages by replacing at least one existing message from the set of first messages in the given message category with the downloaded message to comply with the reserved category-specific amount of space for the given message category.

12. The mobile client of claim 11, wherein types of attributes for each message include meta-data.

13. The mobile client of claim 11, wherein the mobile client is configured to select message based on a dynamically changeable set of attributes.

14. The mobile client of claim 13, wherein at least one dynamically changeable attribute includes a cumulative user action count, the cumulative user action count being a number of times a particular message has invoked a user action.

15. The mobile client of claim 13, wherein at least one dynamically changeable attribute includes a cumulative message served count per day, the cumulative message served count per day being a number of times a particular message has already been served to a user in a given day.

16. The mobile client of claim 13, wherein at least one dynamically changeable attribute includes a cache miss state match indicator, the cache miss state match indicator relating to an instance where an application on the mobile client requests a particular message type, but none of the set of first messages match the particular message type.

17. The mobile client of claim 13, wherein the dynamically changeable set of attributes change based on at least a time that a particular message has been available for viewing by the mobile client.

18. The mobile client of claim 13, wherein the dynamically changeable set of attributes change based on at least a number of times that a particular message has been displayed by the mobile client.

19. The mobile client of claim 11, wherein the processor is further configured to exclude each relevance score from the second set of relevance scores from selection based upon the current connection quality level corresponding to a poor network connectivity of the mobile client to the remote server.

20. A mobile client configured to update its internal memory, comprising:
   a memory;
   a transceiver;
   a processor coupled to the memory and transceiver and configured to:
      maintain, on the mobile client, a list of first attributes relating to a set of first messages, wherein each of the set of first messages resides in a cache on the mobile client, wherein each of the set of first messages is associated with one of a plurality of message categories and wherein the cache on the mobile client reserves a category-specific amount of space within the cache for each message category of the plurality of message categories, the processor also configured to maintain, on the mobile client, a list of second attributes relating to a set of second messages, wherein each of the set of second messages does not reside on the mobile client;
      identify target attributes associated with a message request by the mobile client;
      calculate a first set of relevance scores including a relevance score for each message in the set of first messages based upon degrees to which the list of first attributes conform with the target attributes;
      calculate a second set of relevance scores including a relevance score for each message in the set of second messages based upon degrees to which the list of second attributes conform with the target attributes;
      reduce each relevance score in the second set of relevance scores based on a current connection quality level between the mobile client and remote server at which the set of second messages resides;
      select a selected message in a given message category of the plurality of message categories from one of the set of first messages and the set of second messages based on the first and second sets of relevance scores; and
      determine that one of the set of second messages is selected, download the selected one of the set of second messages from the remote server using a wireless link, and switch the downloaded message from the set of second messages to the set of first messages by replacing at least one existing message from the set of first messages in the given message category with the downloaded message to comply with the reserved category-specific amount of space for the given message category.

21. The mobile client of claim 20, wherein one or more types of attributes for each message include meta-data.

22. The mobile client of claim 20, wherein the processor is further configured to select the selected message based on a dynamically changeable set of attributes.

23. The mobile client of claim 22, wherein at least one dynamically changeable attribute includes a cumulative user action count, the cumulative user action count being a number of times a particular message has invoked a user action.

24. The mobile client of claim 22, wherein at least one dynamically changeable attribute includes a cumulative message served count per day, the cumulative message served count per day being a number of times a particular message has already been served to a user in a given day.

25. The mobile client of claim 22, wherein at least one dynamically changeable attribute includes a cache miss state match indicator, the cache miss state match indicator relating to an instance where an application on the mobile client requests a particular message type, but none of the set of first messages match the particular message type.

26. The mobile client of claim 22, wherein the dynamically changeable set of attributes change based on at least a time that a particular message has been available for viewing by the mobile client.

27. The mobile client of claim 22, wherein the dynamically changeable set of attributes change based on at least a number of times that a particular message has been displayed by the mobile client.

28. The mobile client of claim 20, wherein the processor excludes each relevance score from the second set of relevance scores from selection based upon the current connection quality level corresponding to a poor network connectivity of the mobile client to the remote server.

29. A computer program product, comprising: a non-transitory computer-readable medium comprising instructions for:
   maintaining, on a mobile client, a list of first attributes relating to a set of first messages, wherein each of the set of first messages resides in a cache on the mobile client, wherein each of the set of first messages is associated with one of a plurality of message categories and wherein the cache on the mobile client reserves a category-specific amount of space within the cache for each message category of the plurality of message categories;
   maintaining, on the mobile client, a list of second attributes relating to a set of second messages, wherein each of the set of second messages does not reside on the mobile client;

identifying target attributes associated with a message request by the mobile client;

calculating a first set of relevance scores including a relevance score for each message in the set of first messages based upon degrees to which the list of first attributes conform with the target attributes;

calculating a second set of relevance scores including a relevance score for each message in the set of second messages based upon degrees to which the list of second attributes conform with the target attributes;

reducing each relevance score in the second set of relevance scores based on a current connection quality level between the mobile client and remote server at which the set of second messages resides;

selecting by the mobile client a selected message in a given message category of the plurality of message categories from one of the set of first messages and the set of second messages based on the first and second sets of relevance scores; and determining that one of the set of second messages is selected by the selecting, downloading the selected one of the set of second messages from the remote server using a wireless link, and switching the downloaded message from the set of second messages to the set of first messages by replacing at least one existing message from the set of first messages in the given message category with the downloaded message to comply with the reserved category-specific amount of space for the given message category.

30. The non-transitory computer-readable medium of claim 29, wherein one or more types of attributes for each message include meta-data.

31. The non-transitory computer-readable medium of claim 29, wherein the instructions for selecting select the selected message based on a dynamically changeable set of attributes.

32. The non-transitory computer-readable medium of claim 29, wherein the calculation of the first set of relevance scores or the second set of relevance scores is based upon at least one parametric equation.

33. The non-transitory computer-readable medium of claim 29, wherein the instructions for selecting exclude each relevance score from the second set of relevance scores from selection based upon the current connection quality level corresponding to a poor network connectivity of the mobile client to the remote server.

* * * * *